US010865834B2

(12) United States Patent
Kamiya et al.

(10) Patent No.: US 10,865,834 B2
(45) Date of Patent: Dec. 15, 2020

(54) SEALING STRUCTURE WITH ANNULAR POCKET AND SEALING DEVICE

(71) Applicant: NOK CORPORATION, Tokyo (JP)

(72) Inventors: Yusuke Kamiya, Fukushima (JP); Hiroki Matsui, Fukushima (JP); Shinya Omoto, Tottori (JP); Toru Nakashima, Tottori (JP); Hirotaka Mizuta, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 73 days.

(21) Appl. No.: 16/194,716

(22) Filed: Nov. 19, 2018

(65) Prior Publication Data

US 2019/0113080 A1    Apr. 18, 2019

Related U.S. Application Data

(63) Continuation of application No. PCT/JP2017/018383, filed on May 16, 2017.

(30) Foreign Application Priority Data

May 18, 2016 (JP) .................................. 2016-099972
May 26, 2016 (JP) .................................. 2016-105432

(51) Int. Cl.
*F16J 15/3232* (2016.01)
*F16J 15/447* (2006.01)
(Continued)

(52) U.S. Cl.
CPC ........ *F16C 33/7876* (2013.01); *F16C 19/186* (2013.01); *F16C 33/805* (2013.01);
(Continued)

(58) Field of Classification Search
CPC .. F16C 33/7873; F16C 33/7869; F16C 33/80; F16C 2326/02; F16C 2361/61;
(Continued)

(56) References Cited

U.S. PATENT DOCUMENTS 8,905,641 B2 * 12/2014 Duch ...................... F16C 33/80
                                                           384/480
10,240,674 B2 * 3/2019 Sakai ...................... F16J 15/002
(Continued)

FOREIGN PATENT DOCUMENTS

CN    101189461 A    5/2008
CN    107002885 A    8/2017
(Continued)

OTHER PUBLICATIONS

Korean Office Action dated Jan. 2, 2020 for corresponding Korean Application No. 10-2018-7032971 and English translation.
(Continued)

*Primary Examiner* — Nathan Cumar
(74) *Attorney, Agent, or Firm* — Pearne & Gordon LLP

(57) ABSTRACT

A sealing structure with an annular pocket and a sealing device includes an annular pocket and a sealing device. The pocket is provided in a slinger, and the sealing device is attached to a housing of a differential device. The slinger is arranged on an output shaft of the differential device. A recessed part of the pocket is defined by an inner peripheral tubular portion, an outer peripheral tubular portion and a bottom portion of the slinger. The outer peripheral surface of the pocket is formed in the outer peripheral tubular portion of the slinger. The outer peripheral surface of the pocket increases in diameter toward the outside in an axis direction. A side lip of the sealing device extends in the outward direction, and an annular gap is formed between the side lip and the pocket.

22 Claims, 43 Drawing Sheets

(51) Int. Cl.
*F16C 33/78* (2006.01)
*F16C 33/80* (2006.01)
*F16C 19/18* (2006.01)
*F16C 33/76* (2006.01)
*F16C 19/36* (2006.01)

(52) U.S. Cl.
CPC ......... *F16J 15/3232* (2013.01); *F16J 15/447* (2013.01); *F16C 19/364* (2013.01); *F16C 33/76* (2013.01); *F16C 2326/02* (2013.01); *F16C 2361/61* (2013.01)

(58) Field of Classification Search
CPC .... F16C 2361/55; F16C 19/36; F16C 19/361; F16C 19/364; F16C 33/7876; F16C 33/7803; F16C 33/805; F16C 33/76; F16C 33/761; F16C 33/763; F16C 2326/00; F16C 2361/00; F16C 19/00; F16C 19/185–187; F16C 19/22; F16J 15/3232; F16J 15/447; F16J 15/4472; F16J 15/4474; F16J 15/4476; F16J 15/4478; F16J 15/32; F16J 15/3236
USPC ........................................................ 277/346
See application file for complete search history.

(56) References Cited

U.S. PATENT DOCUMENTS

| | | | | |
|---|---|---|---|---|
| 2002/0129675 | A1* | 9/2002 | Watanabe | F16F 15/1203 74/574.4 |
| 2006/0188191 | A1* | 8/2006 | Schenk | F16C 13/006 384/489 |
| 2007/0085276 | A1 | 4/2007 | Hartmann et al. | |
| 2007/0147718 | A1* | 6/2007 | Takimoto | F16J 15/164 384/486 |
| 2007/0270227 | A1* | 11/2007 | Okinaga | F16F 15/126 464/68.4 |
| 2007/0278748 | A1* | 12/2007 | Matsui | F16C 33/7896 277/549 |
| 2008/0292231 | A1* | 11/2008 | Matsui | F16C 33/7876 384/486 |
| 2009/0127796 | A1 | 5/2009 | Kanzaki et al. | |
| 2009/0127797 | A1* | 5/2009 | Kanzaki | F16J 15/3264 277/565 |
| 2009/0257698 | A1* | 10/2009 | Aritake | F16C 19/386 384/484 |
| 2009/0263063 | A1* | 10/2009 | Komori | F16J 15/3264 384/478 |
| 2010/0052265 | A1 | 3/2010 | Hartmann et al. | |
| 2010/0247014 | A1* | 9/2010 | Ohmori | F16C 19/186 384/486 |
| 2014/0003753 | A1* | 1/2014 | Haepp | F16C 33/7886 384/480 |
| 2017/0268676 | A1 | 9/2017 | Kamiya et al. | |
| 2018/0274626 | A1 | 9/2018 | Komyo et al. | |

FOREIGN PATENT DOCUMENTS

| | | |
|---|---|---|
| EP | 3 222 893 A1 | 9/2017 |
| EP | 3 385 567 A1 | 10/2018 |
| JP | 05-025049 U | 4/1993 |
| JP | 09-324861 A | 12/1997 |
| JP | 2003-262235 A | 9/2003 |
| JP | 2006-046097 A | 2/2006 |
| JP | 2006-057825 A | 3/2006 |
| JP | 2009-197884 A | 9/2009 |
| JP | 2010-190323 A | 9/2010 |
| JP | 2011-080575 A | 4/2011 |
| JP | 2011-089558 A | 5/2011 |
| JP | 5556355 B2 | 6/2014 |
| JP | 2014 246245 * | 12/2014 |
| JP | 2015-052350 A | 3/2015 |
| JP | 2015-110958 A | 6/2015 |
| JP | 2016-075325 A | 5/2016 |
| WO | 2005/059412 A1 | 6/2005 |
| WO | 2015/180928 A1 | 12/2015 |

OTHER PUBLICATIONS

Extended European Search Report dated Nov. 19, 2019 for corresponding European Application No. 17799387.0.
Indian Office Action dated Dec. 16, 2019 for corresponding Indian Application No. 201837046390.
Korean Office Action dated Aug. 1, 2019 for corresponding Korean Application No. 10-2018-7032971 and English translation.
Chinese Office Action dated Sep. 24, 2019 for corresponding Chinese Application No. 201780030941.1 and English translation.
International Preliminary Report on Patentability for corresponding International Application No. PCT/JP2017/018383 dated Nov. 29, 2018.
English translation of Written Opinion for corresponding International Application No. PCT/JP2017/018383 dated Jul. 25, 2017.
International Search Report for corresponding International Application No. PCT/JP2017/018383 dated Jul. 25, 2017.
Written Opinion for corresponding International Application No. PCT/JP2017/018383 dated Jul. 25, 2017.
Grant of Patent dated Apr. 14, 2020 for corresponding Korean Application No. 10-2018-7032971 and English translation.
Second Chinese Office Action dated Aug. 5, 2020 for corresponding Chinese Application No. 201780030941.1 and English translation.

\* cited by examiner

SEALING STRUCTURE WITH ANNULAR POCKET AND SEALING DEVICE

CROSS REFERENCE TO RELATED APPLICATIONS

The present application is a continuation application of International Patent Application No. PCT/JP2017/018383 filed May 16, 2017, which claims priority of Japanese Patent Applications No. 2016-099972 filed May 18, 2016, and 2016-105432 filed May 26, 2016. The contents of these applications are incorporated herein by reference in their entirety.

BACKGROUND

Technical Field

The present disclosure relates to a sealing structure with an annular pocket and a sealing device, and more particularly to a sealing structure formed by a sealing device such as an oil seal for sealing lubricant, etc., a seal for sealing against foreign matter such as muddy water, sand, or dust, in a vehicle, a general-purpose machine or the like and a pocket which is provided in a rotatable shaft member in sliding contact with these sealing devices, a member rotating together with the shaft member or the like. Furthermore, the present disclosure particularly relates to a sealing structure formed by a shaft member of a vehicle or the like or a functional member attached to the shaft member and a sealing device used for the shaft member or the functional member like a torsion damper and an oil seal.

Background Art

A sealing device for sealing a gap of a through-hole of a housing through which a shaft member is passed is used, for example, in a vehicle. Among known examples of these sealing devices are an oil seal for sealing a gap formed between a crankshaft of an engine and a through-hole of a case through which a rear end portion of the crankshaft is passed, a seal for sealing a gap formed between an output shaft of a differential mechanism and a through-hole of the housing through which the output shaft is passed, and a seal for sealing a space between an inner ring and an outer ring of a hub bearing for rotatably supporting a wheel.

In such a conventional sealing device as described above, there is a case where foreign matter intrudes between the sealing device and the shaft member, and a seal lip of the sealing device bites the foreign matter and thus is damaged or deteriorated, resulting in deterioration of sealing performance of the sealing device, so that lubricant inside a case or a housing may leak, or foreign matter may intrude into the inside of the case or the housing. For this reason, a structure for suppressing the intrusion of foreign matter between the sealing device and the shaft member has been hitherto disclosed (for example, see Japanese Patent Application Publication No. 2006-46097, Japanese Patent Application Publication No. 2006-57825, and Japanese Patent Application Publication No. 2011-80575).

Furthermore, as such a sealing device, for example, an oil seal for sealing a gap formed between a torsional damper and a through-hole of a front cover in an engine of a vehicle is known. For example, in an engine of a vehicle, a torsional damper is attached to one end of a crankshaft to reduce torsional vibrations caused by rotational fluctuation of the crankshaft. Generally, in the engine of the vehicle, the torsional damper is used as a damper pulley, and transmits a part of the power of the engine to auxiliary machines such as a water pump and an air conditioner compressor via a power transmission belt. The space between the torsional damper and the through-hole, for example, a through-hole of the front cover, through which the crankshaft is inserted is sealed by an oil seal.

FIG. 43 is a partial cross-sectional view taken along an axis to schematically show configurations of a conventional damper pulley and an oil seal used in an engine of a vehicle. As shown in FIG. 43, the conventional damper pulley 300 includes a hub 301, a pulley 302, and a damper elastic body 303 disposed between the hub 301 and the pulley 302. The hub 301 includes a boss portion 301*a* on an inner periphery side, a rim portion 301*b* on an outer periphery side, and a disc portion 301*c* for connecting the boss portion 301*a* and the rim portion 301*b*. In the damper pulley 300, the boss portion 301*a* of the hub 301 is fitted to one end of the crankshaft 320 and is fixed by a bolt 321.

The boss portion 301*a* of the hub 301 of the damper pulley 300 attached to the crankshaft 320 is inserted into the through-hole 323 of the front cover 322 from the outside of the engine, the oil seal 310 is press-fitted between the boss portion 301*a* and the through-hole 323, and the seal lip 311 comes into slidable and liquid-tight contact with the boss portion 301*a*, thereby performing sealing between the damper pulley 300 and the front cover 322.

In the conventional structure of the damper pulley 300 and the oil seal 310, there is a case where foreign matter intrudes between the oil seal 310 and the boss portion 301*a*, the seal lip 311 bites the foreign matter and thus is damaged or deteriorated, and the seal performance of the oil seal 310 deteriorates, so that oil leaks. Therefore, a structure for suppressing foreign matter from intruding from a space between the damper pulley 300 and the front cover 322 into the gap between the oil seal 310 and the boss portion 301*a* has been hitherto disclosed (for example, see Japanese Patent Application Publication No. H09-324861).

Furthermore, in the conventional damper pulley 300, for the purpose of reduction of the weight and reduction of the manufacturing cost, there is a case where a plurality of window portions 301*d* which are through-holes penetrating through a disc portion 301*c* of a hub 301 are formed in the circumferential direction (for example, see Japanese Utility Model Application Publication No. H05-25049 and Japanese Patent No. 5556355).

The aforementioned conventional sealing device has a configuration for suppressing intrusion of foreign matter such as muddy water, sand, or dust. However, due to recent diversification of the usage environment of vehicles, there is a case where the sealing device is exposed to foreign matter under a state that is more severe than states assumed in the past, and therefore a configuration capable of further preventing the sealing device from being exposed to foreign matter intruding from the outside has been required.

Furthermore, although the conventional damper pulley 300 having the window portions 301*d* formed herein is capable of reducing the weight and cost of the damper pulley 300 in the engine, foreign matter such as muddy water, sand or dust easily intrudes into the engine side through the window portions 301*d*. Therefore, for the torsional damper having the window portions, a further improvement of the function of suppressing the intrusion of foreign matter into the seal portion has been required.

As described above, when the conventional damper pulley 300 having the window portions 301*d* formed therein is used, there has been a requirement to further prevent the seal lip 311 of the oil seal 310 from being exposed to foreign matter intruding from the window portions 301d as well as foreign matter intruding from the outer periphery of the damper pulley 300. In addition, due to recent diversification of the usage environment of vehicles, there has been a requirement to further prevent the seal lip 311 of the oil seal 310 from being exposed to foreign matter intruding from the outside.

The present disclosure is related to provide a sealing structure with an annular pocket and a sealing device that can suppress a seal lip of the sealing device from being exposed to foreign matter from the outside.

Furthermore, the present disclosure is related to provide a sealing structure with an annular pocket and a sealing device that can efficiently suppress a seal lip of the sealing device from being exposed to foreign matter intruding from the outside.

SUMMARY

A sealing structure with an annular pocket and a sealing device according to the present disclosure is a sealing structure with an annular pocket and a sealing device. The pocket has an outer peripheral surface having an annular shape around an axis and extending along the axis, forms a recessed part which has an annular shape around the axis and is recessed to one side in a direction of the axis, and is provided to a shaft member that penetrates through a through-hole of an attachment target portion to which the sealing device is attached, and is rotatable around the axis, or a functional member attached to the shaft member. The sealing device includes a seal lip having an annular shape around the axis, and a side lip which has an annular shape around the axis and extends to the one side in the direction of the axis, and is attached to the through-hole of the attachment target portion to perform sealing between the shaft member or the functional member and the through-hole. The outer peripheral surface of the pocket increases in diameter toward the one side in the direction of the axis. In the sealing device attached to the attachment target portion, the seal lip is slidably in contact with the shaft member or the functional member directly or indirectly, and the side lip extends to the pocket to form an annular gap between the side lip and the outer peripheral surface of the pocket.

The sealing structure with an annular pocket and a sealing device according to one aspect of the present disclosure further includes a slinger having an annular shape around the axis as the functional member. The pocket is provided to the slinger, and the slinger is a member having an annular shape around the axis, and is fitted to the shaft member.

In the sealing structure with an annular pocket and a sealing device according to one aspect of the present disclosure, the slinger includes an inner peripheral tubular portion which is a cylindrical portion having an annular shape around the axis and extending along the axis, an outer peripheral tubular portion which is a cylindrical portion facing the inner peripheral tubular portion on an outer peripheral side, having an annular shape around the axis and extending along the axis, and a bottom portion which is a portion expanding between an end portion on the one side in the direction of the axis of the outer peripheral tubular portion and an end portion of the one side in the direction of the axis of the inner peripheral tubular portion. The recessed part is defined by the inner peripheral tubular portion, the outer peripheral tubular portion and the bottom portion, and the outer peripheral tubular portion has the outer peripheral surface.

In the sealing structure with an annular pocket and a sealing device according to one aspect of the present disclosure, the attachment target portion is a housing of a differential device, and the shaft member is an output shaft of the differential device.

In the sealing structure with an annular pocket and a sealing device according to one aspect of the present disclosure, the pocket is provided to a hub of a hub bearing as the shaft member, and the attachment target portion is an outer ring of the hub bearing.

The sealing structure with an annular pocket and a sealing device according to one aspect of the present disclosure further includes a slinger having an annular shape around the axis as the functional member. The pocket is provided to the slinger, the shaft member is a hub of a hub bearing. The attachment target portion is an outer ring of the hub bearing, and the slinger is fitted to the hub.

In the sealing structure with an annular pocket and a sealing device according to one aspect of the present disclosure, the recessed part is formed in the slinger.

In the sealing structure with an annular pocket and a sealing device according to one aspect of the present disclosure, the pocket is provided to a flywheel as the functional member, and the shaft member is a crankshaft.

The sealing structure with an annular pocket and a sealing device according to one aspect of the present disclosure further includes a disc-shaped plate member as the functional member. The pocket is provided to the plate member, and the plate member is interposed between a crankshaft as the shaft member and a flywheel as the functional member to cover an end portion on one side in the direction of the axis of the crankshaft from an outer periphery side at the outer peripheral surface of the pocket, thereby forming the recessed part.

In the sealing structure with an annular pocket and a sealing device according to one aspect of the present disclosure, the plate member has a disc portion which is a disc-shaped portion, an outer peripheral tubular portion which is a cylindrical portion extends from an end portion on the outer periphery side of the disc portion along the axis, and the outer peripheral surface is formed in the outer peripheral tubular portion.

In the sealing structure with an annular pocket and a sealing device according to one aspect of the present disclosure, the side lip forms the annular gap between the side lip and an end portion on another side in the direction of the axis of the outer peripheral surface of the pocket.

In the sealing structure with an annular pocket and a sealing device according to one aspect of the present disclosure, the side lip faces the outer peripheral surface of the pocket to form the annular gap between the side lip and the outer peripheral surface of the pocket.

In the sealing structure with an annular pocket and a sealing device according to one aspect of the present disclosure, a diameter-increasing angle which is an angle of the diameter-increasing outer peripheral surface of the pocket with respect to the axis ranges from not less than 4° to not more than 18°.

In the sealing structure with an annular pocket and a sealing device according to one aspect of the present disclosure, a gap angle difference which is a difference between a diameter-increasing angle which is an angle of the diameter-increasing outer peripheral surface of the pocket with respect to the axis and an inclination angle which is an angle of the side lip with respect to the axis ranges from not less than 1.0° to not more than 11.0°.

Furthermore, a sealing structure with an annular pocket and a sealing device according to the present disclosure is a sealing structure with an annular pocket and a sealing device. The pocket has an outer peripheral surface having an annular shape around an axis and extending along the axis, forms a recessed part which has an annular shape around the axis and is recessed to one side in a direction of the axis, and is provided to a shaft member that penetrates through a through-hole of an attachment target portion to which the sealing device is attached, and is rotatable around the axis, or a functional member attached to the shaft member. The sealing device includes a seal lip having an annular shape around the axis, and a side lip which is has an annular shape around the axis and extends to the one side in the direction of the axis, and is attached to the through-hole of the attachment target portion to perform sealing between the shaft member or the functional member and the through-hole. In the sealing device attached to the attachment target portion, the seal lip is slidably in contact with the shaft member or the functional member directly or indirectly. The side lip extends to the pocket to form an annular gap between the side lip and the outer peripheral surface of the pocket. The outer peripheral surface of the pocket increases in diameter toward the one side in the direction of the axis, and includes at least one foreign matter discharge groove as a groove which extends from the one side to another side in the direction of the axis and is recessed in an outer peripheral direction.

In the sealing structure with an annular pocket and a sealing device according to one aspect of the present disclosure, a bottom portion which is a portion on an outer peripheral side of the foreign matter discharge groove extends along the axis in a radial direction.

In the sealing structure with an annular pocket and a sealing device according to one aspect of the present disclosure, the foreign matter discharge groove extends so that the bottom portion departs from the axis in the radial direction from the one side toward the other side in the direction of the axis.

In the sealing structure with an annular pocket and a sealing device according to one aspect of the present disclosure, the outer peripheral surface of the pocket has a plurality of foreign matter discharge grooves at equiangular intervals in a circumferential direction.

In the sealing structure with an annular pocket and a sealing device according to one aspect of the present disclosure, the side lip forms the annular gap between the side lip and an end portion on the other side of the outer peripheral surface of the pocket.

In the sealing structure with an annular pocket and a sealing device according to one aspect of the present disclosure, the side lip faces the outer peripheral surface of the pocket to form the annular gap between the side lip and the outer peripheral surface of the pocket.

The sealing structure with an annular pocket and a sealing device according to one aspect of the present disclosure further includes a torsional damper as the functional member to which the pocket is provided. The torsional damper includes a hub, a mass body that has an annular shape around an axis and covers the hub on an outer periphery, and a damper elastic body that is arranged between the hub and the mass body to elastically connect the hub and the mass body. The hub is inserted into the through-hole of the attachment target portion. The torsional damper is attached to one end of a shaft member. The hub includes a boss portion having an annular shape around the axis, a rim portion having an annular shape around the axis and positioned on an outer periphery of the boss portion, and a disc-shaped disc portion for connecting the boss portion and the rim portion. The pocket is provided on an outer periphery side of the boss portion in the hub.

In the sealing structure with an annular pocket and a sealing device according to one aspect of the present disclosure, the hub has an accessory ring member which is an annular member detachably attached to the boss portion of the hub, and the outer peripheral surface of the pocket is formed in the accessory ring member.

According to the sealing structure with an annular pocket and a sealing device according to the present disclosure, it is possible to suppress the seal lip of the sealing device from being exposed to foreign matter from the outside.

Furthermore, according to the sealing structure with an annular pocket and a sealing device, it is possible to efficiently suppress the seal lip of the sealing device from being exposed to foreign matter intruding from the outside.

BRIEF DESCRIPTION OF DRAWINGS

FIG. 19 (*b*) is a partially enlarged cross-sectional view showing a schematic configuration of a sealing performance test machine used for the evaluation test of sealing performance.

DETAILED DESCRIPTION

Hereinafter, embodiments of the present disclosure will be described with reference to the drawings.

Figure 1:
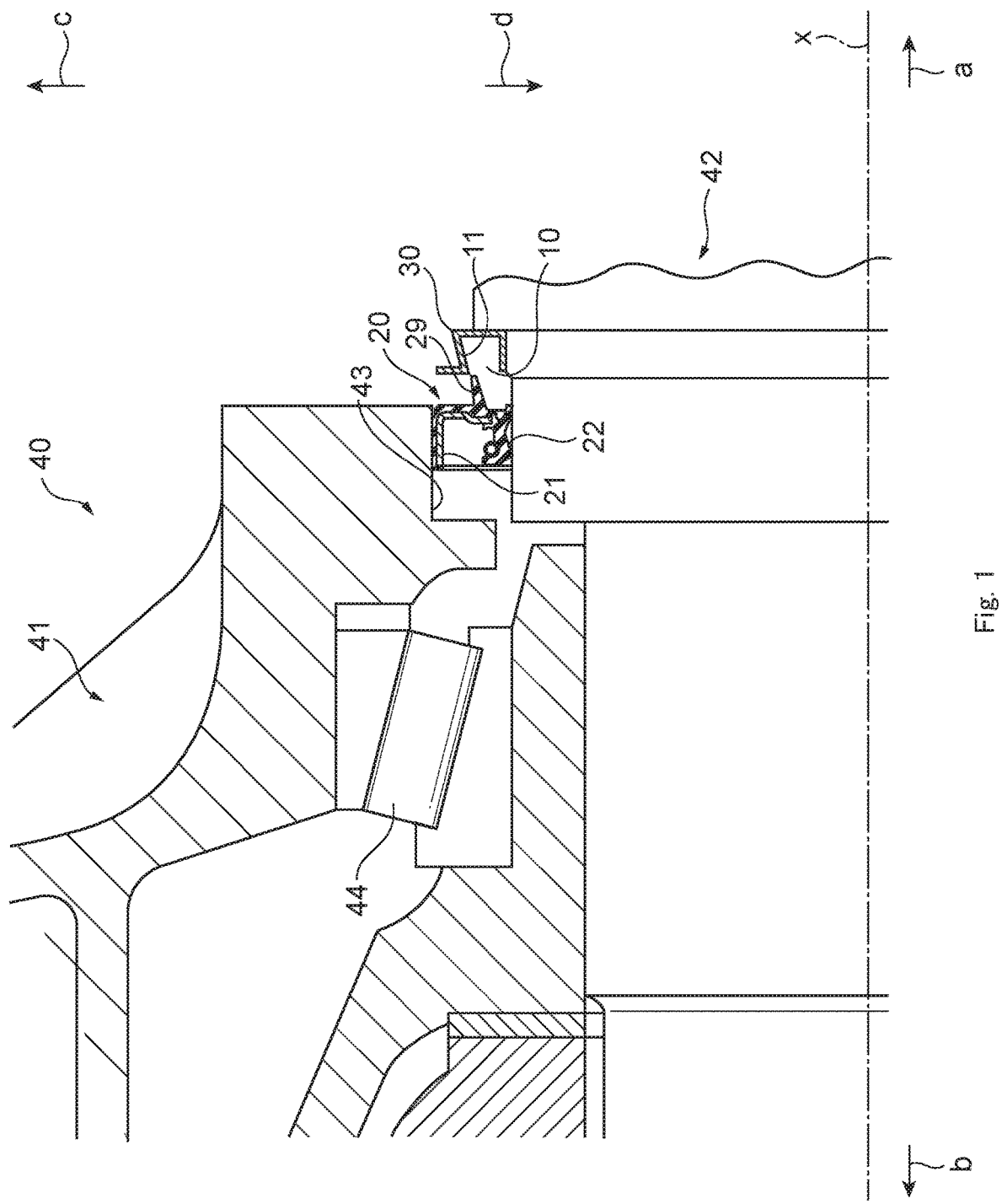
FIG. 1 is a partial cross-sectional view of a cross-section taken along an axis to show a schematic configuration of a sealing structure with an annular pocket and a sealing device according to a first embodiment of the present disclosure.
Figure 2:
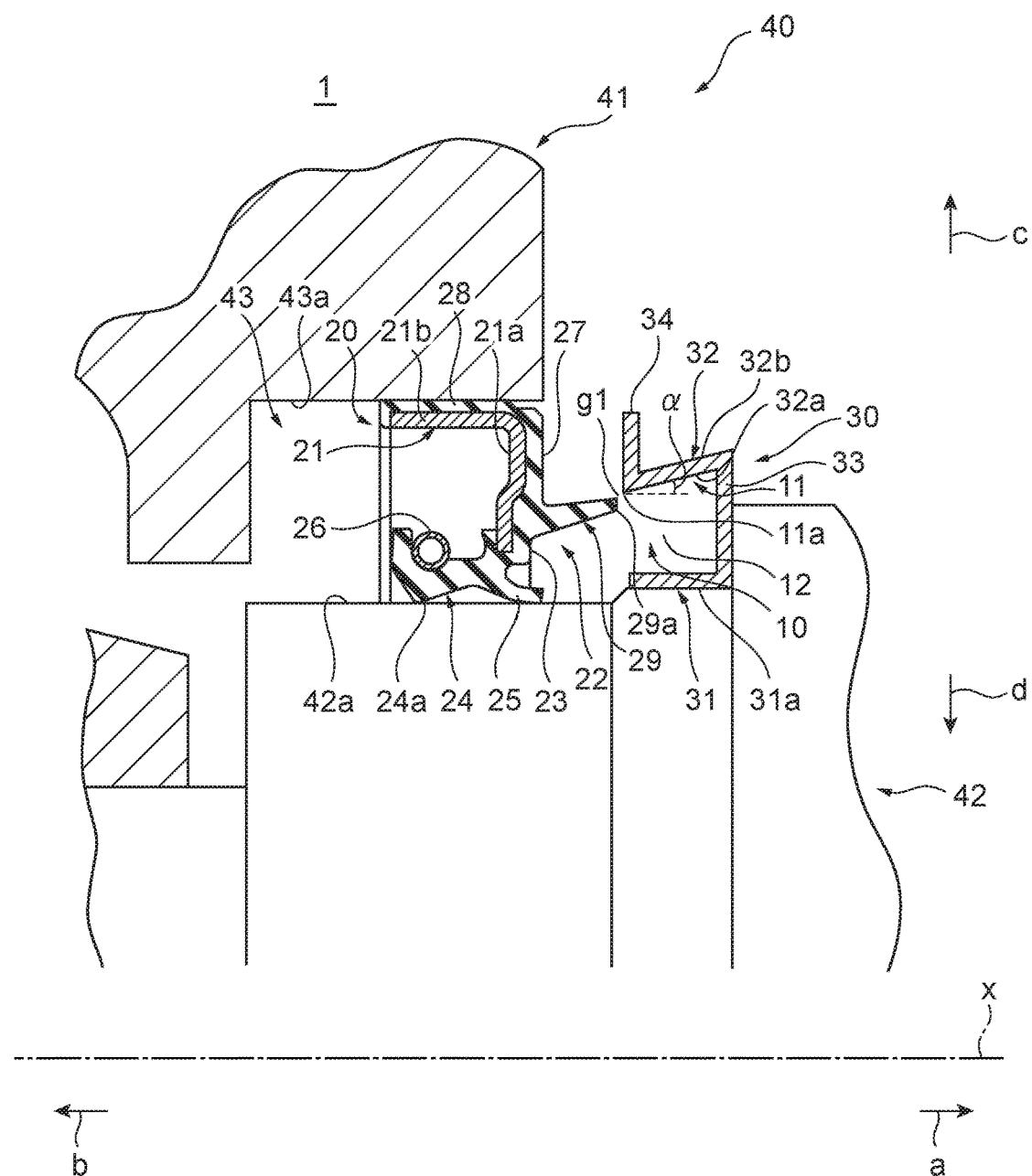
FIG. 2 is a partially enlarged cross-sectional view of the sealing structure with an annular pocket and a sealing device shown in FIG. 1.

FIG. 1 is a partially cross-sectional view of a cross-section taken along an axis to show a schematic configuration of a sealing structure with an annular pocket and a sealing device according to a first embodiment of the present disclosure (hereinafter, also merely referred to as "sealing structure"), and FIG. 2 is a partially enlarged-sectional view of the sealing structure shown in FIG. 1. Hereinafter, for the convenience of description, a direction of an arrow a (see FIG. 1) in an axis x direction (one direction in an axis direction) will be referred to as an outside, and a direction of an arrow b (see FIG. 1) in the axis x direction (the other direction in the axis direction) will be referred to as an inside. More specifically, the outside means a direction away from the inside of a case or a housing as an attachment target portion, and the inside means a direction approaching the inside of the case or the housing. In a direction vertical to the axis x (hereinafter also referred to as "radial direction"), a direction away from the axis x (a direction of an arrow c in FIG. 1) will be referred to as an outer periphery side, and a direction approaching the axis x (a direction of an arrow d in FIG. 1) will be referred to as an inner periphery side. A sealing structure 1 with an annular pocket and a sealing device according to a first embodiment of the present disclosure is applied to a differential device 40 used for a vehicle, a general-purpose machine, or the like.

As shown in FIG. 1, the differential device 40 is a conventionally well-known differential device and is provided in a vehicle or the like, and a differential mechanism (not shown) for generating a difference in output or absorbing a difference in speed between right and left driving wheels or between front and rear wheels is accommodated in the housing 41. An output shaft 42 of the differential mechanism which is shaft member connected to each of the right and left driving wheels or the front and rear wheels (axle) passes through a through-hole 43 formed in the housing 41, penetrates through the housing 41 and extends to the outside. The output shaft 42 is held in the housing 41 by a rolling bearing 44 so as to be rotatable about or substantially about the axis x. An annular gap is formed between the output shaft 42 and the through-hole 43, and a sealing device 20 is attached to this gap to seal the gap between the output shaft 42 and the through-hole 43.

The sealing structure 1 according to the first embodiment of the present disclosure includes an annular pocket 10 and a sealing device 20. In the sealing structure according to the present disclosure, the pocket is provided in a shaft member rotatable around the axis x or a functional member attached to the shaft member. In the sealing structure 1 according to the first embodiment of the present disclosure, the pocket 10 is provided in a slinger 30 as the functional member described later. As described above, the sealing device 20 is attached to the housing 41 as an attachment target portion.

The sealing device 20 includes a seal lip having an annular shape around the axis x, and a side lip having an annular shape around the axis x and extending to one side (outside) in the axis x direction. Specifically, as shown in FIGS. 1 and 2, the sealing device 20 has a metal reinforcing ring 21 in an annular shape centered or substantially centered about the axis x, and an elastic body portion 22 formed of an elastic material in an annular shape centered or substantially centered about the axis x. The elastic body portion 22 is integrally attached to the reinforcing ring 21. The metal material of the reinforcing ring 21 includes, for example, stainless steel or SPCC (cold rolled steel). The elastic material of the elastic body portion 22 includes, for example, each of various kinds of rubber material. The various kinds of rubber materials are, for example, synthetic rubbers such as nitrile rubber (NBR), hydrogenated nitrile rubber (H-NBR), acrylic rubber (ACM), fluororubber (FKM) or the like.

As shown in FIG. 2, the reinforcing ring 21 has, for example, a substantially L-shape in cross-section, and includes a disc portion 21a and a cylindrical portion 21b. The disc portion 21a is a hollow disc-shaped portion extending in a direction perpendicular or substantially perpendicular to the axis x, and the cylindrical portion 21b is a cylindrical portion extending inward in the axis x direction from an end portion on the outer periphery side of the disc portion 21a.

The elastic body portion 22 is attached to the reinforcing ring 21, and is formed integrally with the reinforcing ring 21 so as to cover the reinforcing ring 21 from the outside and the outer periphery side in the present embodiment. The elastic body portion 22 includes a lip waist portion 23, a seal lip 24, and a dust lip 25. As shown in FIG. 2, the lip waist portion 23 is a portion positioned in the vicinity of an end portion on the inner periphery side of the disc portion 21a of the reinforcing ring 21, and the seal lip 24 is a portion extending inward from the lip waist portion 23, and is arranged to face the cylindrical portion 21b of the reinforcing ring 21. The dust lip 25 extends from the lip waist portion 23 toward the axis x direction.

The seal lip 24 has, at an inner end portion thereof, an annular lip tip end portion 24a having a wedge shape whose cross-sectional shape is convex to the inner periphery side. As described later, the lip tip end portion 24a is formed so as to be in contact with the outer peripheral surface 42a so that the outer peripheral surface 42a which is a surface on the outer periphery side of the output shaft 42 is slidable, and seals the gap between the lip tip end portion 24a and the output shaft 42. Furthermore, a garter spring 26 for pressing the seal lip 24 toward the inner peripheral side in the radial direction is fitted to the outer peripheral portion side of the seal lip 24.

The dust lip 25 is a part extending from the lip waist portion 23, and extends to the outside and the inner periphery side. The dust lip 25 aims to prevent intrusion of foreign matter in a direction toward the lip tip end portion 24a under a usage state.

Furthermore, the elastic body portion 22 includes a rear cover 27 and a gasket portion 28. The rear cover 27 covers the disc portion 21a of the reinforcing ring 21 from the outside, and the gasket portion 28 covers the cylindrical portion 21b of the reinforcing ring 21 from the outer periphery side.

Furthermore, the sealing device 20 is provided with a side lip 29 in an annular shape around the axis x, which extends to one side (the direction to the outside) in the axis x direction. Details of the side lip 29 will be described later.

The reinforcing ring 21 is manufactured by, for example, press working or forging, and the elastic body portion 22 is molded by cross-linking (vulcanization) molding using a mold. In this cross-linking molding, the reinforcing ring 21 is placed in the mold, the elastic body portion 22 is adhesively bonded to the reinforcing ring 21 by a crosslinking (vulcanization) bonding, so that the elastic body portion 22 is molded integrally with the reinforcing ring 21.

As described above, the sealing device 20 seals a gap formed between the through-hole 43 of the housing 41 and the output shaft 42. Specifically, the sealing device 20 is press-fitted into the through-hole 43 of the housing 41 to be attached, and a gasket portion 28 of the elastic body portion 22 is compressed to be brought into liquid-tight contact with an inner peripheral surface 43a which is a surface on the inner periphery side of the through-hole 43. As a result, the gap between the sealing device 20 and the through-hole 43 of the housing 41 is hermetically sealed. In addition, the lip tip end portion 24a of the seal lip 24 comes in liquid-tight contact with the outer peripheral surface 42a of the output shaft 42, whereby the gap between the sealing device 20 and the output shaft 42 is hermetically sealed.

The slinger 30 is a member in an annual shape around the axis x and is formed so as to be fitted to the output shaft 42. Specifically, the slinger 30 is a member made of metal, for example, stainless steel excellent in rust prevention, and as shown in FIG. 2, the slinger 30 includes an inner peripheral tubular portion 31 in a cylindrical shape annular around the axis x and extending along the axis x, an outer peripheral tubular portion 32 in a cylindrical shape annular around the axis x and extending along the axis x, and a bottom portion 33 expanding between an outer end portion of the inner peripheral tubular portion 31 and an outer end portion of the outer peripheral tubular portion 32.

The pocket 10 has an outer peripheral surface 11 which is a peripheral surface in an annular shape around the axis x extending along the annular axis x around the axis x, and forms a recessed part 12. The recessed part 12 is a portion recessed to the outside (one side) in the axis x direction, and is formed in an annular shape around the axis x. The outer peripheral surface 11 is increased in diameter toward one side (outside, the direction of the arrow a) in the axis x direction.

Specifically, as shown in FIG. 2, in the slinger 30, the inner peripheral tubular portion 31 is a portion in a cylindrical shape centered or substantially centered about the axis x, and is formed to be fittable to the outer peripheral surface 42a of the output shaft 42 at an inner peripheral surface 31a which is a peripheral surface on the inner periphery side. That is, the diameter of the inner peripheral surface 31a of the inner peripheral tubular portion 31 is set to be smaller than the diameter of the outer peripheral surface 42a of the output shaft 42, and the slinger 30 is formed to be tightly fitted to the output shaft 42 at the inner peripheral tubular portion 31. The outer peripheral tubular portion 32 faces the inner peripheral tubular portion 31 on the outer periphery side, and is a part in a tapered shape centered or substantially centered about the axis x, and the inner peripheral surface 32a which is a peripheral surface on the inner periphery side of the outer peripheral tubular portion 32 is formed so as to increase in diameter toward the outside (the direction of the arrow a) in the axis x direction. The bottom portion 33 is a part in a disc-shape centered or substantially centered about the axis x.

The slinger 30 is arranged on the outside of the dust lip 25 of the sealing device 20 at the output shaft 42 of the differential device 40. As shown in FIG. 2, it is preferable that the output shaft 42 is shaped such that a part of the outer peripheral surface 42a to which the slinger 30 is fitted is larger in diameter than a seal surface as a part of the outer peripheral surface 42a which the lip tip end portion 24a of the seal lip 24 contacts and the dust lip 25 contacts or faces in the radial direction, and projects to the outer periphery side. This is because it is possible to reduce inconvenience of scratching the outer peripheral surface 42a of the output shaft 42 when the slinger 30 is fitted to the output shaft 42.

Furthermore, the slinger 30 has a flange portion 34 which is an annular portion extending from an inner end portion of the outer peripheral tubular portion 32 in the outer peripheral direction. As shown in FIG. 2, for example, the flange portion 34 has a shape of a hollow disc centered or substantially centered about the axis x. As described later, this flange portion 34 makes it possible to block foreign matter that is to intrude into the inside through the outer peripheral tubular portion 32 of the slinger 30. The slinger 30 may not have the flange portion 34.

Next, the pocket 10 and the side lip 29 of the sealing device 20 will be described with reference to FIG. 2.

The pocket 10 is formed in the slinger 30, and the recessed part 12 of the pocket 10 is defined by the inner peripheral tubular portion 31, the outer peripheral tubular portion 32, and the bottom portion 33 of the slinger 30, and the outer peripheral surface 11 of the pocket 10 is formed in the outer peripheral tubular portion 32 of the slinger 30. More specifically, the outer peripheral tubular portion 32 of the slinger 30 has the outer peripheral surface 11 of the pocket 10, and the outer peripheral surface 11 of the pocket 10 is formed by the inner peripheral surface 32a of the outer peripheral tubular portion 32 of the slinger 30, and the outer peripheral surface 11 of the pocket 10 is the inner peripheral surface 32a of the outer peripheral tubular portion 32 of the slinger 30.

As described above, the outer peripheral surface 11 of the pocket 10 increases in diameter toward the outside (the direction of the arrow a) in the axis x direction, and the outer peripheral surface 11 of the pocket 10 is an annular surface expanding to the outer periphery side toward the outside in the axis x direction, for example, is a tapered surface having a substantially conical surface shape. A diameter-increasing angle α which is an angle of the diameter-increasing outer peripheral surface 11 of the pocket 10 with respect to the axis x is set to a predetermined value. Specifically, the diameter-increasing angle α is an angle between the axis x (a straight line parallel to the axis x) and the outer peripheral surface 11 in the cross-section as shown in FIG. 2. The diameter-increasing angle α of the outer peripheral surface 11 of the pocket 10 is an angle larger than 0°, preferably from not less than 4° to not more than 18°, more preferably from not less than 5° to not more than 16°, and still more preferably from not less than 7° to not more than 15°. As described above, the outer peripheral surface 11 of the pocket 10 is inclined to the outer periphery side by the diameter-increasing angle α with respect to the axis x.

As shown in FIG. 2, the side lip 29 of the sealing device 20 extends in the outward direction, more specifically, extends in parallel to the axis x or obliquely to the axis x in the outward direction and the outer peripheral direction. An outer end 29a which is an outer end portion of the side lip 29 is located on an inner periphery side in the radial direction than an inner end 11a which is an inner end portion of the outer peripheral surface 11 of the pocket 10, and does not enter into the inside of the pocket 10 in the x direction (outward direction). That is, the side lip 29 of the sealing device 20 and the outer peripheral surface 11 of the pocket 10 do not overlap each other in the radial direction.

As described above, an annular gap g1 is formed between the outer end 29a of the side lip 29 and the inner end 11a of the outer peripheral surface 11 of the pocket 10 by the side lip 29 and the pocket 10.

The annular gap g1 formed by the outer end 29a of the side lip 29 and the inner end 11a of the outer peripheral surface 11 of the pocket 10 forms a labyrinth seal. Therefore, even when foreign matter such as muddy water, sand, dust or the like intrudes from the outside of the differential device 40, the intruding foreign matter is suppressed from further intruding to the seal lip 24 side by the labyrinth seal (gap g1) formed by the side lip 29 and the pocket 10. As a result, it is possible to suppress the seal lip 24 of the sealing device 20 from being exposed to foreign matter intruding from the outside as described above. Therefore, it is possible to suppress the lip tip end portion 24a from biting foreign matter and thus being damaged or deteriorated, thereby suppressing deterioration of the sealing performance of the sealing device 20 which causes leakage of the lubricant. Furthermore, it is also possible to suppress the lip tip end portion 24a from biting foreign matter and thus being damaged or deteriorated, thereby suppressing foreign matter from intruding into the differential device 40 from the outside of the differential device 40.

Furthermore, since the outer peripheral surface 11 of the pocket 10 forming the labyrinth seal (the gap g1) has a shape which increases in diameter toward the outside as described above, it is possible to more effectively suppress further intrusion of foreign matter to the seal lip 24 side at the labyrinth seal g1.

Since the outer peripheral surface 11 of the pocket 10 forming the labyrinth seal (the gap g1) has a shape which increases in diameter toward the outside at the predetermined diameter-increasing angle α as described above, it is possible to more effectively suppress foreign matter from further intruding to the seal lip 24 side at the labyrinth seal g1.

Furthermore, the slinger 30 has the flange portion 34, and an outer peripheral surface 32b (see FIG. 2) which is a surface on the outer periphery side of the outer peripheral tubular portion 32 connected to an end portion on the inner periphery side of the flange portion 34 forms an annular surface which expands to the outer periphery side toward the outside in the axial line x direction, for example, a tapered surface having a conical surface shape. Therefore, it is possible to accumulate foreign matter intruding from the outside of the differential device 40 between the outer peripheral tubular portion 32 and the flange portion 34 of the slinger 30 and suppress the foreign matter from reaching the sealing device 20. Furthermore, the foreign matter accumulated between the outer peripheral tubular portion 32 and the flange portion 34 can be discharged downward due to its own weight or by rotation of the slinger 30.

The slinger 30 may not have the flange portion 34. In this case, it is preferable that the outer peripheral surface 32b of the outer peripheral tubular portion 32 of the slinger 30 is an annular surface which narrows (decreases in diameter) to the inner periphery side toward the outside in the axis x direction. In this case, it is possible to make it difficult for foreign matter to move to the sealing device 20 side through the outer peripheral tubular portion 32 of the slinger 30. Also in this case, as described above, the outer peripheral surface 11 of the pocket 10 is a surface which increases in diameter toward the outside in the axis x direction.

As described above, the sealing structure 1 with an annular pocket and a sealing device according to the first embodiment of the present disclosure can suppress the seal lip 24 of the sealing device 20 from being exposed to foreign matter intruding from the outside of the differential device 40.

The shape of the slinger 30 is not limited to the above-described shape. For example, the inner peripheral tubular portion 31 may extend inward beyond the lip tip end portion 24a of the seal lip 24 in the axis x direction. In this case, the inner peripheral tubular portion 31 of the slinger 30 forms a seal portion. Furthermore, in this case, it is preferable that the outer peripheral surface 42a of the output shaft 42 does not have any step difference as described above and has a uniform diameter over a portion to which the inner peripheral tubular portion 31 of the slinger 30 is fitted.

Next, a sealing structure 1' with an annular pocket and a sealing device according to a second embodiment of the present disclosure will be described. The sealing structure 1' according to the second embodiment of the present disclosure is different from the sealing structure 1 according to the first embodiment of the present disclosure only in the shape of the annular gap formed by the side lip 29 and the outer peripheral surface 11 of the pocket 10. Hereinafter, with respect to configurations having the same or similar functions as those of the sealing structure 1 according to the first embodiment of the present disclosure described above, description on these configurations will be omitted while they are represented by the same reference signs, and only different configurations will be described.

Figure 3:
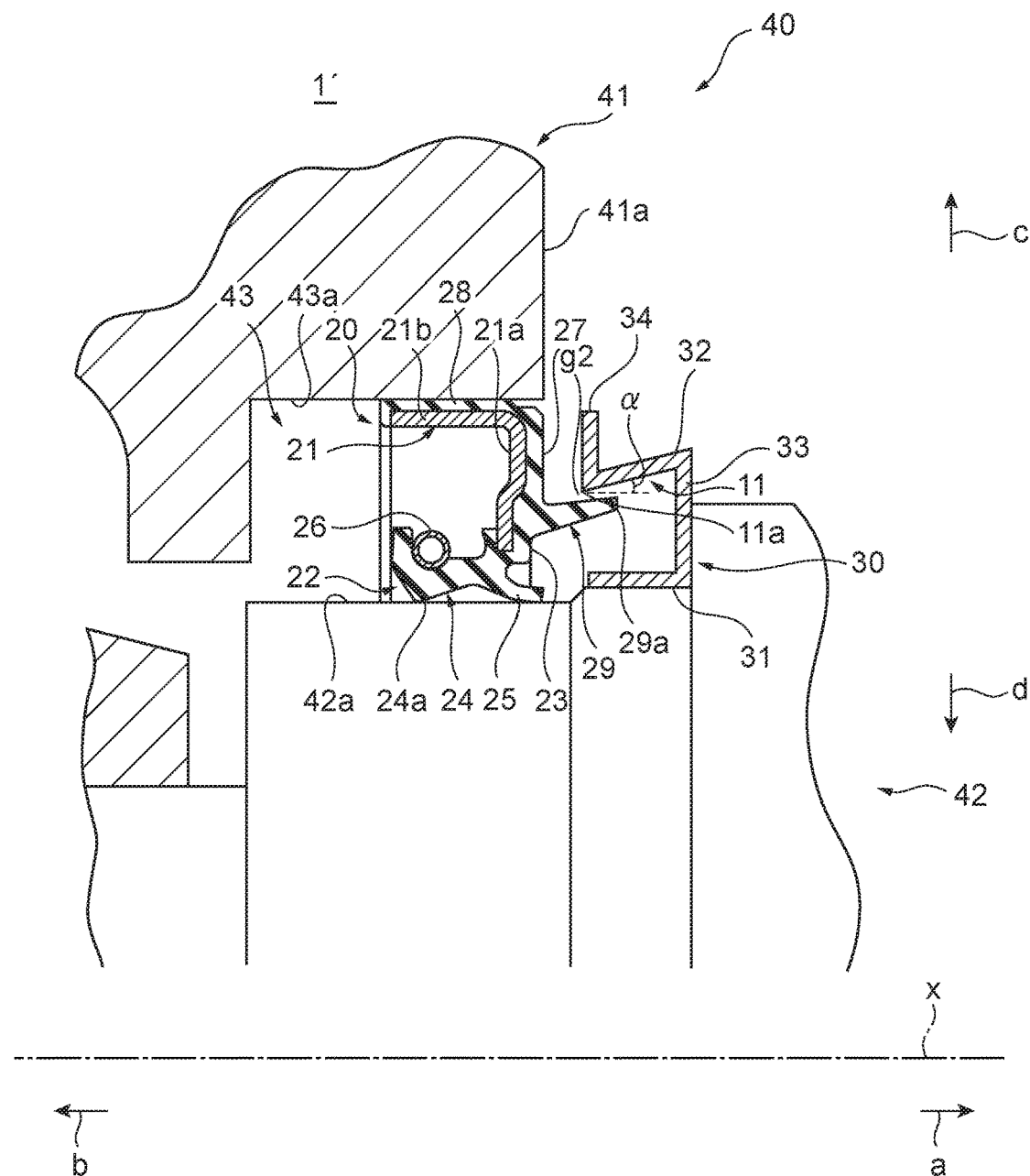
FIG. 3 is a partially enlarged cross-sectional view of a cross-section taken along an axis to show a schematic configuration of a sealing structure with an annular pocket and a sealing device according to a second embodiment of the present disclosure.

FIG. 3 is a partially enlarged cross-sectional view of a cross-section taken along the axis to show a schematic configuration of the sealing structure 1' according to the second embodiment of the present disclosure. As shown in FIG. 3, a portion on the outer end 29a side of the side lip 29 of the sealing device 20 enters into the pocket 10, and the side lip 29 and the outer peripheral surface 11 of the pocket 10 overlap each other in the radial direction over the axis x direction. That is, the side lip 29 and the outer peripheral surface 11 of the pocket 10 face each other in the radial direction, and form an annular gap g2 between the side lip 29 and the outer peripheral surface 11 of the pocket 10. That is, the side lip 29 and the outer peripheral surface 11 of the pocket 10 overlap each other.

The annular gap g2 formed by the side lip 29 and the outer peripheral surface 11 of the pocket 10 forms a labyrinth seal. Therefore, like the above-described sealing structure 1, the sealing structure 1' can prevent foreign matter intruding from the outside of the differential device 40 from further intruding to the seal lip 24 side. As a result, it is possible to suppress the seal lip 24 of the sealing device 20 from being exposed to the foreign matter intruding from the outside, and it is possible to suppress that the lip tip end portion 24a bites the foreign matter and thus is damaged or deteriorated, and the sealing performance of the sealing device 20 deteriorates to cause leakage of lubricant. Furthermore, it is also possible to suppress that the lip tip end portion 24a bites the foreign matter and thus is damaged or deteriorated to cause the foreign matter to intrude from the outside of the differential device 40 into the differential device 40.

Furthermore, the sealing performance of the gap g2 as the labyrinth seal is more enhanced as the overlapping (overlap) range between the side lip 29 and the outer peripheral surface 11 of the pocket 10 over the axial x direction is broader.

In the sealing structure 1', it is possible to narrow the gap between the flange portion 34 of the slinger 30 and the rear cover 27 of the elastic body portion 22 of the sealing device 20, which makes it difficult for foreign matter to pass through this gap. Therefore, in addition to the function of the labyrinth seal g2, it is possible to suppress foreign matter from intruding to the seal lip 24 side. It is to be noted that by extending the length of the flange portion 34 of the slinger 30 in the radial direction, the gap between the flange portion 34 and the rear cover 27 of the elastic body portion 22 can be extended to an outer surface 41a which is a surface on the outside of the housing 41, and intrusion of the foreign matter to the seal lip 24 side can be further suppressed.

As described above, the sealing structure 1' with an annular pocket and a sealing device according to the second embodiment of the present disclosure can suppress the seal lip 24 of the sealing device 20 from being exposed to foreign matter intruding from the outside of the differential device 40 as in the case of the sealing structure 1 according to the first embodiment of the present disclosure.

Figure 4:
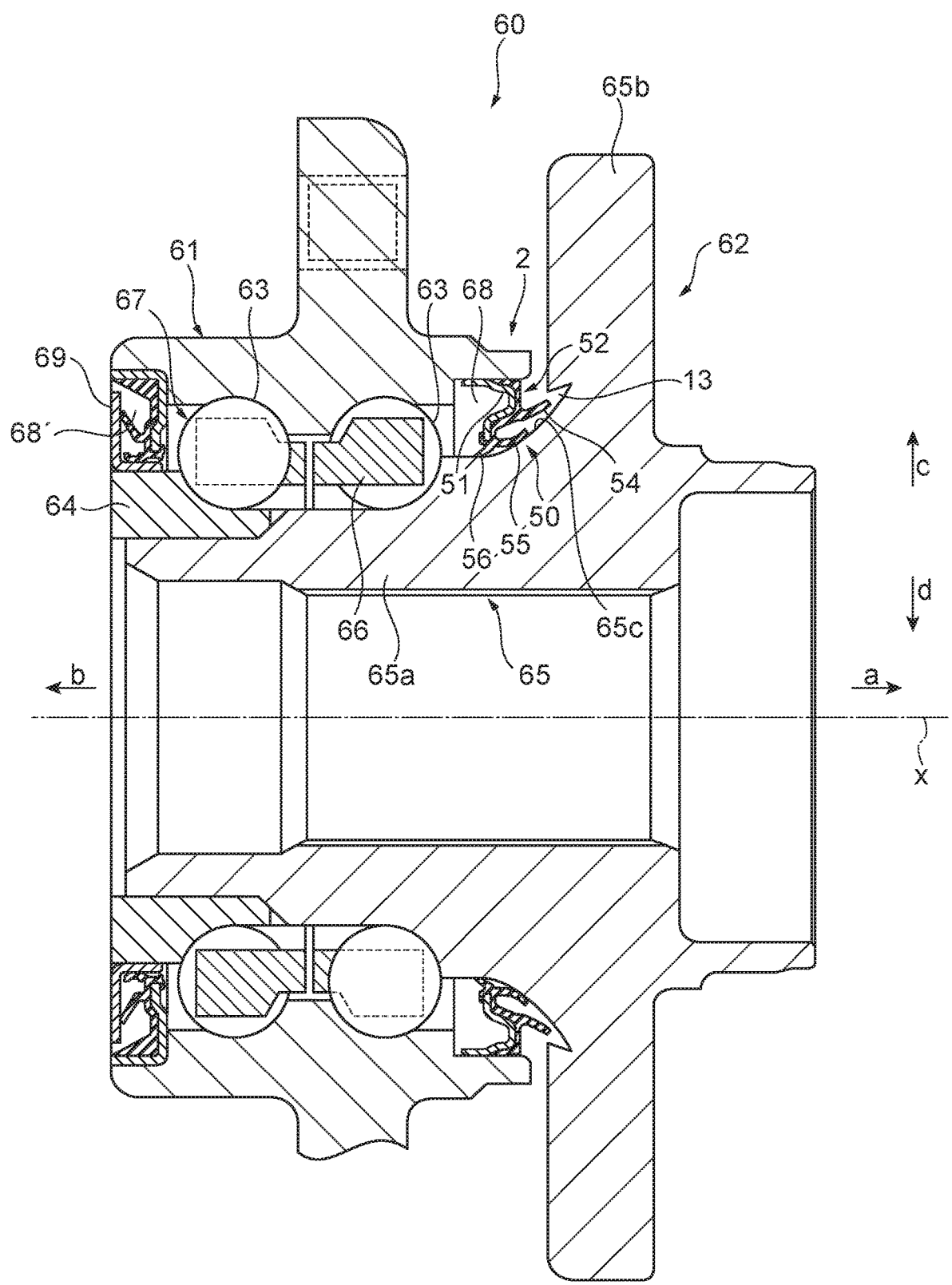
FIG. 4 is a partial cross-sectional view of a cross-section taken along an axis to show a schematic configuration of a sealing structure with an annular pocket and a sealing device according to a third embodiment of the present disclosure.
Figure 5:
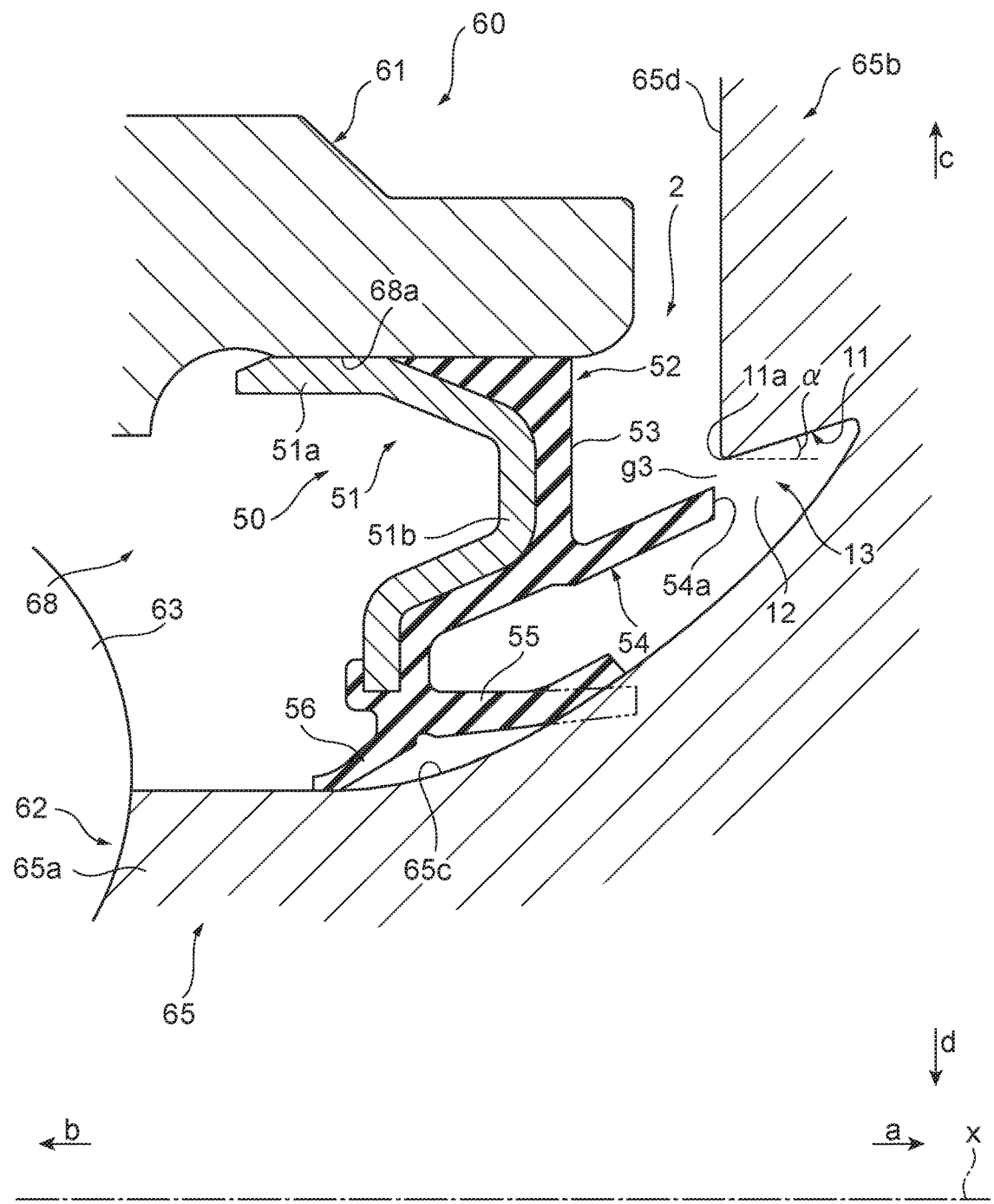
FIG. 5 is a partially enlarged sectional view of the sealing structure with an annular pocket and a sealing device shown in FIG. 4.

Next, a sealing structure with an annular pocket and a sealing device according to a third embodiment of the present disclosure will be described. FIG. 4 is a partial cross-sectional view of a cross-section taken along the axis to show a schematic configuration of a sealing structure 2 with an annular pocket and a sealing device according to the third embodiment of the present disclosure, and FIG. 5 is a partially enlarged cross-sectional view of the sealing structure 2 shown in FIG. 4. The sealing structure 2 according to the third embodiment of the present disclosure includes a pocket 13 and a sealing device 50, and is applied to a hub bearing 60 used for a vehicle, a general-purpose machine, or the like.

As shown in FIG. 4, the hub bearing 60 is a conventionally well-known hub bearing and provided in a vehicle or the like, and rotatably supports a wheel in an axle or a suspension device. Specifically, as shown in FIG. 4, the hub bearing 60 includes an outer ring 61 in an annular shape centered or substantially centered about the axis x serving as an attachment target portion, a hub 62 as a shaft member which is relatively rotatable with respect to the outer ring 61, partially enclosed by the outer ring 61 and centered or substantially centered about the axis x, and plural bearing balls 63 arranged between the outer ring 61 and the hub 62. Under a usage state of the hub bearing 60 attached to a vehicle or the like, the outer ring 61 is fixed, and the hub 62 is rotatable relatively to the outer ring 61. Specifically, the hub 62 includes an inner ring 64 and a hub ring 65, and the hub ring 65 has a tubular or substantially tubular shaft portion 65a extending along the axis x, and a wheel-mounting flange 65b. The wheel-mounting flange 65b is a portion which expands in a disc shape from one end of the shaft portion 65a (an outer end portion in the hub bearing 60) to the outer periphery side, and to which a wheel (not shown) is attached by plural hub bolts. The shaft portion 65a and the wheel-mounting flange 65b are smoothly connected to each other on the inside, and a transition portion 65c, which is a portion where the shaft portion 65a and the wheel-mounting flange 65b are connected to each other inside, has a contour drawing a smooth curved line having a circular arc shape or an arcuate shape in a cross-section along the axis x. The inner ring 64 is fitted to an inner end portion of the shaft portion 65a of the hub ring 65 (a side in the direction of the arrow b) so as to hold the bearing balls 63 in the space between the outer ring 61 and the inner ring 64. In the space between the outer ring 61 and the inner ring 64, the bearing balls 63 are held by a retainer 66.

The outer ring 61 has a through-hole 67 extending in the axis x direction. The shaft portion 65a of the hub ring 65 of the hub 62 is inserted into the through-hole 67, and an annular space extending along the axis x direction is formed between the shaft portion 65a and the through-hole 67. As described above, the bearing balls 63 are accommodated and held by the retainer 66 in this space, and lubricant is coated or injected. The sealing device 50 is attached to an outer opening 68 which is an opening through which a space between the shaft portion 65a and the through-hole 67 is opened outside (a side in the direction of the arrow a), and another sealing device 69 is attached to an inner opening 68' which is an opening through which a space between the shaft portion 65a and the through-hole 67 is opened inside (a side in the direction of the arrow b). The space between the shaft portion 65a and the through-hole 67 is sealed by the sealing devices 50 and 69, and internal lubricant can be prevented from leaking to the outside, and intrusion of foreign matter from the outside into the inside. The sealing device 69 is a conventionally well-known sealing device, and detailed description thereof will be omitted.

As described above, the sealing structure 2 according to the third embodiment of the present disclosure includes the annular pocket 13 and the sealing device 50. In the sealing structure 2 according to the third embodiment of the present disclosure, the pocket 13 is provided in the hub 62 as the shaft member. As described above, the sealing device 50 is attached to the outer ring 61 as the attachment target portion.

The sealing device 50 includes an annular seal lip around the axis x, and a side lip in an annular shape around the axis x and extending to one side (outside) in the axis x direction. Specifically, as shown in FIGS. 4 and 5, the sealing device 50 includes a metal reinforcing ring 51 in a annular shape centered or substantially centered about the axis x, and an elastic body portion 52 formed of an elastic material in an annular shape centered or substantially centered about the axis x. The elastic body portion 52 is attached integrally to the reinforcing ring 51. Like the reinforcing ring 21, for example, stainless steel or SPCC (cold rolled steel) is used as the metal material of the reinforcing ring 51. Like the elastic body portion 22, for example, various kinds of rubber materials are used as the elastic material of the elastic body portion 52. As the various kinds of rubber materials are used, for example, synthetic rubbers such as nitrile rubber (NBR), hydrogenated nitrile rubber (H-NBR), acrylic rubber (ACM), or fluororubber (FKM).

As shown in FIG. 5, the reinforcing ring 51 includes, for example, a cylindrical tubular portion 51a positioned on the outer periphery side, and a disc-shaped disc portion 51b extending from an outer end portion of the tubular portion 51a to the inner periphery side. More specifically, as shown in FIG. 5, the disc portion 51b is formed so as to have a portion projecting outward, and a portion extending from the portion projecting outward to the inner periphery. The tubular portion 51a of the reinforcing ring 51 is formed so as to be closely fitted to the inner peripheral surface 68a at the outer opening 68 of the outer ring 61, and is formed to be capable of being tightly fitted to the outer opening 68.

The elastic body portion 52 is attached to the reinforcing ring 51, and is integrally formed with the reinforcing ring 51 so as to cover the reinforcing ring 51 from the outside in the present embodiment. The elastic body portion 52 has a base body portion 53, and includes an outer periphery side lip 54 and an inner periphery side lip 55 as the side lip which are parts extending from the base body portion 53, and a radial lip 56 as the seal lip.

The base body portion 53 is a part attached to the disc portion 51b of the reinforcing ring 51 from the outside, and expands over the entire outer surface of the disc portion 51b. The inner periphery side lip 55 is positioned on the inner periphery side than the outer periphery side lip 54, and extends outward from the base body portion 53 in an annular shape centered or substantially centered about the axis X. In the hub bearing 60, the inner periphery side lip 55 is in contact with the transition portion 65*c* of the hub ring 65 with a predetermined interference at the tip end portion thereof in a manner that the hub ring 65 is slidable, thereby performing sealing between the sealing device 50 and the transition portion 65*c*. Further, the radial lip 56 extends from the base body portion 53 to the inside and the inner periphery side in an annular shape centered or substantially centered about the axis. The radial rip 56 is in contact with the transition portion 65*c* of the hub ring 65 with a predetermined interference at the tip end portion of the radial lip 56 in a manner that the hub ring 65 is slidable, thereby performing sealing between the sealing device 50 and the transition portion 65*c*. The radial lip 56 may be in contact with, not the transition portion 65*c* of the hub ring 65, but the shaft portion 65*a* of the hub ring 65. Both the inner periphery side lip 55 and the radial lip 56 extend from an end portion on the inner periphery side of the base body portion 53, and the radial lip 56 extends from the base body portion 53 inside the inner periphery side lip 55.

The radial lip 56 is in contact with the hub ring 65 as described above, whereby lubricant in the space where the bearing balls 63 are accommodated between the shaft portion 65*a* of the hub ring 65 and the through-hole 67 of the outer ring 61 is prevented from leaking to the outside. In addition, the inner periphery side lip 55 is in contact with the hub ring 65 as described above, whereby foreign matter such as muddy water, sand, dust or the like is prevented from intruding from the outside to the radial lip 56 side.

The outer periphery side lip 54 is an annular lip around the axis x which is positioned on the outer periphery side than the inner periphery side lip 55, and extends to one side (the outward direction, the direction of the arrow a) in the axis x direction. Details of the outer periphery side lip 54 will be described later.

The reinforcing ring 51 is manufactured by, for example, press working or forging, and the elastic body portion 52 is formed by cross-linking (vulcanization) molding using a mold. In this cross-linking molding, the reinforcing ring 51 is placed in the mold, the elastic body portion 52 is adhesively bonded to the reinforcing ring 51 by crosslinking (vulcanization) bonding, whereby the elastic body portion 52 is molded integrally with the reinforcing ring 51.

Like the pocket 10 of the sealing structure 1, the pocket 13 has an outer peripheral surface 11 which is a peripheral surface in an annular shape around the axis x and extending along the axis x, and forms a recessed part 12. The recessed part 12 is a portion recessed to the outside (one side) in the direction of the axis x, and is formed annularly around the axis x. The outer peripheral surface 11 increases in diameter toward the outside (the direction of the arrow a) in the axis x direction.

Next, the pocket 13 and the outer periphery side lip 54 of the sealing device 50 will be described with reference to FIG. 5.

As shown in FIG. 5, the pocket 13 is a part which is formed at an end portion on the outer periphery side of the transition portion 65*c* or on the outer periphery side than the transition portion 65*c* in the hub ring 65 of the hub 62, extends in an annular shape centered or substantially centered about the axis x and is recessed to the outside at the transition portion 65*c* or an inner surface 65*d* which is an inner surface of the wheel-mounting flange 65*b*. As described above, the pocket 13 forms the recessed part 12, and the recessed part 12 is defined by the outer peripheral surface 11, a part of the transition portion 65*c* in the hub ring 65 or a peripheral surface continuing outwards from the transition portion 65*c*.

As described above, the outer peripheral surface 11 of the pocket 13 is a annular surface which increases in diameter toward the outside (the direction of the arrow a) in the axis x direction, and expands to the outer periphery side toward the outside in the axis x direction, and for example, is a tapered surface having a substantially conical shape. The diameter-increasing angle $\alpha$, which is an angle of the diameter-increasing outer peripheral surface 11 of the pocket 13 with respect to the axis x, is set to a predetermined value. Specifically, as shown in FIG. 5, the diameter-increasing angle $\alpha$ is an angle between the axis x (a straight line parallel to the axis x) and the outer peripheral surface 11 in cross-section. The diameter-increasing angle $\alpha$ of the outer peripheral surface 11 of the pocket 13 is an angle larger than 0°, preferably from not less than 4° to not more than 18°, more preferably from not less than 5° to not more than 16°, and still more preferably from not less than 7° to not more than 15°. As described above, the outer peripheral surface 11 of the pocket 13 is inclined to the outer periphery side by the diameter-increasing angle $\alpha$ with respect to the axis x.

As shown in FIG. 5, the outer periphery side lip 54 of the sealing device 50 extends in the outward direction, more specifically, extends in parallel to the axis x or extends obliquely with respect to the axis x in the outward direction and the outer peripheral direction. Furthermore, an outer end 54*a* which is an end portion on the outside of the outer periphery side lip 54 is positioned on the inner periphery side than an inner end 11*a* of the outer peripheral surface 11 of the pocket 13 in the radial direction, and also does not enter into the inside of the pocket 13 in the axis x direction (outward direction). That is, the outer periphery side lip 54 of the sealing device 50 and the outer peripheral surface 11 of the pocket 13 do not overlap each other in the radial direction.

As described above, an annular gap g3 is formed between the outer end 54*a* of the outer periphery side lip 54 and the inner end 11*a* of the outer peripheral surface 11 of the pocket 13 by the outer periphery side lip 54 and the pocket 13.

The annular gap g3 formed by the outer end 54*a* of the outer periphery side lip 54 and the inner end 11*a* of the outer peripheral surface 11 of the pocket 13 forms a labyrinth seal. Therefore, even when foreign matter such as muddy water, sand or dust intrudes from the outside of the hub bearing 60, the intruding foreign matter is suppressed from further intruding to the radial lip 56 side by the labyrinth seal (gap g3) formed by the outer periphery side lip 54 and the pocket 13. As a result, it is possible to suppress the radial lip 56 and the inner periphery side lip 55 of the sealing device 50 from being exposed to foreign matter intruding from the outside as described above. Therefore, it can be suppressed that the radial lip 56 bites foreign matter at the tip end portion thereof and thus is damaged or deteriorated, so that the sealing performance of the sealing device 50 deteriorates to cause leakage of lubricant. Furthermore, it can be also suppressed that the radial lip 56 and the inner periphery side lip 55 bite foreign matter and thus is damaged or deteriorated, thereby causing foreign matter to intrude from the outside of the hub bearing 60 into the hub bearing 60.

Furthermore, as described above, since the outer peripheral surface 11 of the pocket 13 forming the labyrinth seal (the gap g3) has a shape which increases in diameter toward the outside, foreign matter can be more effectively suppressed from further intruding to the radial lip 56 side at the labyrinth seal g3.

When the outer peripheral surface 11 of the pocket 13 forming the labyrinth seal (the gap g3) has a shape which increases in diameter at the predetermined diameter-increasing angle α toward the outside as described above, foreign matter can be more effectively suppressed from further intruding to the radial lip 56 side at the labyrinth seal g3.

As described above, the sealing structure 2 with an annular pocket and a sealing device according to the third embodiment of the present disclosure can suppress the radial lip 56 and the inner periphery side lip 55 of the sealing device 50 from being exposed to foreign matter intruding from the outside of the hub bearing 60.

It is to be noted that the shape of the recessed part 12 of the pocket 13 is not limited to the above-described shape, and may be other shapes such as a rectangular shape in cross-section. However, the pocket 13 necessarily has the outer peripheral surface 11.

Next, a sealing structure 2' with an annular pocket and a sealing device according to a fourth embodiment of the present disclosure will be described. The sealing structure 2' according to the fourth embodiment of the present disclosure is different from the sealing structure 2 according to the above-described third embodiment of the present disclosure in only the shape of the annular gap formed by the outer periphery side lip 54 and the outer peripheral surface 11 of the pocket 13. Hereinafter, with respect to configurations having the same or similar functions as those of the sealing structure 2 according to the third embodiment of the present disclosure, description on these configurations will be omitted while they are represented by the same reference signs, and only different configurations will be described.

Figure 6:
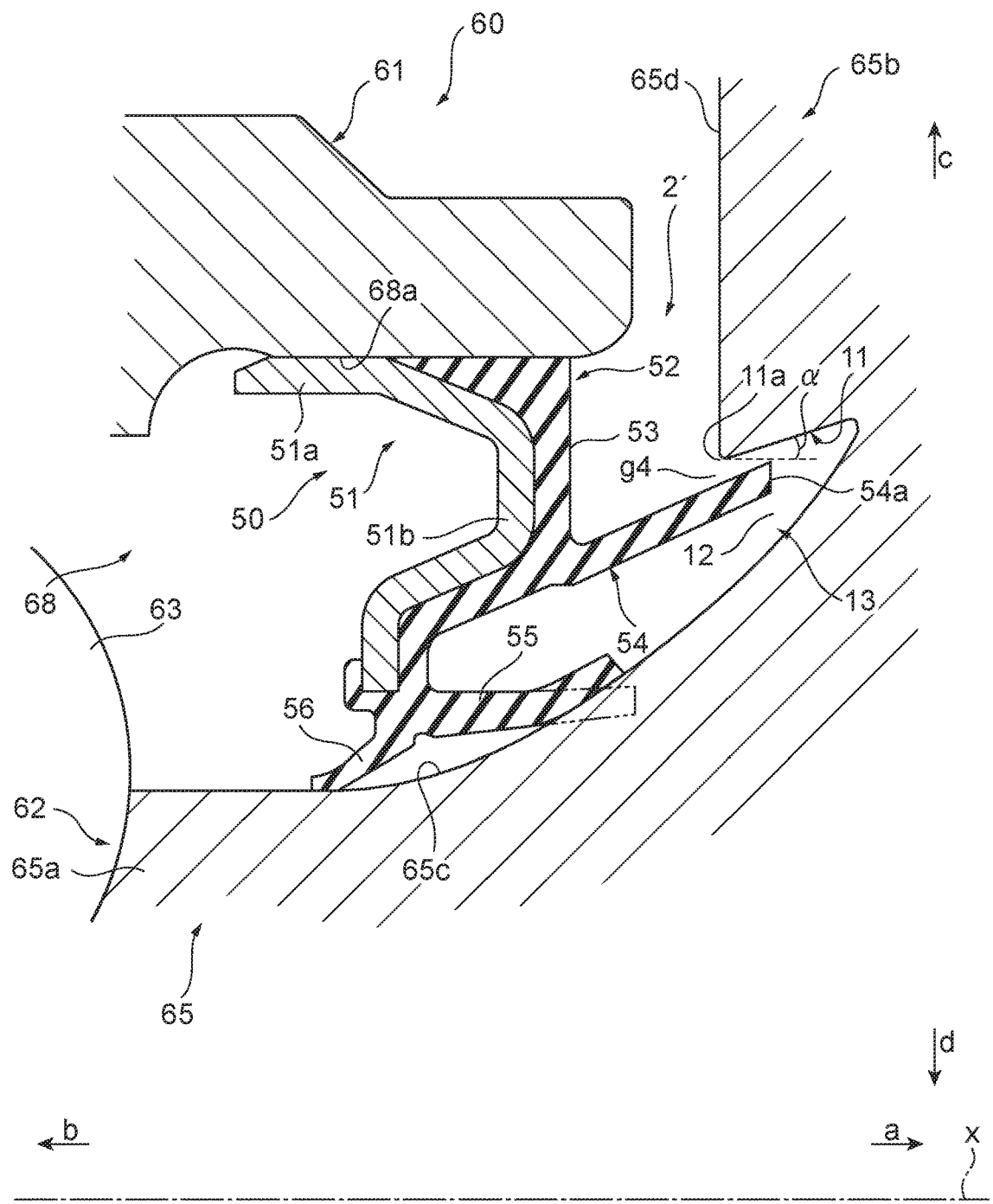
FIG. 6 is a partially enlarged cross-sectional view of a cross-section taken along an axis to show a schematic configuration of a sealing structure with an annular pocket and a sealing device according to a fourth embodiment of the present disclosure.

FIG. 6 is a partially enlarged view in a cross-section along the axis x to show a schematic configuration of a sealing structure 2' according to a fourth embodiment of the present disclosure. As shown in FIG. 6, with respect to the outer periphery side lip 54 of the sealing device 50, a portion on the outer end 54a side of the outer periphery side lip 54 enters the inside of the pocket 13, and the outer periphery side lip 54 and the outer peripheral surface 11 of the pocket 13 overlap each other in the radial direction over the axis x direction. That is, the outer periphery side lip 54 and the outer peripheral surface 11 of the pocket 13 face each other in the radial direction, and form an annular gap g4 between the outer periphery side lip 54 and the outer peripheral surface 11 of the pocket 13. That is, the outer periphery side lip 54 and the outer peripheral surface 11 of the pocket 13 overlap each other.

The annular gap g4 formed by the outer periphery side lip 54 and the outer peripheral surface 11 of the pocket 13 forms a labyrinth seal. Therefore, like the above-described sealing structure 3, the sealing structure 4 can suppress foreign matter intruding from the outside of the hub bearing 60 from further intruding to the radial lip 56 side. As a result, it is possible to suppress the radial lip 56 and the inner periphery side lip 55 of the sealing device 50 from being exposed to the foreign matter intruding from the outside, and it can be suppressed that the radial lip 56 bites foreign matter and thus is damaged or deteriorated, and the sealing performance of the sealing device 50 deteriorates to cause leakage of lubricant. Furthermore, it can be also suppressed that the radial lip 56 and the inner periphery side lip 55 bite foreign matter and thus are damaged or deteriorated, which causes foreign matter to intrude from the outside of the hub bearing 60 into the hub bearing 60.

Furthermore, the sealing performance of the gap g4 as the labyrinth seal is more enhanced as the overlapping (overlap) range between the outer periphery side lip 54 and the outer peripheral surface 11 of the pocket 13 over the axial line x direction is broader.

In the sealing structure 2', the outer periphery side lip 54 may be caused to overlap the outer peripheral surface 11 of the pocket 13 by increasing the length of the outer periphery side lip 54 with respect to the sealing structure 2, and also the outer periphery side lip 54 may be caused to overlap the outer peripheral surface 11 of the pocket 13 by shifting the mount position of the sealing device 50 in the outer ring 61 to the outside in the axis x direction.

As described above, like the sealing structure 2 according to the third embodiment of the present disclosure, the sealing structure 2' with an annular pocket and a sealing device according to the fourth embodiment of the present disclosure can suppress the radial lip 56 and the inner periphery side lip 55 of the sealing device 50 from being exposed to foreign matter intruding from the outside of the hub bearing 60.

Figure 7:
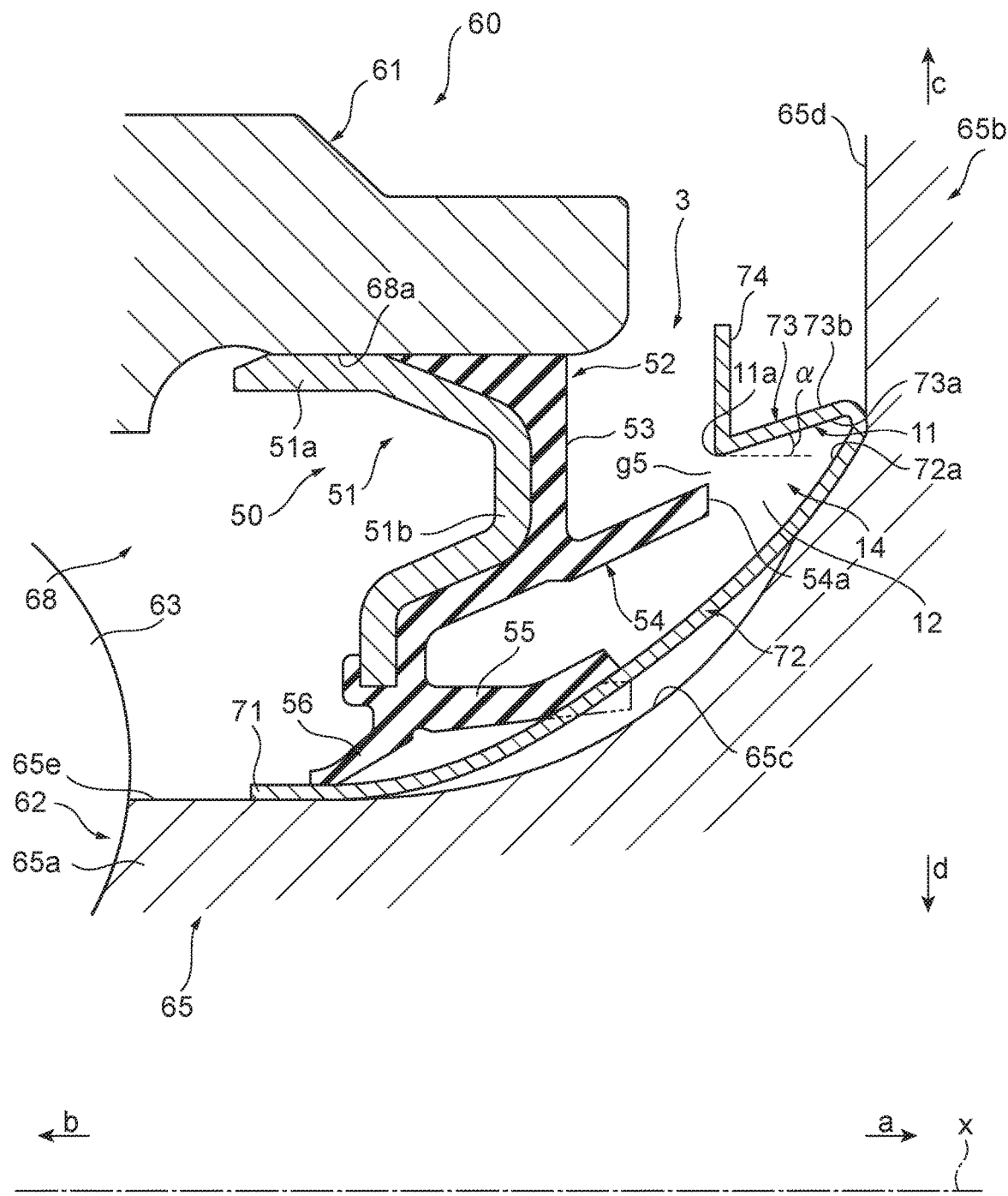
FIG. 7 is a partially enlarged cross-sectional view of a cross-section taken along an axis to show a schematic configuration of a sealing structure with an annular pocket and a sealing device according to a fifth embodiment of the present disclosure.

Next, a sealing structure with an annular pocket and a sealing device according to a fifth embodiment of the present disclosure will be described. FIG. 7 is a partially enlarged cross-sectional view of a cross-section taken along the axis to show a schematic configuration of a sealing structure 3 with an annular pocket and a sealing device according to the fifth embodiment of the present disclosure. The sealing structure 3 according to the fifth embodiment of the present disclosure includes a pocket 14 and a sealing device 50, and is applied to a hub bearing 60 used for a vehicle, a general-purpose machine or the like and different in the shape of the pocket from the sealing structure 2 according to the third embodiment of the present disclosure. Hereinafter, with respect to configurations having the same or similar functions as those of the sealing structure 2 according to the third embodiment of the present disclosure described above, description on these configurations will be omitted while they are represented by the same reference signs, and only different configurations will be described.

As shown in FIG. 7, the sealing structure 3 according to the fifth embodiment of the present disclosure includes the annular pocket 14 and the sealing device 50 as described above. Furthermore, the sealing structure 3 includes a slinger 70 as the functional member. In the sealing structure 3, unlike the pocket 13 (FIGS. 5 and 6) described above, the pocket 14 is not provided in the hub 62, but is provided in the slinger 70.

The slinger 70 is an annular member around the axis x, and is formed to be fitted to the hub ring 65 so as to cover the transition portion 65c of the hub ring 65. Specifically, the slinger 70 is a member made of metal, for example, stainless steel excellent in rust prevention, and includes an inner peripheral tubular portion 71 formed to be fitted to an outer peripheral surface 65e which is a peripheral surface on the outer periphery side of the shaft portion 65a of the hub ring 65, a seal surface portion 72 extending along the transition portion 65c from an outer end portion of the inner peripheral tubular portion 71, a cylindrical outer peripheral tubular portion 73 extending inward from an end portion (outer peripheral end portion 72a) on the outer periphery side of the seal surface portion 72, and a flange portion 74 which is an annular part extending from the inner end portion of the outer peripheral tubular portion 73 in the outer peripheral direction.

More specifically, the inner peripheral tubular portion 71 is a part in a cylindrical or substantially cylindrical centered or substantially centered about the axis x, and formed so as to be tightly fitted to the outer peripheral surface 65e of the shaft portion 65a of the hub ring 65. As a result, the slinger 70 is attached so as not to move relatively to the hub ring 65. The seal surface portion 72 is a part in a tubular shape centered or substantially centered about the axis x, and has, on the outer peripheral surface thereof, a contour which draws a smooth curve having a circular arc shape or arcuate shape in cross-section along the axis x. The seal surface portion 72 is in contact with the transition portion 65c of the hub ring 65 or an inner surface 65d of the wheel-mounting flange 65b of the hub ring 65 at the outer peripheral end portion 72a. The outer peripheral tubular portion 73 is a tubular part which faces the seal surface portion 72 on the outer periphery side and tapered and centered or substantially centered around the axis x, and the inner peripheral surface 73a which is a peripheral surface on the inner periphery side of the outer peripheral tubular portion 73 is formed to increase in diameter toward the outside (the direction of the arrow a) in the axis x direction. For example, as shown in FIG. 7, the flange portion 74 has a hollow disc shape centered or substantially centered about the axis x. As described later, this flange portion 74 makes it possible to block foreign matter that is to intrude into the inside through the outer peripheral tubular portion 73 of the slinger 70. It should be noted that the slinger 70 may not have the flange portion 74.

The slinger 70 may have an annular gasket portion formed of an elastic material at the outer peripheral end portion 72a of the seal surface portion 72. In this case, the slinger 70 is in contact with the hub ring 65 via the gasket portion at the outer peripheral end portion 72a of the seal surface portion 72, and can enhance the sealing performance between the slinger 70 and the hub ring 65 at the outer peripheral end portion 72a of the seal surface portion 72.

The slinger 70 is attached so as to cover the transition portion 65c of the hub ring 65 in the hub bearing 60, and each of the inner periphery side lip 55 and the radial lip 56 of the sealing device 50 is in contact with, not the transition portion 65c, but the seal surface portion 72 of the slinger 70 with a predetermined interference at the tip end portion thereof such that the slinger 70 (hub ring 65) is slidable.

Next, the pocket 14 and the outer periphery side lip 54 of the sealing device 50 will be described with reference to FIG. 7.

The pocket 14 is formed in the slinger 70, and has an outer peripheral surface 11 and a recessed part 12 like the aforementioned pocket 13 (see FIGS. 5 and 6). The recessed part 12 is defined by the seal surface portion 72 of the slinger 70 and the outer peripheral tubular portion 73. The outer peripheral surface 11 of the pocket 14 is formed in the outer peripheral tubular portion 73 of the slinger 70. More specifically, the outer peripheral tubular portion 73 of the slinger 70 has the outer peripheral surface 11 of the pocket 14, and the outer peripheral surface 11 of the pocket 14 is formed by the inner peripheral surface 73a of the outer peripheral tubular portion 73 of the slinger 70. The outer peripheral surface 11 of the pocket 14 is the inner peripheral surface 73a of the outer peripheral tubular portion 73 of the slinger 70.

As shown in FIG. 7, the outer end 54a of the outer periphery side lip 54 of the sealing device 50 is located on the inner periphery side than the inner end 11a of the outer peripheral surface 11 of the pocket 14 in the radial direction, and does not enter the inside of the pocket 14 in the axis x direction (the direction to the outside). That is, the outer periphery side lip 54 of the sealing device 50 and the outer peripheral surface 11 of the pocket 14 do not overlap each other in the radial direction.

As described above, an annular gap g5 is formed between the outer end 54a of the outer periphery side lip 54 and the inner end 11a of the outer peripheral surface 11 of the pocket 14 by the outer periphery side lip 54 and the pocket 14.

The annular gap g5 formed by the outer end 54a of the outer periphery side lip 54 and the inner end 11a of the outer peripheral surface 11 of the pocket 14 forms a labyrinth seal. Therefore, even when foreign matter such as muddy water, sand or dust intrudes from the outside of the hub bearing 60, the intruding foreign matter is suppressed from further intruding to the radial lip 56 side by the labyrinth seal (gap g5) formed by the outer periphery side lip 54 and the pocket 14. As described above, the sealing structure 3 according to the embodiment of the present disclosure can also achieve the same effect as the above-described sealing structure 2.

Furthermore, the slinger 70 has a flange portion 74, and an outer peripheral surface 73b which is a surface on the outer periphery side of the outer peripheral tubular portion 73 connected to an end portion on the inner periphery side of the flange portion 74 forms an annular surface expanding to the outer periphery side toward the outside in the axis x direction, for example, a tapered surface having a conical surface shape. Therefore, foreign matter intruding from the outside of the hub bearing 60 is accumulated between the outer peripheral tubular portion 73 of the slinger 70 and the flange portion 74, whereby the foreign matter can be suppressed from reaching the sealing device 50. Furthermore, the foreign matter accumulated between the outer peripheral tubular portion 73 and the flange portion 74 can be discharged downward by its own weight or by rotation of the slinger 70.

It is to be noted that the slinger 70 may not have the flange portion 74. In this case, it is preferable that the outer peripheral surface 73b of the outer peripheral tubular portion 73 of the slinger 70 is an annular surface which narrows (decreases in diameter) to the inner periphery side toward the outside in the axis x direction. In this case, it can be made difficult for foreign matter to move to the sealing device 50 side through the outer peripheral tubular portion 73 of the slinger 70. Also in this case, as described above, the outer peripheral surface 11 of the pocket 14 is a surface that increases in diameter toward the outside in the axis x direction.

As described above, the sealing structure 3 with an annular pocket and a sealing device according to the fifth embodiment of the present disclosure can suppress the radial lip 56 and the inner periphery side lip 55 of the sealing device 50 from being exposed to the foreign matter intruding from the outside of the hub bearing 60.

It is to be noted that the shape of the recessed part 12 of the pocket 14 is not limited to the above-described shape, and other shapes such as a rectangle in cross-section may be used. However, the pocket 13 necessarily has the outer peripheral surface 11.

Figure 8:
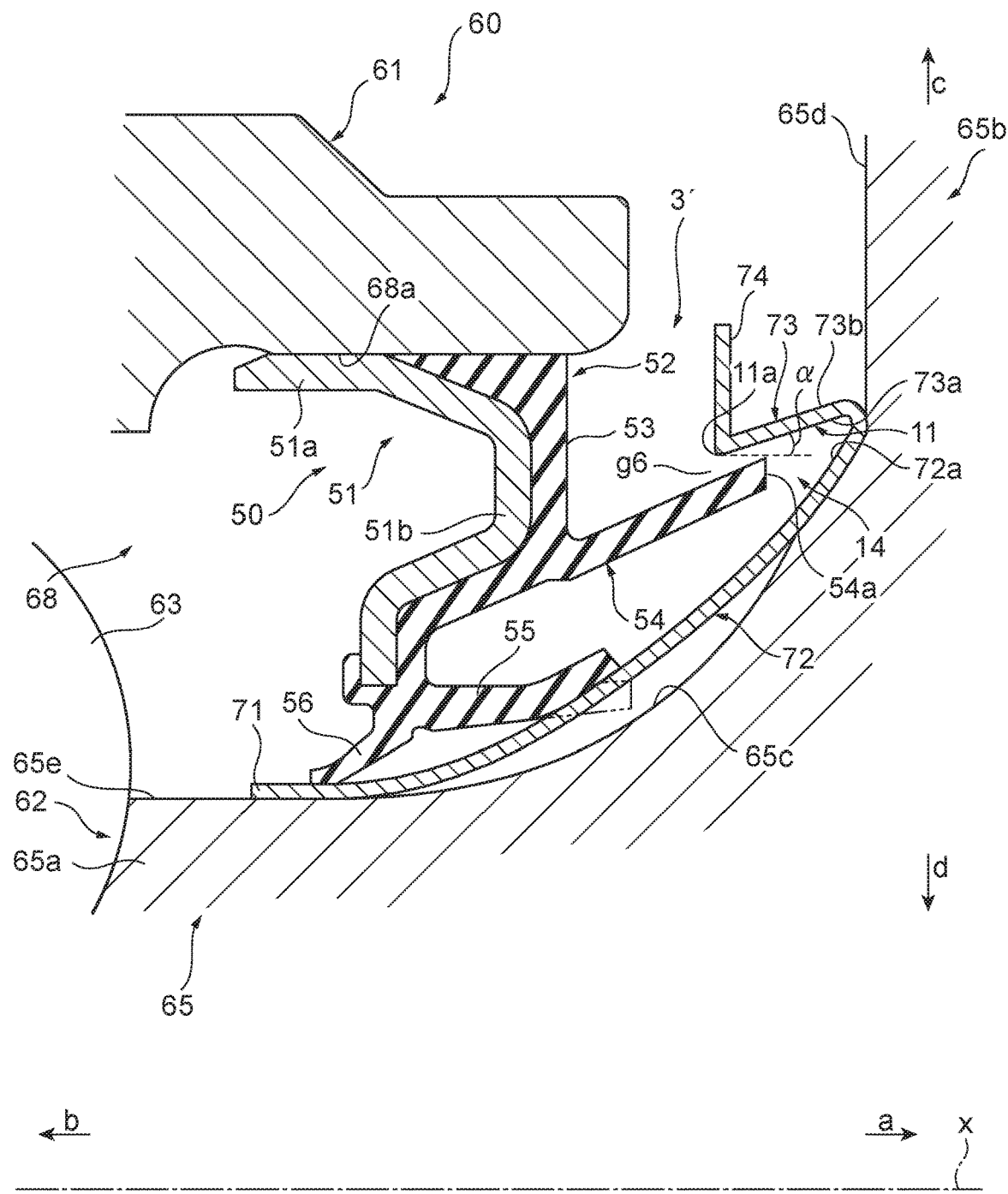
FIG. 8 is a partially enlarged cross-sectional view of a cross-section taken along an axis to show a schematic configuration of a sealing structure with an annular pocket and a sealing device according to a sixth embodiment of the present disclosure.

Next, a sealing structure 3' with an annular pocket and a sealing device according to a sixth embodiment of the present disclosure will be described. The sealing structure 3' according to the sixth embodiment of the present disclosure is different from the sealing structure 3 according to the above fifth embodiment of the present disclosure only in the shape of the annular gap formed by the outer periphery side lip 54 and the outer peripheral surface 11 of the pocket 14. Hereinafter, with respect to configurations having the same or similar functions as those of the sealing structure 3 according to the fifth embodiment of the present disclosure described above, description on these configurations will be FIG. 8 is a partially enlarged cross-sectional view of a cross-section taken along the axis x to show a schematic configuration of the sealing structure 3' according to the sixth embodiment of the present disclosure. As shown in FIG. 8, a part on the outer end 54a side of the outer periphery side lip 54 of the sealing device 50 enters the inside of the pocket 14, and the outer periphery side lip 54 and the outer peripheral surface 11 of the pocket 14 overlap each other in the radial direction over the axis x direction. That is, the outer periphery side lip 54 and the outer peripheral surface 11 of the pocket 14 face each other in the radial direction, and form an annular gap g6 between the outer periphery side lip 54 and the outer peripheral surface 11 of the pocket 14. That is, the outer periphery side lip 54 and the outer peripheral surface 11 of the pocket 14 overlap each other.

The annular gap g6 formed by the outer periphery side lip 54 and the outer peripheral surface 11 of the pocket 14 forms a labyrinth seal. Therefore, the sealing structure 3' can achieve the same effect as the sealing structure 3, and it is possible to suppress foreign matter intruding from the outside of the hub bearing 60 from further intruding to the radial lip 56 side.

Furthermore, the sealing performance of the gap g6 as the labyrinth seal is more enhanced as the overlapping (overlap) range over the axis x direction between the outer periphery side lip 54 and the outer peripheral surface 11 of the pocket 14 is broader.

In the sealing structure 3', the outer periphery side lip 54 may be caused to overlap the outer peripheral surface 11 of the pocket 14 by increasing the length of the outer periphery side lip 54 with respect to the sealing structure 3. The outer periphery side lip 54 may be caused to overlap the outer peripheral surface 11 of the pocket 14 by shifting the mount position of the sealing device 50 in the outer ring 61 to the outside in the direction of the axis x.

As a result, like the sealing structure 3 according to the fifth embodiment of the present disclosure, the sealing structure 3' with an annular pocket and a sealing device according to the sixth embodiment of the present disclosure can suppress the radial lip 56 and the inner periphery side lip 55 of the sealing device 50 from being exposed to foreign matter intruding from the outside of the hub bearing 60.

Figure 9:
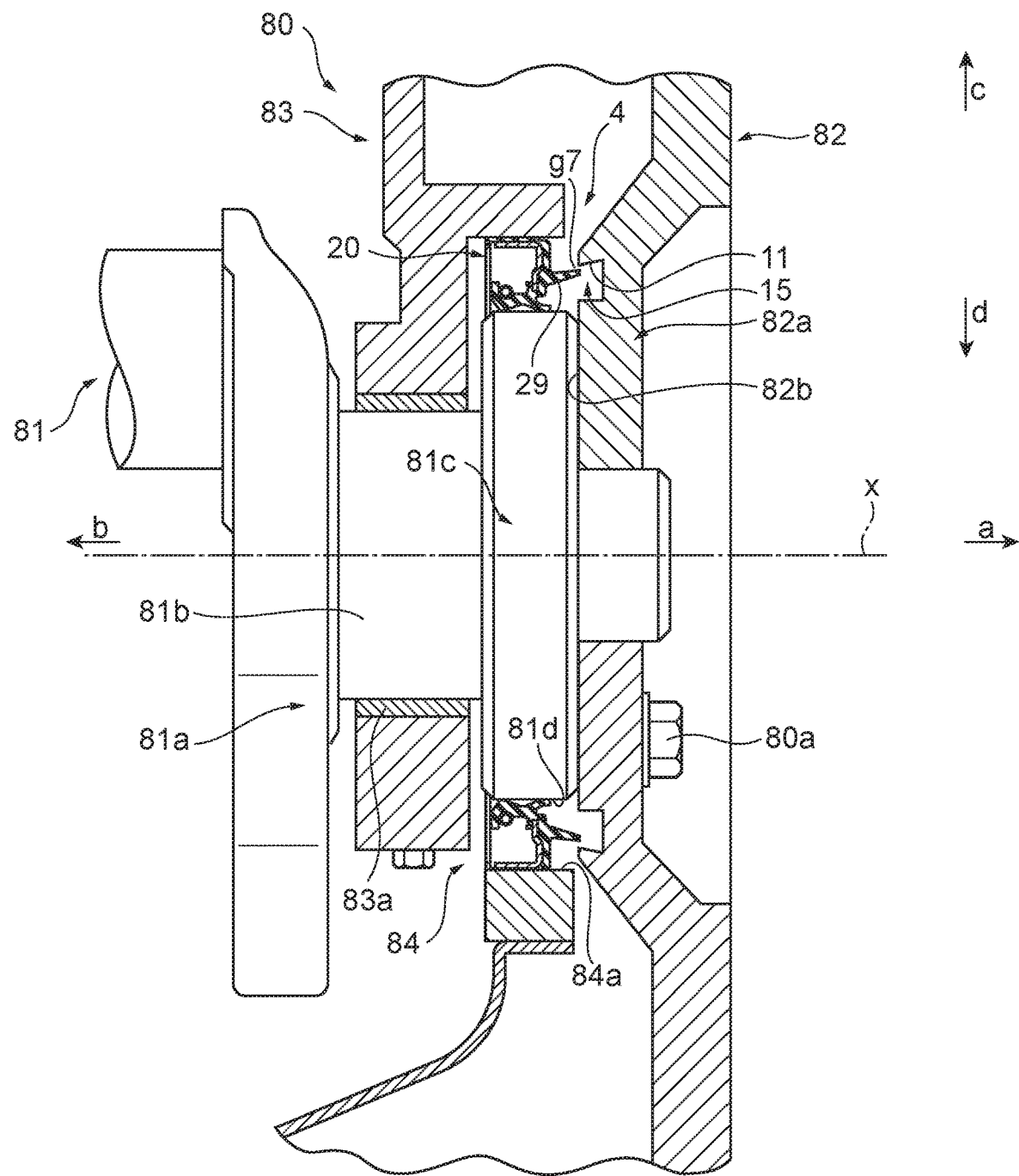
FIG. 9 is a partial cross-sectional view of a cross-section taken along an axis to show a schematic configuration of a sealing structure with an annular pocket and a sealing device according to a seventh embodiment of the present disclosure.
Figure 10:
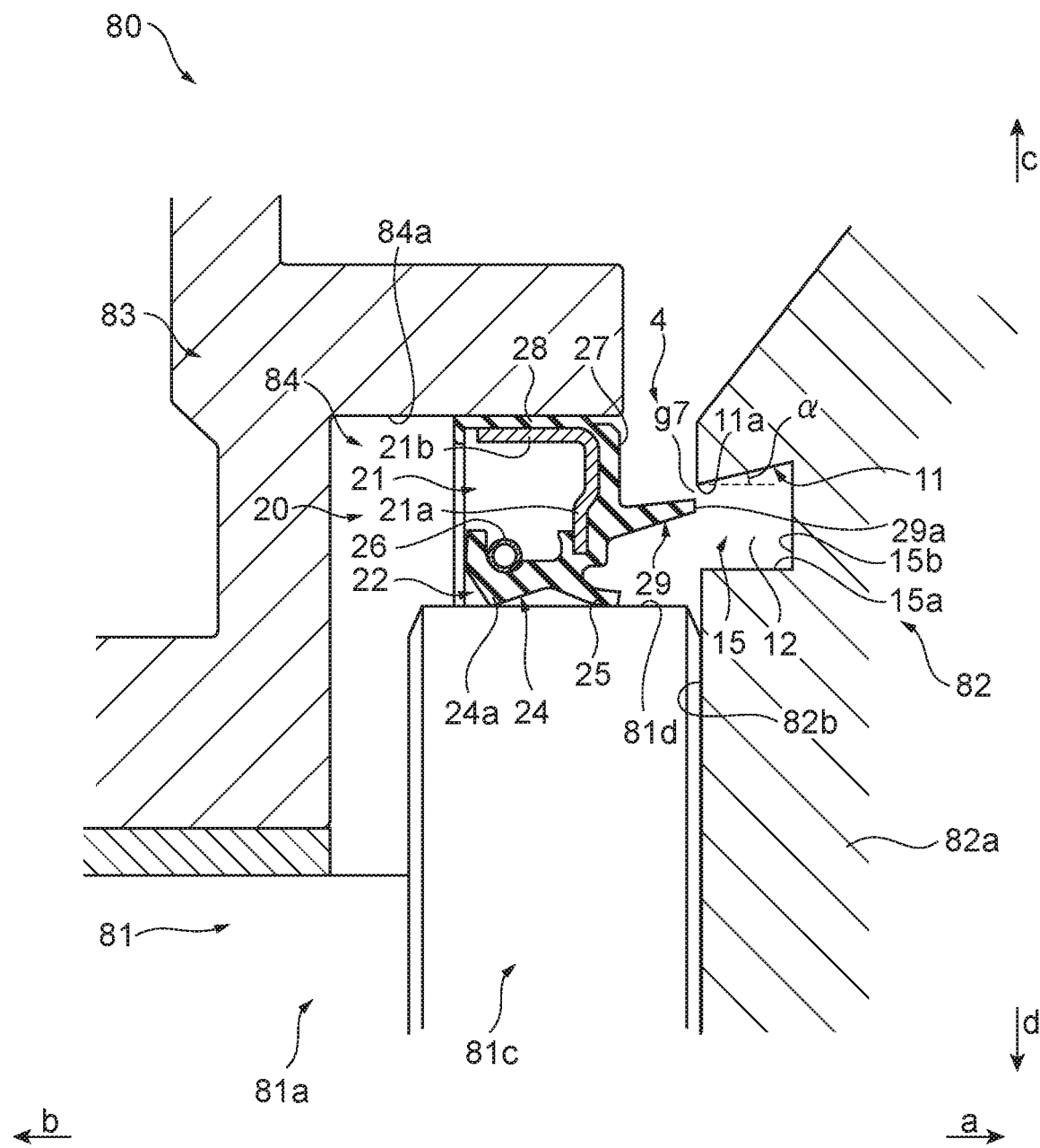
FIG. 10 is a partially enlarged cross-sectional view of the sealing structure with an annular pocket and a sealing device shown in FIG. 9.

Next, a sealing structure with an annular pocket and a sealing device according to a seventh embodiment of the present disclosure will be described. FIG. 9 is a partial cross-sectional view of a cross-section taken along the axis x to show a schematic configuration of the sealing structure 4 with an annular pocket and a sealing device according to the seventh embodiment of the present disclosure, and FIG. 10 is a partially enlarged cross-sectional view of the sealing structure 4 shown in FIG. 9. The sealing structure 4 according to the seventh embodiment of the present disclosure includes a pocket 15 and a sealing device 20, and is applied between a rear end of a crankshaft 81 and a flywheel 82 of an engine 80 for use in a vehicle, a general-purpose machine or the like. The sealing structure 4 according to the present embodiment includes a sealing device 20 having the same configuration as the sealing device 20 of the sealing structure 1 according to the above-described first embodiment.

As shown in FIG. 9, the crankshaft 81 and the flywheel 82 of the engine 80 are conventionally well-known crankshaft and flywheel. The crankshaft 81 as the shaft member is rotatably supported inside a case 83 as the attachment target member, and a portion of one end thereof (a rear end portion 81a) penetrates through a through-hole 84 formed in a side surface of the case 83 and protrudes to the outside of the case 83. Specifically, the crankshaft 81 includes a journal portion 81b which is a part freely rotatably supported in the case 83 via a metal bearing 83a at the rear end portion 81a, and a seal flange portion 81c which is formed on a rear end side than the journal portion 81b and has a larger diameter than the journal portion 81b. The seal flange portion 81c is inserted into the through-hole 84 of the case 83, and an outer peripheral surface 81d having a cylindrical surface shape of the seal flange portion 81c faces an inner peripheral surface 84a having a cylindrical surface shape of the through-hole 84 of the case 83 in the radial direction to form an annular gap. This gap is sealed by the sealing device 20 attached to the through-hole 84 of the case 83. It is to be noted that the case 83 is constituted by a cylinder block and the crankcase.

The flywheel 82 is attached to the seal flange portion 81c from the outside. Specifically, a bolt hole (not shown) is formed in the seal flange portion 81c, and the flywheel 82 is fixed to the seal flange portion 81c by a bolt 80a in the disc-shaped hub portion 82a. An inner surface 82b which is a surface on the inside (the side of the direction of the arrow b) of the hub portion 82a expands in a planar or substantially planar shape.

The sealing structure 4 according to the seventh embodiment of the present disclosure includes the annular pocket 15 and the sealing device 20 as described above. In the sealing structure 4 according to the seventh embodiment of the present disclosure, the pocket 15 is provided to the flywheel 82 as the functional member.

As described above, the sealing device 20 is attached to the case 83 as the attachment target portion. Specifically, as shown in FIG. 10, the sealing device 20 is press-fitted into the through-hole 84 of the case 83, and a gasket portion 28 of the elastic body portion 22 is pressed against the inner peripheral surface 84a of the through-hole 84 to thereby performing sealing between the sealing device 20 and the through-hole 84. At the lip tip end portion 24a, the seal lip 24 is in close contact with the outer peripheral surface 81d of the seal flange portion 81c of the crankshaft 81 such that the seal flange portion 81c is slidable, thereby performing sealing between the crankshaft 81 and the sealing device 20. The dust lip 25 is in contact with or radially faces the outer peripheral surface 81d of the seal flange portion 81c to prevent intrusion of foreign matter to the lip tip end portion 24a. The seal lip 24 is primarily intended to prevent leakage of the lubricant in the case 83, and the dust lip 25 is intended to prevent intrusion of foreign matter such as muddy water, sand, or dust from the outside of the case 83.

Like the pocket 10 of the aforementioned sealing structure 1, the pocket 15 has an outer peripheral surface 11 which is a peripheral surface in an annular shape around the axis x and extending along the axis x, and forms a recessed part 12. The recessed part 12 is a portion recessed to the outside (one side) in the axis x direction, and is formed annularly around the axis x. The outer peripheral surface 11 increases in diameter toward the outer side (the direction of the arrow a) in the axis x direction.

Next, the pocket 15 and the side lip 29 of the sealing device 20 will be described with reference to FIG. 5.

As shown in FIG. 10, the pocket 15 is a part which is formed on the inner surface 82b of the hub portion 82a of the flywheel 82 and recessed outward from the inner surface 82b of the hub portion 82a extending in an annular shape centered or substantially centered about the axis x. For example, as shown in FIG. 10, the pocket 15 has an inner peripheral surface 15a in a cylindrical surface shape centered or substantially centered about the axis x on the inner periphery side of the outer peripheral surface 11, also has a bottom surface 15b having a hollow disc surface shape expanding between an outer end portion of the outer peripheral surface 11 and an outer end portion of the inner peripheral surface 15a, and forms a recessed part 12 which is rectangular or substantially rectangular in cross-section.

As described above, the outer peripheral surface 11 of the pocket 15 is an annular surface which increases in diameter toward the outside (the direction of the arrow a) in the axis x direction, and expands to the outer periphery side toward the outside in the direction of the axis x, for example, a tapered surface having a substantially conical surface shape. The diameter-increasing angle α which is an angle of the diameter-increasing outer peripheral surface 11 of the pocket 15 with respect to the axis x is set to a predetermined value. Specifically, as shown in FIG. 10, the diameter-increasing angle α is an angle between the axis x (a straight line parallel to the axis x) and the outer peripheral surface 11 in cross-section. The diameter-increasing angle α of the outer peripheral surface 11 of the pocket 15 is an angle larger than 0°, preferably from not less than 4° to not more than 18°, more preferably from not less than 5° to not more than 16°, and still more preferably from not less than 7° to not more than 15°. As described above, the outer peripheral surface 11 of the pocket 15 is inclined to the outer periphery side by only the diameter-increasing angle α with respect to the axis x.

As shown in FIG. 10, the side lip 29 of the sealing device 20 extends in the outward direction, more specifically, extends in parallel to the axis x or obliquely with respect to the axis x in the outward direction and the outer peripheral direction. Furthermore, the outer end 29a which is an outer end portion of the side lip 29 is located radially on the inner periphery side than the inner end 11a of the outer peripheral surface 11 of the pocket 15, and does not enter into the inside of the pocket 15 in the axis x direction (the outward direction). That is, the side lip 29 of the sealing device 20 and the outer peripheral surface 11 of the pocket 15 do not overlap each other in the radial direction.

As described above, an annular gap g7 is formed between the outer end 29a of the side lip 29 and the inner end 11a of the outer peripheral surface 11 of the pocket 15 by the side lip 29 and the pocket 15.

The annular gap g7 formed by the outer end 29a of the side lip 29 and the inner end 11a of the outer peripheral surface 11 of the pocket 15 forms a labyrinth seal. Therefore, even when foreign matter such as muddy water, sand, or dust intrudes from the outside of the engine 80 or the case 83, the intruding foreign matter is suppressed from further intruding to the seal lip 24 side by the labyrinth seal (gap g7) formed by the side lip 29 and the pocket 15. As a result, it is possible to suppress the seal lip 24 of the sealing device 20 from being exposed to foreign matter intruding from the outside as described above. Therefore, it can be suppressed that the seal lip 24 bites foreign matter at the tip end portion thereof and thus is damaged or deteriorated, and the sealing performance of the sealing device 20 deteriorates to cause leakage of lubricant.

Furthermore, since the outer peripheral surface 11 of the pocket 15 forming the labyrinth seal (the gap g7) has a shape which increases in diameter toward the outside as described above, further intrusion of foreign matter to the seal lip 24 side can be more effectively suppressed at the labyrinth seal g7.

When the outer peripheral surface 11 of the pocket 15 forming the labyrinth seal (the gap g7) has a shape which increases in diameter at the predetermined diameter-increasing angle α toward the outside as described above, further intrusion of foreign matter to the seal lip 24 side can be more effectively suppressed at the labyrinth seal g7.

As described above, the sealing structure 4 with an annular pocket and a sealing device according to the seventh embodiment of the present disclosure can suppress the seal lip 24 of the sealing device 20 from being exposed to foreign matter intruding from the outside of the engine 80 or the case 83. As described above, the sealing structure 4 with an annular pocket and a sealing device according to the seventh embodiment of the present disclosure can achieve the same effect as the sealing structure 1 with an annular pocket and a sealing device according to the first embodiment of the present disclosure described above.

Next, a sealing structure 4' with an annular pocket and a sealing device according to an eighth embodiment of the present disclosure will be described. The sealing structure 4' according to the eighth embodiment of the present disclosure is different from the sealing structure 4 according to the seventh embodiment of the present disclosure only in the shape of the annular gap formed by the side lip 29 and the outer peripheral surface 11 of the pocket 15. Hereinafter, with respect to configurations having the same or similar functions as or to those of the sealing structure 4 according to the seventh embodiment of the present disclosure described above, the description thereon will be omitted while the configurations are represented by the same reference signs, and only different configurations will be described.

Figure 11:
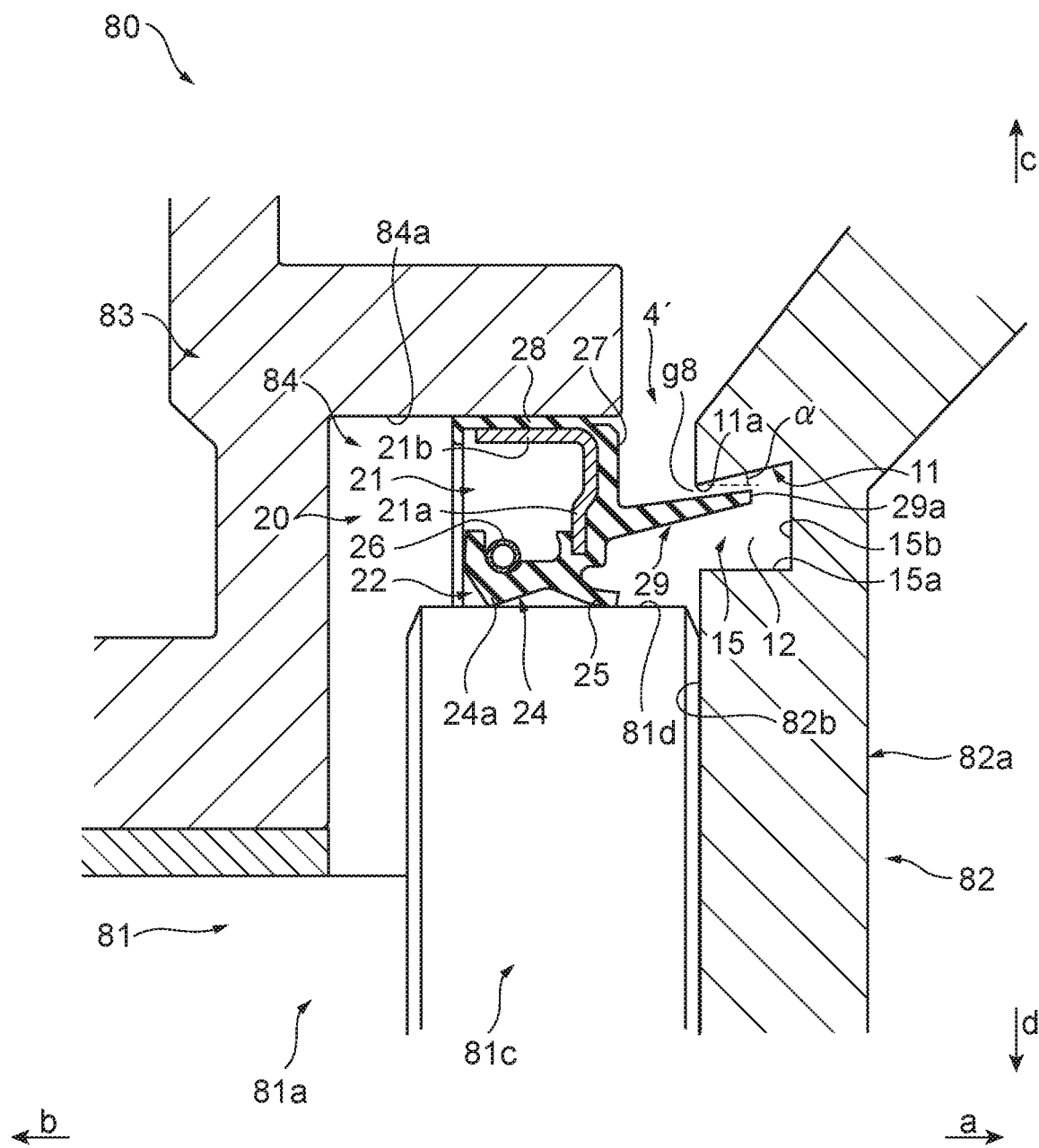
FIG. 11 is a partially enlarged cross-sectional view of a cross-section taken along an axis to show a schematic configuration of a sealing structure according to an eighth embodiment of the present disclosure.

FIG. 11 is a partially enlarged cross-sectional view of a cross-section taken along the axis x to show a schematic configuration of the sealing structure 4' according to the eighth embodiment of the present disclosure. As shown in FIG. 11, a part on the outer end 29a side of the side lip 29 of the sealing device 20 enters the inside of the pocket 15, and the side lip 29 and the outer peripheral surface 11 of the pocket 15 overlap each other over the axis x direction in the radial direction. That is, the side lip 29 and the outer peripheral surface 11 of the pocket 15 face each other in the radial direction, and an annular gap g8 is formed between the side lip 29 and the outer peripheral surface 11 of the pocket 15. That is, the side lip 29 and the outer peripheral surface 11 of the pocket 15 overlap each other.

The annular gap g8 formed by the side lip 29 and the outer peripheral surface 11 of the pocket 15 forms a labyrinth seal. Therefore, like the above-described sealing structure 4, the sealing structure 4' can suppress foreign matter intruding from the outside of the engine 80 or the case 83 from further intruding to the seal lip 24 side. As a result, the seal lip 24 of the sealing device 20 can be suppressed from being exposed to foreign matter intruding from the outside, and it can be suppressed that the seal lip 24 bites the foreign matter and thus is damaged or deteriorated, and the sealing performance of the sealing device 20 deteriorates to cause leakage of the lubricant. Furthermore, it can be suppressed that the seal lip 24 bites foreign matter and thus is damaged or deteriorated, thereby causing foreign matter to intrude from the outside of the engine 80 into the inside of the engine 80.

Furthermore, the sealing performance of the gap g8 as the labyrinth seal is more enhanced as the overlapping (overlap) range over the axis x direction between the side lip 29 and the outer peripheral surface 11 of the pocket 15 is broader.

In the sealing structure 4', the side lip 29 may be made to overlap the outer peripheral surface 11 of the pocket 15 by increasing the length of the side lip 29 with respect to the sealing structure 4, and furthermore the side lip 29 may be made to overlap the outer peripheral surface 11 of the pocket 15 by shifting the mount position of the sealing device 20 in the case 83 to the outside in the axis x direction.

As described above, like the sealing structure 4 according to the seventh embodiment of the present disclosure, the sealing structure 4' with an annular pocket and a sealing device according to the eighth embodiment of the present disclosure can suppress the seal lip 24 of the sealing device 20 from being exposed to foreign matter intruding from the outside of the engine 80 or the case 83.

Figure 12:
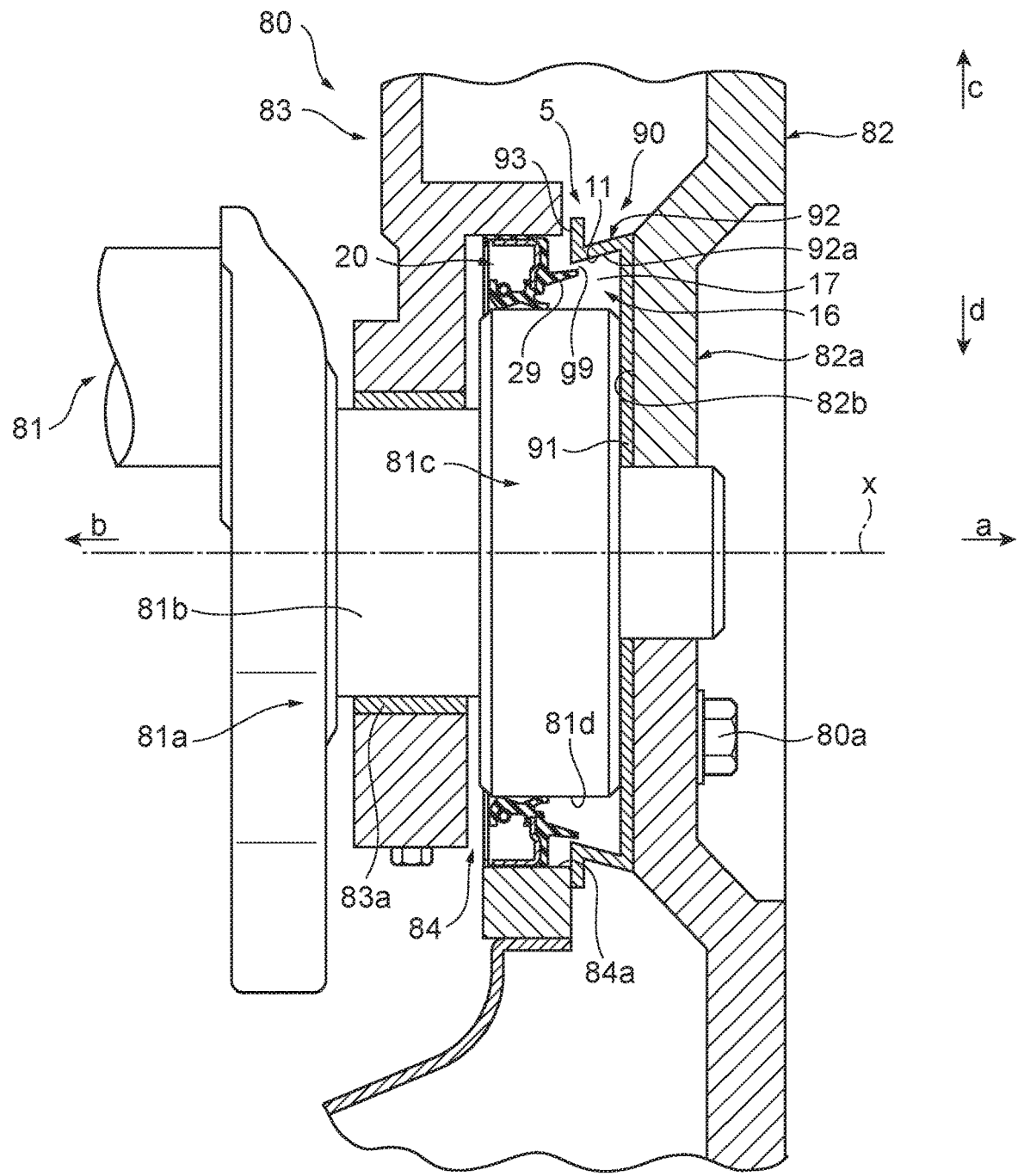
FIG. 12 is a partial cross-sectional view of a cross-section taken along an axis to show a schematic structure of a sealing structure with an annular pocket and a sealing device according to a ninth embodiment of the present disclosure.
Figure 13:
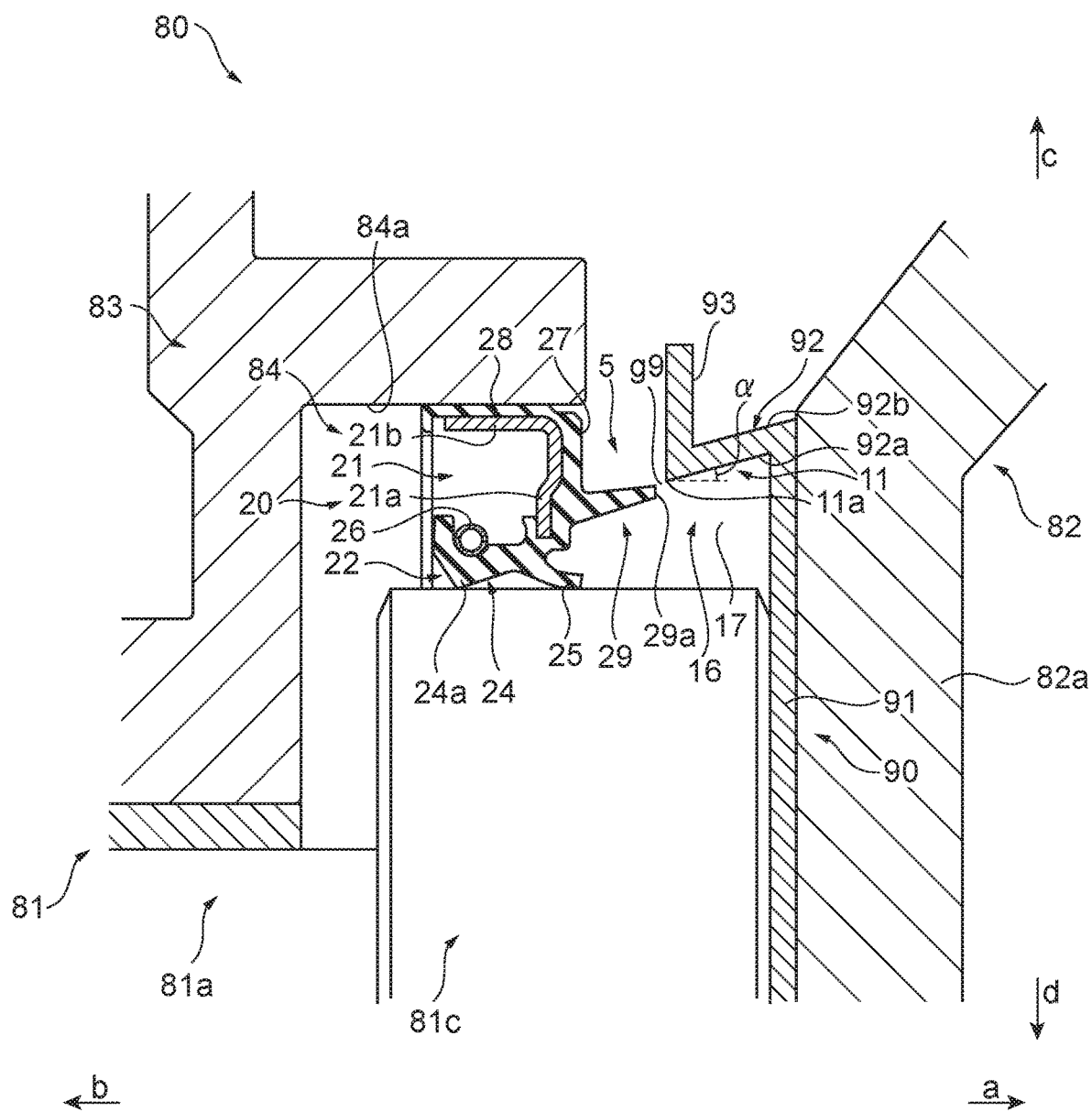
FIG. 13 is a partially enlarged sectional view of the sealing structure with an annular pocket and a sealing device shown in FIG. 12.

Next, a sealing structure with an annular pocket and a sealing device according to a ninth embodiment of the present disclosure will be described. FIG. 12 is a partial cross-sectional view of a cross-section taken along the axis x to show a schematic configuration of a sealing structure 5 with an annular pocket and a sealing device according to the ninth embodiment of the present disclosure, and FIG. 13 Is a partially enlarged cross-sectional view of the sealing structure 5 shown in FIG. 12. The sealing structure 5 according to the ninth embodiment of the present disclosure includes a pocket 16 and a sealing device 20, and is applied between the rear end of the crankshaft 81 and the flywheel 82 of the engine 80 used for a vehicle, a general-purpose machine or the like as in the case of the above-described sealing structure 4. The sealing structure 5 according to the present embodiment differs from the sealing structure 4 according to the seventh embodiment of the present disclosure described above only in the shape of the pocket. Hereinafter, with respect to configurations having the same or similar functions as or to those of the sealing structure 4 according to the seventh embodiment of the present disclosure described above, description on the configurations will be omitted while the configurations are represented by the same reference signs, and only different configurations will be described.

As shown in FIG. 12, the sealing structure 5 according to the ninth embodiment of the present disclosure includes the annular pocket 16 and the sealing device 20 as described above. In addition, the sealing structure 5 includes a disc-shaped plate member 90 as the functional member. In the sealing structure 5, unlike the aforementioned pocket 15 (FIGS. 10 and 11), the pocket 16 is not provided to the flywheel 82, but is provided to the plate member 90.

The plate member 90 is held between the crankshaft 81 and the flywheel 82, and an end portion on one side (rear end portion) in the axis x direction of the crankshaft 81 on the outer peripheral surface 11 of the pocket 16 is covered from the outer periphery side to form a recessed part 17 of the pocket 16. Specifically, as shown in FIG. 12, the plate member 90 is sandwiched between the seal flange portion 81c of the rear end portion 81a of the crankshaft 81 and the hub portion 82a of the flywheel 82, and fastened together with the flywheel 82 by a bolt 80a to be fixed between the seal flange portion 81c and the flywheel 82.

As shown in FIG. 12, the plate member 90 has a disc portion 91 which is a disc-shaped part, an outer peripheral tubular portion 92 which is a cylindrical part extends from an end portion on the outer periphery side of the disc portion 91 along the axis x, and the outer peripheral surface 11 of the pocket 16 is formed in the outer peripheral tubular portion 92. More specifically, the disc portion 91 is a part in a circular plate-like shape centered or substantially centered about the axis x, and the plate member 90 is interposed between the seal flange portion 81c and the flywheel 82 at the disc portion 91. The outer peripheral tubular portion 92 is a flange-like portion extending from an end portion on the outer periphery side of the disc portion 91, and extends obliquely to the inner periphery side toward the inside (the direction of the arrow b). The outer peripheral tubular portion 92 is, for example, in the form of a plate, and has an inner peripheral surface 92a which is a peripheral surface on the inner periphery side in a conical surface shape centered or substantially centered about the axis x, and an outer peripheral surface 92b which is a peripheral surface on the outer periphery side in a conical surface shape centered or substantially centered about the axis x.

In addition, the plate member 90 has a flange portion 93 which is an annular portion extending from an inner end portion of the outer peripheral tubular portion 92 in the outer peripheral direction. For example, as shown in FIG. 12, the flange portion 93 has a hollow disc shape centered or substantially centered about the axis x. This flange portion 93 can block foreign matter intruding via the outer peripheral tubular portion 92 of the plate member 90 into the inside as described later. It is to be noted that the plate member 90 may not have the flange portion 93. For example, the plate member 90 is made of metal, and is formed from a single plate-like member by press working or the like.

Next, the pocket 16 and the side lip 29 of the sealing device 20 will be described with reference to FIG. 13.

The pocket 16 is formed by the plate member 90, the recessed part 17 of the pocket 16 is defined by the outer peripheral tubular portion 92 and the disc portion 91 of the plate member 90 on the outer periphery side of the seal flange portion 81c of the crankshaft 81, and the outer peripheral surface 11 of the pocket 16 is formed in the outer peripheral tubular portion 92 of the plate member 90. More specifically, the outer peripheral tubular portion 92 of the plate member 90 has the outer peripheral surface 11 of the pocket 16, the outer peripheral surface 11 of the pocket 16 is formed by the inner peripheral surface 92a of the outer peripheral tubular portion 92 of the plate member 90, and the outer peripheral surface 11 of the pocket 16 is the inner peripheral surface 92a of the outer peripheral tubular portion 92 of the plate member 90.

As described above, the outer peripheral surface 11 of the pocket 16 is an annular surface which increases in diameter toward the outside (the direction of the arrow a) in the axis x direction, and expands to the outer periphery side toward the outside in the axis x direction, and is, for example, a tapered surface having a substantially conical surface shape. The diameter-increasing angle $\alpha$ which is an angle of the diameter-increasing outer peripheral surface 11 of the pocket 16 with respect to the axis x is set to a predetermined value. Specifically, as shown in FIG. 13, the diameter-increasing angle $\alpha$ is an angle between the axis x (a straight line parallel to the axis x) and the outer peripheral surface 11 in cross-section. The diameter-increasing angle $\alpha$ of the outer peripheral surface 11 of the pocket 16 is an angle larger than 0°, preferably from not less than 4° to not more than 18°, more preferably from not less than 5° to not more than 16°, and still more preferably not less than 7° to not more than 15°. As described above, the outer peripheral surface 11 of the pocket 16 is inclined to the outer periphery side by the diameter-increasing angle $\alpha$ with respect to the axis x.

As shown in FIG. 13, the side lip 29 of the sealing device 20 extends in the outward direction, more specifically, extends in parallel to the axis x or obliquely with respect to the axis x in the direction to the outside and the outer peripheral direction. Furthermore, the outer end 29a which is an outer end portion of the side lip 29 is located radially on the inner periphery side than the inner end 11a which is an inner end portion of the outer peripheral surface 11 of the pocket 16, and does not enter into the inside of the pocket 16 in the axis x direction (outward direction). That is, the side lip 29 of the sealing device 20 and the outer peripheral surface 11 of the pocket 16 do not overlap each other in the radial direction.

As described above, an annular gap g9 is formed between the outer end 29a of the side lip 29 and the inner end 11a of the outer peripheral surface 11 of the pocket 16 by the side lip 29 and the pocket 16.

The annular gap g9 formed by the outer end 29a of the side lip 29 and the inner end 11a of the outer peripheral surface 11 of the pocket 16 forms a labyrinth seal. Therefore, even when foreign matter such as muddy water, sand, or dust intrudes from the outside of the engine 80 or the case 83, the intruding foreign matter is suppressed from further intruding to the seal lip 24 side by the labyrinth seal (gap g9) formed by the side lip 29 and the pocket 16. As a result, the seal lip 24 of the sealing device 20 can be suppressed from being exposed to the foreign matter intruding from the outside as described above. Therefore, it can be suppressed that the lip tip end portion 24a bites foreign matter and thus is damaged or deteriorated, so that the sealing performance of the sealing device 20 deteriorates to cause leakage of the lubricant. In addition, it can be suppressed that the lip tip end portion 24a bites foreign matter and thus is damaged and deteriorated, thereby causing foreign matter to intrude from the outside of the engine 80 or the case 83 into the inside thereof.

Furthermore, as described above, the outer peripheral surface 11 of the pocket 16 forming the labyrinth seal (the gap g9) has a shape which increases in diameter toward the outside, so that intrusion of foreign matter to the seal lip 24 side can be more effectively suppressed at the labyrinth seal g9.

As described above, since the outer peripheral surface 11 of the pocket 16 forming the labyrinth seal (the gap g9) has a shape which increases in diameter at the predetermined diameter-increasing angle α toward the outer side, further intrusion of foreign matter to the seal lip 24 side can be more effectively suppressed at the labyrinth seal g9.

Furthermore, the plate member 90 has the flange portion 93, and the outer peripheral surface 92b (see FIG. 13) which is a surface on the outer periphery side of the outer peripheral tubular portion 92 connected to an end portion on the inner periphery side of the flange portion 93 forms an annular surface expanding to the outer periphery side toward the outside in the axis x direction, for example, a tapered surface having a conical surface shape. Therefore, foreign matter intruding from the outside of the engine 80 or the case 83 is accumulated between the outer peripheral tubular portion 92 of the plate member 90 and the flange portion 93, whereby the foreign matter can be suppressed from reaching the sealing device 20. Furthermore, the foreign matter accumulated between the outer peripheral tubular portion 92 and the flange portion 93 can be discharged downward by its own weight or by rotation of the plate member 90.

It is to be noted that the plate member 90 may not have the flange portion 93. In this case, it is preferable that the outer peripheral surface 92b of the outer peripheral tubular portion 92 of the plate member 90 is an annular surface that narrows (decreases in diameter) toward the inner periphery side toward the outside in the axis x direction. In this case, it can be made difficult for foreign matter to move to the sealing device 20 side through the outer peripheral tubular portion 92 of the plate member 90. Also in this case, the outer peripheral surface 11 of the pocket 16 is a surface which increases in diameter toward the outside in the axis x direction as described above.

As described above, the sealing structure 5 with an annular pocket and a sealing device according to the ninth embodiment of the present disclosure can suppress the seal lip 24 of the sealing device 20 from being exposed to foreign matter intruding from the outside of the engine 80 or the case 83.

It is to be noted that the shape of the plate member 90 is not limited to the above-described shape. For example, the outer peripheral tubular portion 92 may not be a portion having a tubular plate shape as shown in FIG. 13. Furthermore, like the slinger 30 of the sealing structure 1, the plate member 90 may have a tubular portion (inner peripheral tubular portion) facing the outer peripheral tubular portion 92 on the inner periphery side. Furthermore, the shape of the recessed part 17 of the pocket 16 formed by the plate member 90 is not limited to the above-described shape.

Next, a sealing structure 5' with an annular pocket and a sealing device according to a tenth embodiment of the present disclosure will be described. The sealing structure 5' according to the tenth embodiment of the present disclosure is different from the sealing structure 5 according to the ninth embodiment of the present disclosure only in the shape of an annular gap formed by the side lip 29 and the outer peripheral surface 11 of the pocket 16. Hereinafter, with respect to configurations having the same or similar functions as those of the sealing structure 5 according to the ninth embodiment of the present disclosure described above, description on these configurations will be omitted while the configurations are represented by the same reference signs, and only different configurations will be described.

Figure 14:
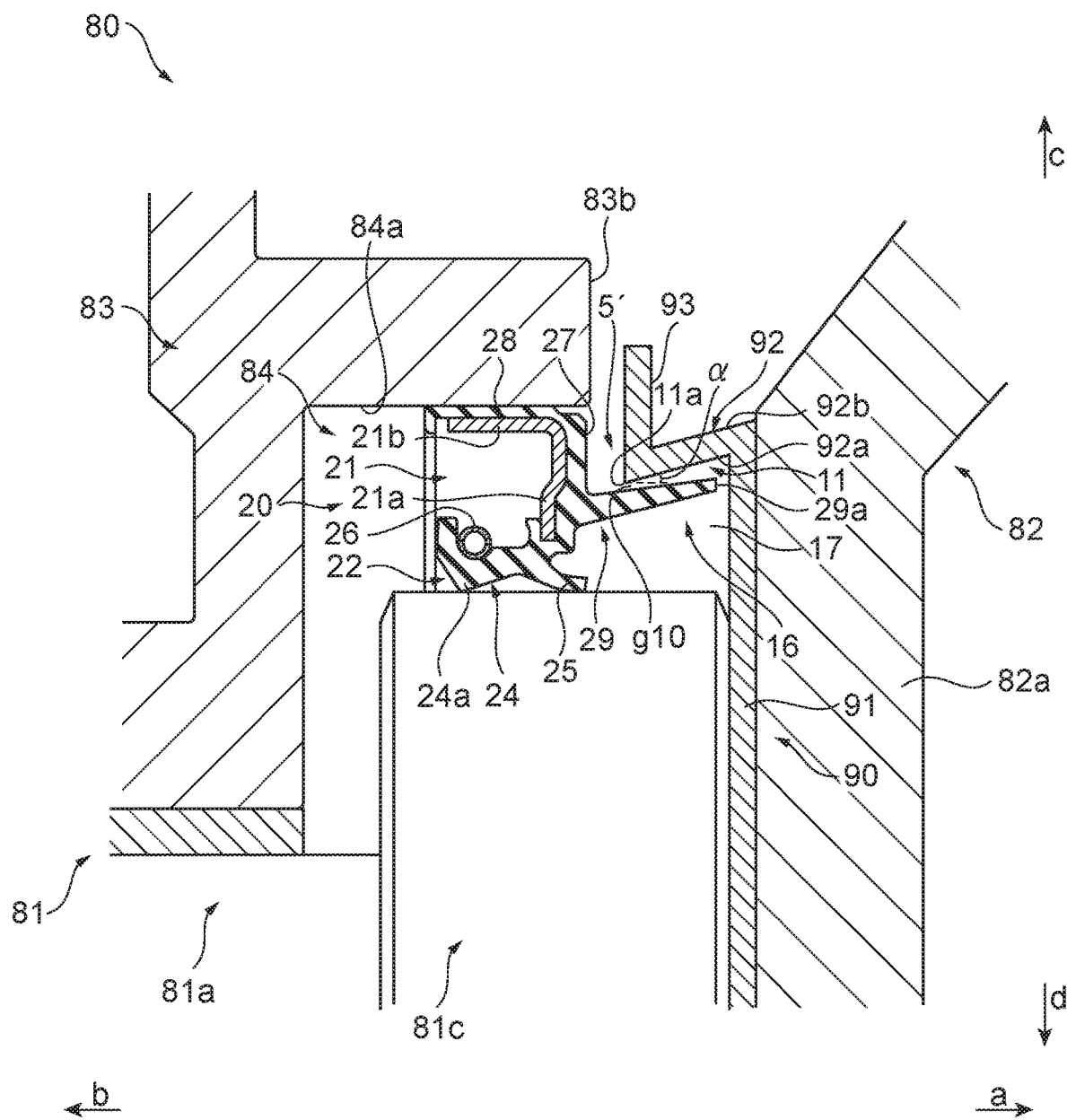
FIG. 14 is a partially enlarged cross-sectional view of a cross-section taken along an axis to show a schematic configuration of a sealing structure according to a tenth embodiment of the present disclosure.

FIG. 14 is a partially enlarged cross-sectional view of a cross-section taken along the axis to show a schematic configuration of the sealing structure 5' according to the tenth embodiment of the present disclosure. As shown in FIG. 14, a portion on the outer end 29a side of the side lip 29 of the sealing device 20 enters into the pocket 16, and the side lip 29 and the outer peripheral surface 11 of the pocket 16 overlap each other radially over the axis x direction. That is, the side lip 29 and the outer peripheral surface 11 of the pocket 16 face each other in the radial direction, and an annular gap g10 is formed between the side lip 29 and the outer peripheral surface 11 of the pocket 16. That is, the side lip 29 and the outer peripheral surface 11 of the pocket 16 overlap each other.

The annular gap g10 formed by the side lip 29 and the outer peripheral surface 11 of the pocket 16 forms a labyrinth seal. Therefore, like the above-described sealing structure 5, the sealing structure 5' can suppress foreign matter intruding from the outside of the engine 80 or the case 83 from further intruding to the seal lip 24 side. As a result, it is possible to suppress the seal lip 24 of the sealing device 20 from being exposed to foreign matter intruding from the outside, and it can be suppressed that the lip tip end portion 24a bites foreign matter and thus is damaged or deteriorated, and the sealing performance of the sealing device 20 deteriorates to cause leakage of lubricant. Furthermore, it can be also suppressed that the lip tip end portion 24a bites foreign matter and thus is damaged and deteriorated, thereby causing foreign material to intrude from the outside of the engine 80 or the case 82 into the inside of the engine 80 or the case 83.

Furthermore, the sealing performance of the gap g10 as the labyrinth seal is more enhanced as the overlapping (overlap) range over the axis x direction between the side lip 29 and the outer peripheral surface 11 of the pocket 16 is broader.

Furthermore, in the sealing structure 5', the gap between the plate member 90 and the rear cover 27 of the elastic body portion 22 of the sealing device 20 can be narrowed, which makes it difficult for foreign matter to pass through this gap. Therefore, in addition to the action of the labyrinth seal g10, it is possible to suppress foreign matter from intruding the seal lip 24 side. It is to be noted that by increasing the length in the radial direction of the flange portion 93 of the plate member 90, the gap between the flange portion 93 and the rear cover 27 of the elastic body portion 22 can be extended to the outer surface 83b which is an outer surface of the case 83, and intrusion of foreign matter to the seal lip 24 side can be further suppressed.

As described above, like the sealing structure 5 according to the ninth embodiment of the present disclosure, the sealing structure 5' with an annular pocket and a sealing device according to the tenth embodiment of the present disclosure can suppress the seal lip 24 of the sealing device 20 from being exposed to foreign matter intruding from the outside of the engine 80 or the case 83.

Figure 15:
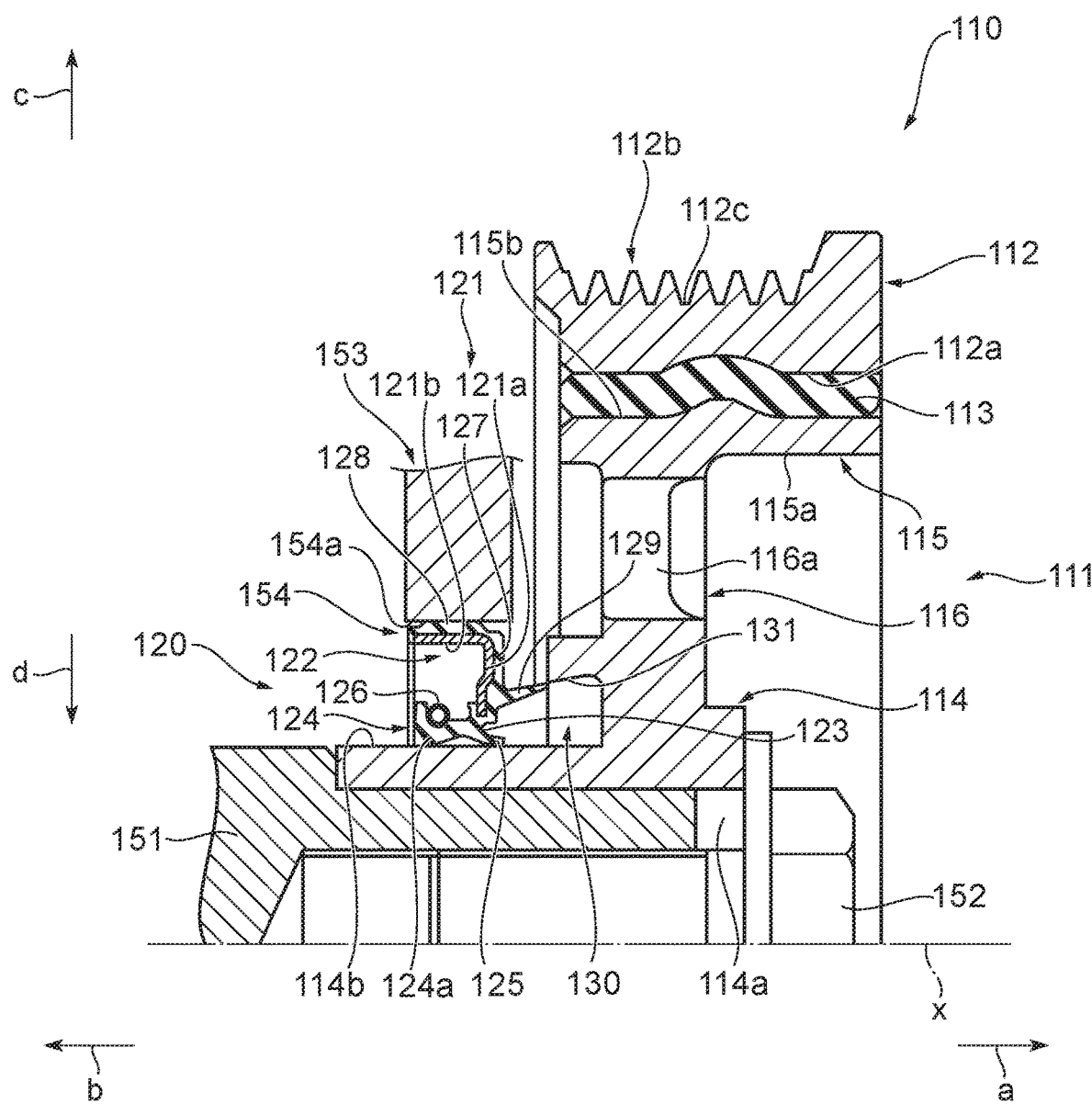
FIG. 15 is a partial cross-sectional view of a cross-section taken along an axis to show a schematic configuration of a sealing structure with a torsional damper and an oil seal according to an eleventh embodiment of the present disclosure.

Next, a sealing structure with an annular pocket and a sealing device according to an eleventh embodiment of the present disclosure will be described. FIG. 15 is a partial cross-sectional view of a cross-section taken along the axis to show a schematic configuration of a sealing structure with a torsional damper and an oil seal as a sealing structure with an annular pocket and a sealing device according to the eleventh embodiment of the present disclosure. The sealing structure with a torsional damper and an oil seal according to the eleventh embodiment of the present disclosure is applied to an engine of a vehicle.

As shown in FIG. 15, the sealing structure 101 with a torsional damper and an oil seal according to the eleventh embodiment of the present disclosure includes a damper pulley 110 as a torsional damper as the functional member, and an oil seal 120 as a sealing device. The damper pulley 110 is fixed to one end of a crankshaft 151 as the shaft member of the engine by a bolt 152, and the oil seal 120 seals between a through-hole 154 of a front cover 153 of the engine as the attachment target portion and the damper pulley 110.

The damper pulley 110 includes a hub 111, a pulley 112 as a mass body, and a damper elastic body 113 disposed between the hub 111 and the pulley 112. The hub 111 is a member in an annular shape centered about the axis x, and includes a boss portion 114 on the inner periphery side, a rim portion 115 on the outer periphery side, a substantially circular disc-shaped disc portion 116 for connecting the boss portion 114 and the rim portion 115. The hub 111 is manufactured, for example, from a metal material by casting or the like.

In the hub 111, the boss portion 114 is a portion in an annular shape centered about the axis x in which a through-hole 114a is formed, and the disc portion 116 extends from the outer peripheral surface of the outer portion in the outer peripheral direction. The boss portion 114 has an outer peripheral surface 114b which is a surface on the outer periphery side of a cylindrical inner portion, and the outer peripheral surface 114b is a smooth surface, and serves as a sealing surface of the oil seal 120 as described later. The rim portion 115 is a portion in an annular shape, more specifically, a cylindrical portion centered about the axis x, and a portion positioned concentrically with the boss portion 114 on the outer periphery side than the boss portion 114. The disc portion 116 extends in the inner peripheral direction from the inner peripheral surface 115a which is a surface on the inner periphery side of the rim portion 115. The damper elastic body 113 is press-fitted to an outer peripheral surface 115b which is a surface on the outer periphery side surface of the rim portion 115.

Figure 16:
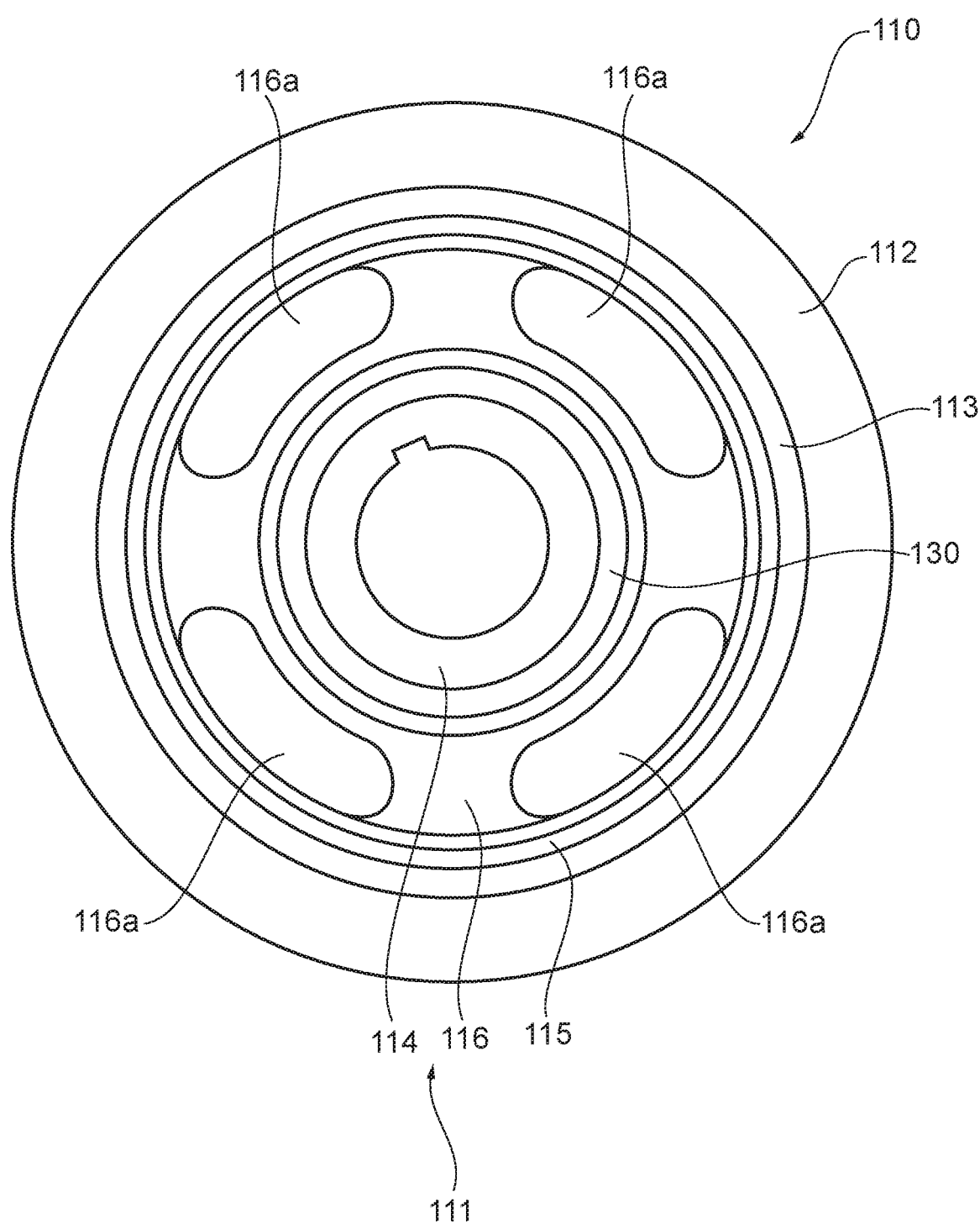
FIG. 16 is a rear view showing a schematic structure of the torsional damper in the sealed structure shown in FIG. 15.

The disc portion 116 extends between the boss portion 114 and the rim portion 115 to connect the boss portion 114 and the rim portion 115. The disc portion 116 may extend in a direction vertical to the axis x or may extend in a direction inclined with respect to the axis x. In addition, the disc portion 116 may be shaped so that the cross-section along the axis x (hereinafter also merely referred to as "cross-section") of the disc portion 116 is curved or extends straightly. As shown in FIGS. 15 and 16, at least one window portion 116a which is a through hole penetrating through the disc portion 116 between the inside and the outside is formed in the disc portion 116. In the present embodiment, four window portions 116a are formed concentrically with respect to the axis x to be arranged at equal angular intervals in the peripheral direction (see FIG. 16). This window portion 116a makes it possible to reduce the weight of the hub 111, and thus the damper pulley 110.

The pulley 112 is a member in an annular shape centered about the axis x, and has such a shape as to cover the hub 111 on the outer periphery side. Specifically, the inner peripheral surface 112a which is a surface on the inner periphery side of the pulley 112 has a shape corresponding to the outer peripheral surface 115b of the rim portion 115 of the hub 111, and as shown in FIG. 15, the pulley 112 is positioned so that its inner peripheral surface 112a faces the outer peripheral surface 115b of the rim portion 115 through a space therebetween in the radial direction. Furthermore, plural annular v-shaped grooves 112c are formed on the outer peripheral surface 112b which is a surface on the outer peripheral side of the pulley 112, and a timing belt (not shown) is enabled to be wound around the annular v-shaped grooves 112c.

The damper elastic body 113 is provided between the pulley 112 and the rim portion 115 of the hub 111. The damper elastic body 113 is a damper rubber and is formed by cross-linking (vulcanization) molding from a rubber-like elastic material excellent in heat resistance, cold resistance, and fatigue strength. The damper elastic body 113 is press-fitted between the pulley 112 and the rim portion 115 of the hub 111, and is fitted and fixed to the inner peripheral surface 112a of the pulley 112 and the outer peripheral surface 115b of the rim portion 115.

In the damper pulley 110, the pulley 112 and the damper elastic body 113 form a damper portion, and are synchronized with each other so that the torsional-direction natural frequency of the damper portion is equal to the torsional-direction natural frequency of the crankshaft 151 which is a predetermined vibration frequency range in which the torsional angle of the crankshaft 151 is maximized. That is, the inertial mass in the circumferential direction of the pulley 112 and the torsional-direction shearing spring constant of the damper elastic body 113 are adjusted so that the torsional-direction natural frequency of the damper portion is coincident with the torsional-direction natural frequency of the crankshaft 151.

Furthermore, the damper pulley 110 has a hub pocket 130 in an annular shape centered as the axis x, which extends in the peripheral direction along the boss portion 114 of the hub 111 and is recessed in the direction to the disc portion 116 (outward direction). Details of the hub pocket 130 will be described later with reference to FIG. 17.

As described above, the damper pulley 110 is attached to one end of the crankshaft 151 in the engine. Specifically, as shown in FIG. 15, one end of the crankshaft 151 is inserted through the through-hole 114a of the boss portion 114 of the hub 111, and the bolt 152 is screwed to the crankshaft 151 from the outside, whereby the damper pulley 110 is fixed to the crankshaft 151. Furthermore, a key such as a woodruff key engaging with the crankshaft 151 and the boss portion 114 is provided between the crankshaft 151 and the boss portion 114, so that the damper pulley 110 is not rotatable relatively to the crankshaft 151.

In a state where the damper pulley 110 is attached to the crankshaft 151, in the damper pulley 110, an inner portion having the outer peripheral surface 114b of the boss portion 114 is set to be inserted through the through-hole 154 of the front cover 153, and an annular space is formed between the outer peripheral surface 114b of the boss portion 114 and the through-hole 154 of the front cover 153.

As shown in FIG. 15, the oil seal 120 includes a metal reinforcing ring 121 in an annular shape centered about the axis x, and an elastic body portion 122 formed of an elastic material in an annular shape centered about the axis x. The elastic body portion 122 is integrally attached to the reinforcing ring 121. For example, stainless steel or SPCC (cold rolled steel) is used as the metal material of the reinforcing ring 121. For example, each kind of rubber material is used as the elastic material of the elastic body portion 122. For example, synthetic rubber such as nitrile rubber (NBR), hydrogenated nitrile rubber (H-NBR), acrylic rubber (ACM) or fluororubber (FKM) is used as each kind of rubber material.

The reinforcing ring 121 has, for example, a substantially L-shaped cross-section, and includes a disc portion 121a and a tubular portion 121b. The disc portion 121a is a hollow disc-shaped portion expanding in a direction substantially perpendicular to the axis x, and the tubular portion 121b is a cylindrical portion extending inward in the axis x direction from an end portion on the outer periphery side of the disc portion 121a.

The elastic body portion 122 is attached to the reinforcing ring 121, and is integrally formed with the reinforcing ring 121 so as to cover the reinforcing ring 121 from the outer side and the outer periphery side in the present embodiment. The elastic body portion 122 includes a lip waist portion 123, a seal lip 124, and a dust lip 125. As shown in FIG. 15, the lip waist portion 123 is a portion located in the neighborhood of the end portion on the inner periphery side of the disc portion 121a of the reinforcing ring 121, and the seal lip 124 is a portion which extends inward from the lip waist portion 123, and arranged so as to face the tubular portion 121b of the reinforcing ring 121. The dust lip 125 extends from the lip waist portion 123 toward the direction of axis x.

The seal lip 124 includes a wedge-shaped annular lip tip end portion 124a having a cross-sectional shape protruding toward the inner periphery side at an inner end portion thereof. As described later, the lip tip end portion 124a is formed so that the lip tip end portion 124a is brought into intimate contact with the outer peripheral surface 114b of the boss portion 114 of the hub 111 in a manner that the outer peripheral surface 114b is slidable, and seals the gap between the seal lip 124 and the damper pulley 110. A garter spring 126 for pressing the seal lip 124 inward in the radial direction is fitted to the outer peripheral portion side of the seal lip 124.

The dust lip 125 is a part extending from the lip waist portion 123, and extends to the outside and the inner periphery side. The dust lip 125 prevents intrusion of foreign matter toward the lip tip end portion 124a under the usage state.

Furthermore, the elastic body portion 122 includes a rear cover 127 and a gasket portion 128. The rear cover 127 covers the disc portion 121a of the reinforcing ring 121 from the outside, and the gasket portion 128 covers the tubular portion 121b of the reinforcing ring 121 from the outer periphery side.

Furthermore, the oil seal 120 includes a side lip 129 extending toward the outside. Details of the side lip 129 will be described later with reference to FIG. 17.

The reinforcing ring 121 is manufactured by, for example, press working or forging, and the elastic body portion 122 is formed by cross-linking (vulcanization) molding using a mold. During this cross-linking molding, the reinforcing ring 121 is placed in the mold, the elastic body portion 122 is adhesively bonded to the reinforcing ring 121 by cross-linking (vulcanization) bonding, and the elastic body portion 122 is molded integrally with the reinforcing ring 121.

As described above, the oil seal 120 seals a space formed between the through-hole 154 of the front cover 153 and the outer peripheral surface 114b of the boss portion 114 of the damper pulley 110. Specifically, the oil seal 120 is press-fitted into the through-hole 154 of the front cover 153 to be attached, and the gasket portion 128 of the elastic body portion 122 is compressed so as to liquid-tightly contact the inner peripheral surface 154a which is a surface on the inner periphery side of the through-hole 154. As a result, the gap between the oil seal 120 and the through-hole 154 of the front cover 153 is hermetically sealed. Further, the lip tip end portion 124a of the seal lip 124 liquid-tightly contact the outer peripheral surface 114b of the boss portion 114 of the hub 111, and the gap between the oil seal 120 and the damper pulley 110 is hermetically sealed.

Figure 17:
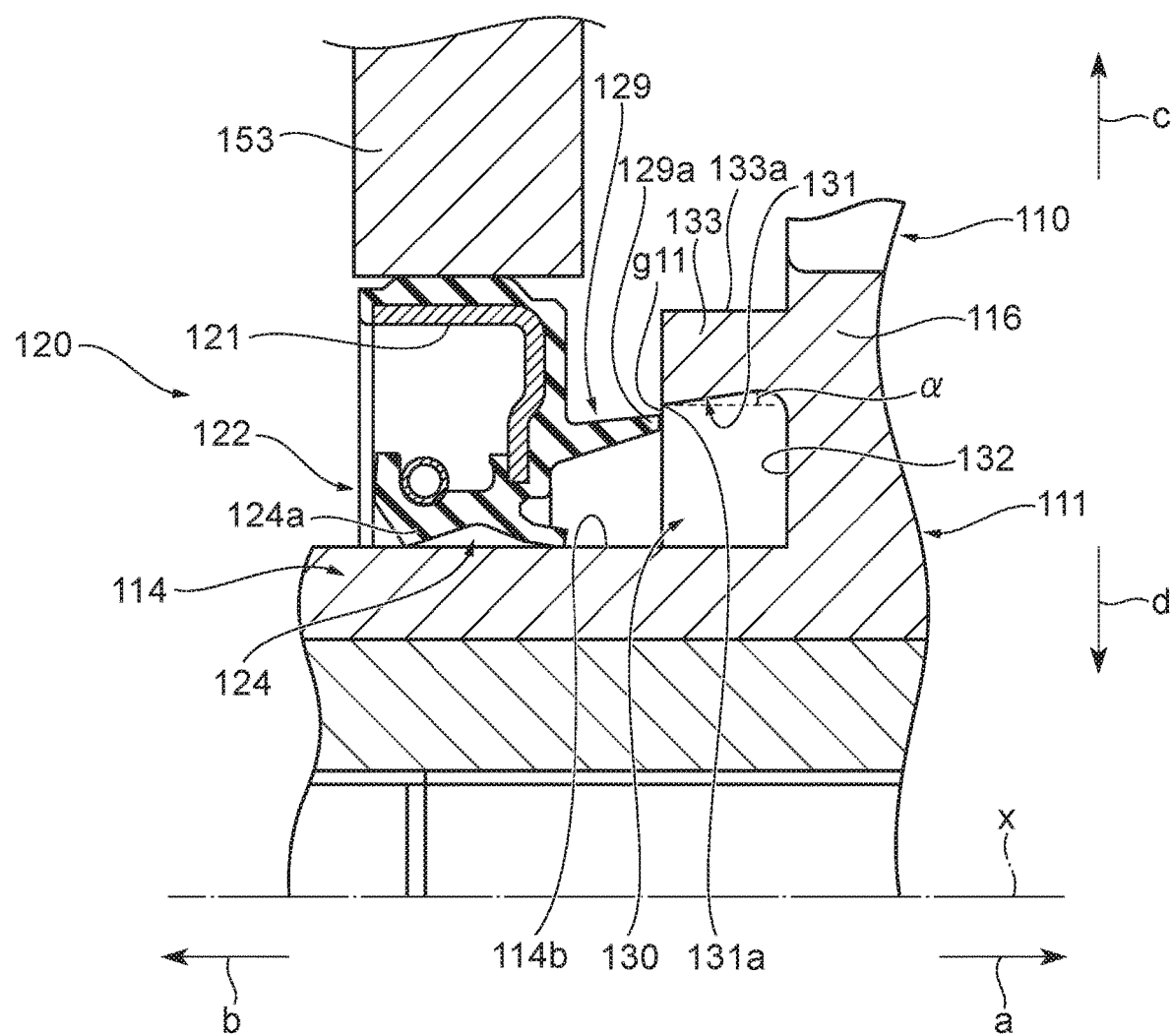
FIG. 17 is a partially enlarged view of the sealing structure with a torsional damper and an oil seal shown in FIG. 15.

Next, the hub pocket 130 of the damper pulley 110 and the side lip 129 of the oil seal 120 will be described with reference to FIG. 17. FIG. 17 is a partially enlarged view of the sealing structure 101 with a torsional damper and an oil seal.

As shown in FIG. 17, the hub pocket 130 is an annular recessed part which is formed on the inside of the disc portion 116 in the damper pulley 110, extends so as to surround the outer peripheral surface 114b of the boss portion 114 and is recessed in the direction toward the disc portion 116. Specifically, the hub pocket 130 includes an annular outer peripheral surface 131 facing the outer peripheral surface 114b of the boss portion 114 on the outer periphery side, and a bottom surface 132 extending between the outer peripheral surface 131 and the outer peripheral surface 114b of the boss portion 114, and the hub pocket 130 is defined by the outer peripheral surface 131, the bottom surface 132, and the outer peripheral surface 114b of the boss portion 114.

The outer peripheral surface 131 of the hub pocket 130 is an annular surface which increases in diameter as shifting in the direction toward the disc portion 116 (outward direction) in the axis x direction, and expands to the outer periphery side as shifting in the direction toward the disc portion 116 (outward direction) in the axis x direction, for example, a tapered surface having a substantially conical surface shape.

The hub pocket 130 may be formed by an annular ridge portion extending inward from the disc portion 116 of the hub 111 or formed by forming a recessed part recessed outward in the disc portion 116. Furthermore, the hub pocket 130 may be a combination of the ridge portion and the recessed part. When the hub pocket 130 is formed by the annular ridge portion extending inward from the disc portion 116, a surface on the inner periphery side of the ridge portion forms the outer peripheral surface 131 of the hub pocket 130. Furthermore, when the hub pocket 130 is formed by forming the recessed part recessed outward in the disc portion 116, a surface on the outer periphery side of the recessed part forms the outer peripheral surface 131 of the hub pocket 130. In the present embodiment, as shown in FIG. 17, an annular ridge portion 133 projecting inward in the axis x direction from the disc portion 116 of the hub 111 is formed, and the outer peripheral surface 131 is formed by this ridge portion 133, thereby forming the hub pocket 130.

The bottom surface 132 of the hub pocket 130 may be formed by the inner surface of the disc portion 116 of the hub 111, may be formed on the inside of the inner surface of the disc portion 116 of the hub 111, and may be formed by forming a recessed part on the inner surface of the disc portion 116 of the hub 111.

The diameter-increasing angle α which is an angle of the diameter-increasing outer peripheral surface 131 of the hub pocket 130 with respect to the axis x as described above is set to a predetermined value. Specifically, as shown in FIG. 17, the diameter-increasing angle α is an angle between the axis x (a straight line parallel to the axis x) and the outer peripheral surface 131 in cross-section. The diameter-increasing angle α of the outer peripheral surface 131 of the hub pocket 130 is an angle larger than 0°, preferably from not less than 4° to not more than 18°, more preferably not less than 5° to not more than 16°, and further preferably from not less than 7° to not more than 15°. As described above, the outer peripheral surface 131 of the hub pocket 130 is inclined to the outer periphery side by the diameter-increasing angle α with respect to the axis x.

As shown in FIG. 17, the side lip 129 of the oil seal 120 extends in the outward direction, more specifically, extends in parallel to the axis x or obliquely with respect to the axis x in the outward direction and the outer peripheral direction. An outer end 129a which is an end portion on the outside of the side lip 129 is located radially on the inner periphery side than the inner end 131a which is an end portion on the inside of the outer peripheral surface 131 of the hub pocket 130, and does not enter into the inside of the hub pocket 130 in the axis x direction (outward direction). That is, the side lip 129 of the oil seal 120 and the outer peripheral surface 131 of the hub pocket 130 do not overlap each other in the radial direction.

As described above, an annular gap g11 is formed between the outer end 129a of the side lip 129 and the inner end 131a of the outer peripheral surface 131 of the hub pocket 130 by the side lip 129 and the hub pocket 130.

The annular gap g11 formed by the outer end 129a of the side lip 129 and the inner end 131a of the outer peripheral surface 131 of the hub pocket 130 forms a labyrinth seal. Therefore, even when foreign matter such as muddy water, sand, or dust intrudes from the outside via the window portion 116a of the disc portion 116 of the hub 111 in addition to the gap between the damper pulley 110 and the front cover 153, the intruding foreign mater can be suppressed from further intruding to the seal lip 124 side by the labyrinth seal formed (gap g11) formed by the side lip 129 and the hub pocket 130. As a result, the seal lip 124 of the oil seal 120 can be suppressed from being exposed to the foreign matter intruding from the damper pulley 110 as described above. Therefore, it can be suppressed that the lip tip end portion 124a bites foreign matter and thus is damaged and deteriorated, so that the seal performance of the oil seal 120 deteriorates to causes leakage of oil. It is to be noted that the foreign matter intruding from the damper pulley 110 includes foreign matter intruding from the outside via the gap between the damper pulley 110 and the front cover 153, and foreign matter intruding from the outside through the window portion 116a of the disc portion 116 of the hub 111.

Furthermore, since the outer peripheral surface 131 of the hub pocket 130 forming the labyrinth seal (the gap g11) has a shape which increases in diameter toward the outside as described above, the foreign matter can be more effectively suppressed from further intruding to the seal lip 124 side at the labyrinth seal.

Since the outer peripheral surface 131 of the hub pocket 130 forming the labyrinth seal (the gap g11) has a shape which increases in diameter at the predetermined diameter-increasing angle α toward the outside as described above, the foreign matter can be further effectively suppressed from further increasing to the seal lip 124 side at the labyrinth seal.

As described above, the sealing structure 101 with a torsional damper and an oil seal according to the eleventh embodiment of the present disclosure can suppress the seal lip 124 of the oil seal 120 from being exposed to foreign matter intruding from the damper pulley 110, which corresponds to the total of foreign matter intruding from the gap between the damper pulley 110 and the front cover 153 and foreign matter intruding via the window portion 116a of the damper pulley 110.

An outer peripheral surface 133a (see FIG. 17) which is a surface on the outer periphery side of the ridge portion 133 forming the hub pocket 130 may form an annular surface which expands to the outer periphery side toward the inside in the axis x direction, for example, a taper surface having a conical surface shape. In this case, foreign matter intruding from the damper pulley 110 can be suppressed from reaching the oil seal 120 by accumulating the foreign matter on the outer peripheral surface 133a of the ridge portion 133. Furthermore, the foreign matter accumulated on the outer peripheral surface 133a of the ridge portion 133 can be discharged downward by its own weight or by rotation of the damper pulley 110.

Next, the sealing performance of the sealing structure 101 with a torsional damper and an oil seal according to the present embodiment of the present disclosure will be described.

Evaluation Test 1: Evaluation of Diameter-Increasing Angle α

Figure 18:
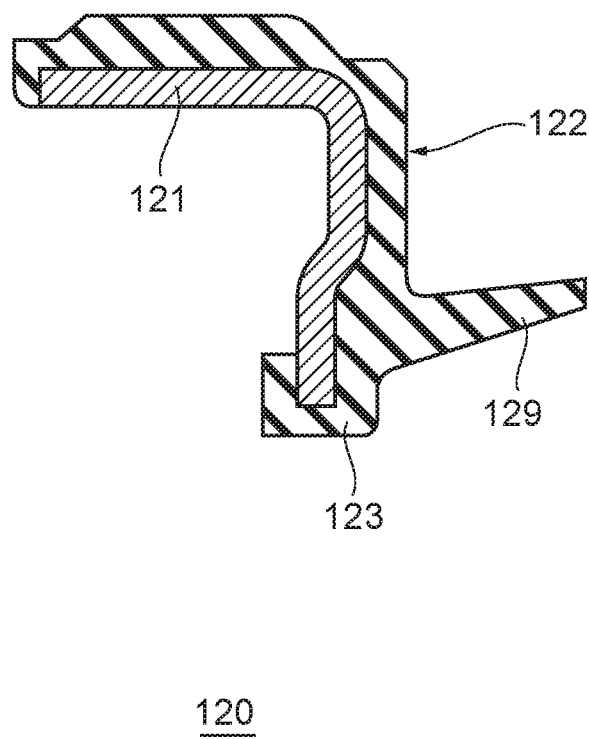
FIG. 18 is a partial cross-sectional view of a cross-section taken along an axis to show a schematic structure of an oil seal for an evaluation test in a test example of the sealing structure with a torsional damper and an oil seal according to the present disclosure.

The inventor fabricated sealing structures 101 with a torsional damper and an oil seal according to the eleventh embodiment of the present disclosure which were different in diameter-increasing angle α (test examples 1 to 4), and an evaluation test of the sealing performance of these sealing structures 1 with a torsional damper and an oil seal was conducted. However, the test example 4 is a sealing structure with a torsional damper and an oil seal in which the diameter-increasing angle α is equal to 0° with respect to the sealing structure with a torsional damper and an oil seal according to the eleventh embodiment of the present disclosure described above. For the convenience of the evaluation of the sealing performance, in examples 1 to 4, the formation of the seal lip 124, the dust lip 125, and the garter spring 126 of the elastic body portion 122 in the oil seal 120 was omitted (see FIG. 18).

In the test example 1, the diameter-increasing angle α of the outer peripheral surface 131 of the hub pocket 130 was set to α=7.2°, and the diameter φ at the inner end 131a of the outer peripheral surface 131 of the hub pocket 130 was set to φ=52.0 mm. In the test example 2, the diameter-increasing angle α was set to 14.4°, and the diameter φ at the inner end 131a of the outer peripheral surface 131 of the hub pocket 130 was set to ϕ=52.0 mm. In the test example 3, the diameter-increasing angle α was set to 21.6°, and the diameter ϕ at the inner end 131a of the outer peripheral surface 131 of the hub pocket 130 was set to 4=52.0 mm. In the test example 4, the diameter-increasing angle α was set to α=0°, and the diameter ϕ at the inner end 131a of the outer peripheral surface 131 of the hub pocket 130 was set to ϕ=54.2 mm. In the test examples 1 to 4, the overlapping amount (overlap amount) over the axis x direction between the side lip 129 and the outer peripheral surface 131 of the hub pocket 130 is equal to 0 mm. In the test examples 1 to 4, the materials of the reinforcing ring 121 and the elastic body portion 122 were EPDM and FC 250, respectively.

Figure 19:
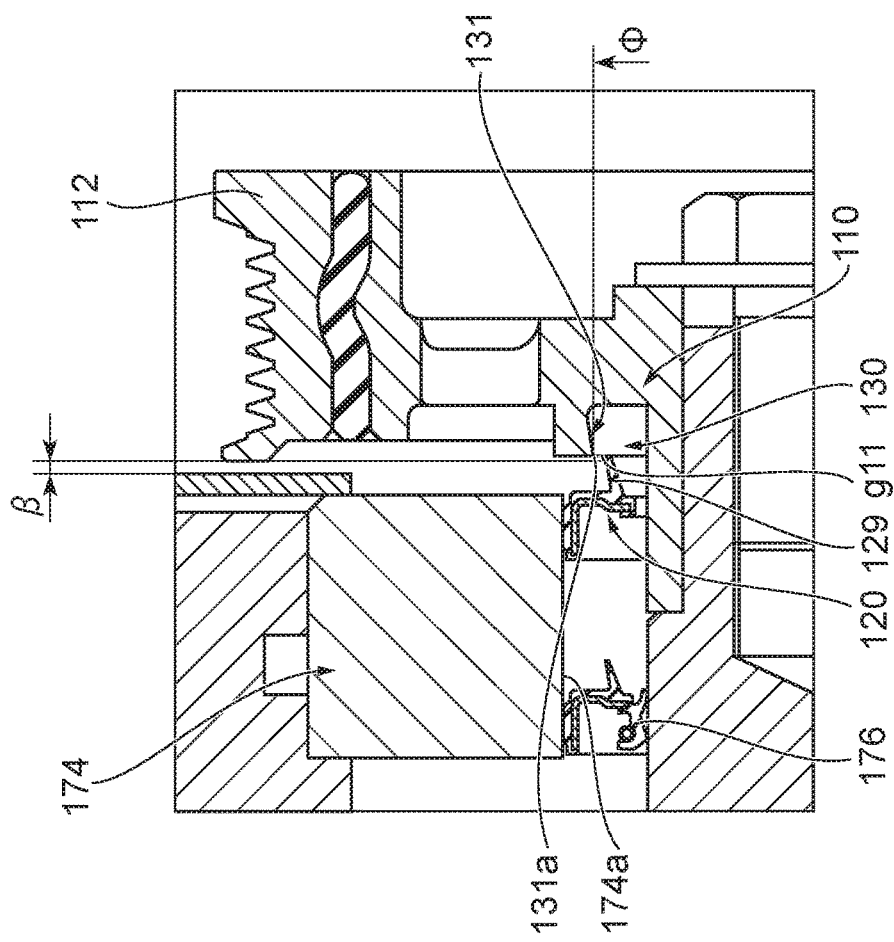
FIG. 19 (*a*) is a partial cross-sectional perspective view showing a schematic configuration of a sealing performance test machine used for the evaluation test of sealing performance.
Figure 19:
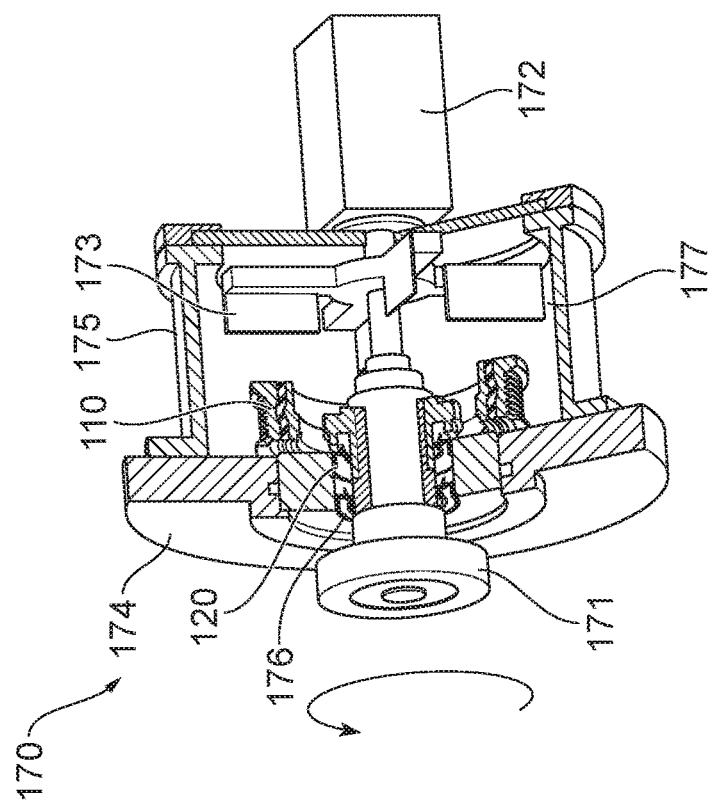

FIGS. 19(a) and 19(b) a diagrams showing a schematic configuration of a sealing performance test machine 170 used for the evaluation test of the sealing performance described above, FIG. 19(a) is a partial cross-sectional perspective view, and FIG. 19(b) is a partially enlarged cross-sectional vie. As shown in FIGS. 19(a) and 19(b), the sealing performance test machine 170 includes a dummy crankshaft 171 rotatable by a motor (not shown), an impeller 173 rotatable by a motor 172, and a dummy front cover 174. A cylindrical cover 175 is attached to the dummy front cover 174. The cover 175 accommodates therein the sealing structure with a torsional damper and an oil seal according to the test examples 1 to 4 and the impeller 173, and forms a sealed space around these members. In a through-hole 174a of the dummy front cover 174, a seal member 176 for sealing the gap between the dummy crankshaft 171 and the dummy front cover 174 from the outside is attached on the outside of the oil seal in the test examples 1 to 4. As described above, in the sealing performance test machine 170, the ambient space of the sealing structure with a torsional damper and an oil seal according to the test examples 1 to 4 is sealed. Dust 177 as a foreign matter is accumulated inside the cover 175. As the dust 177 is used powder 1 for JIS test (type 1 and type 8) or type 1 or type 3 of test powder described in JIS Z 8901: 2006 (hereinafter also referred to as "JIS type 1" and "JIS type 3"). Furthermore, as shown in FIG. 19(b), the interval β in the axis direction between the dummy front cover 174 and the pulley 112 of the damper pulley 110 is equal to β=2.5 mm.

Figure 20:
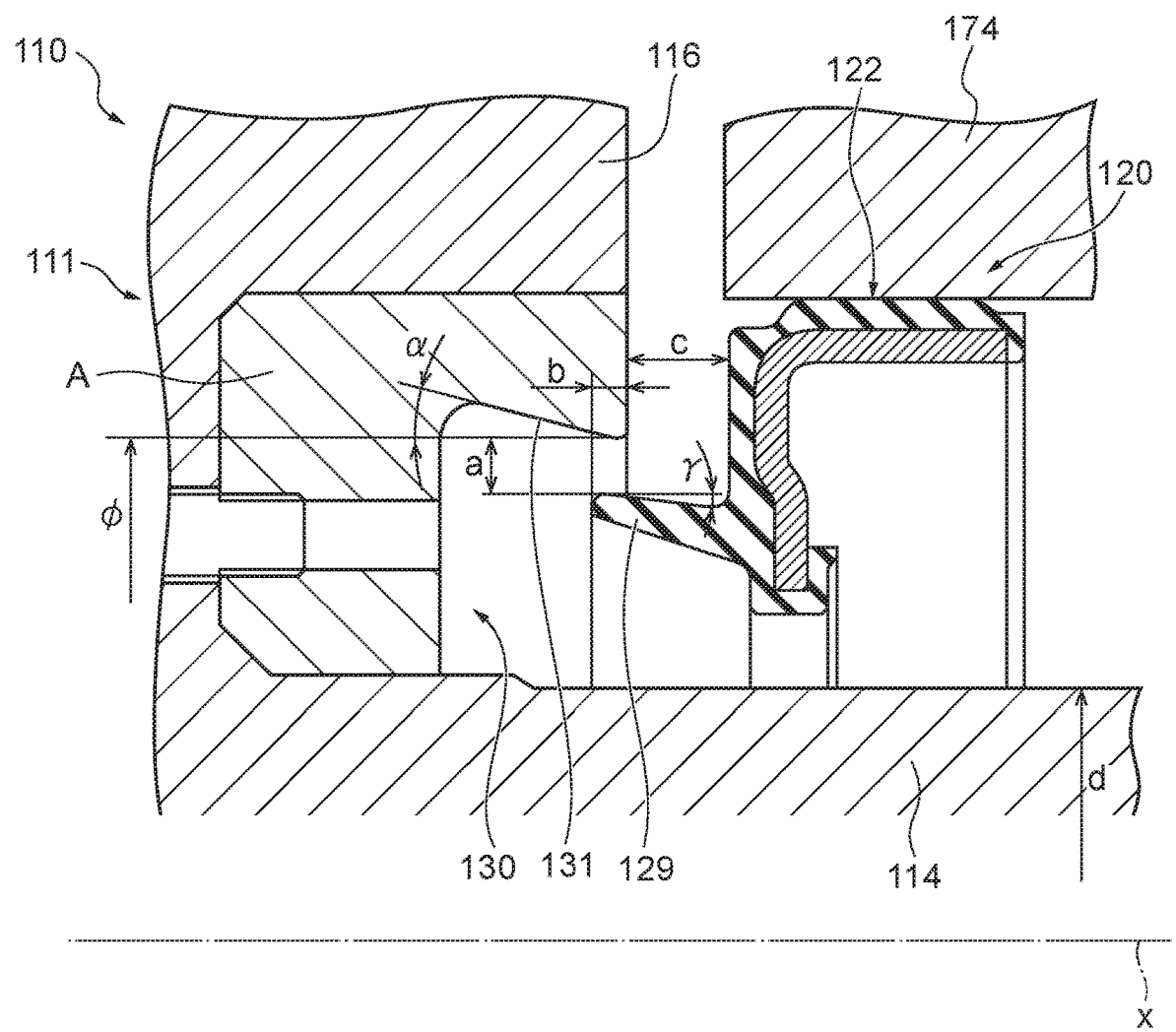
FIG. 20 is an enlarged view showing a vicinity of a hub pocket of the sealing structure with a torsional damper and an oil seal used for the evaluation test.

FIG. 20 is an enlarged view showing the vicinity of the hub pocket 130 of the sealing structure with a torsional damper and an oil seal 101 used for the evaluation test. In the evaluation test, as shown in FIG. 20, the damper pulley 110, in which a recessed part in an annular shape centered or substantially centered about the axis x is formed in the hub 111 of the damper pulley 110, and the hub pocket 130 is formed by detachably fixing, in the recessed part, an attachment A which is an annular member having a groove corresponding to the hub pocket 130 formed therein, is used. For the sake of convenience, in FIG. 20, the side lip 129 is illustrated as if it overlaps the hub pocket 130.

The evaluation test of the sealing performance was conducted by rotating the impeller 173 with the motor 172 to stir dust accumulated in the cover 175, and measuring the amount of dust passing through the gap g11 between the side lip 129 and the hub pocket 130 (dust intrusion amount). In the evaluation test, the dummy crankshaft 171 was rotated to approximate the damper pulley 110 and the oil seal 120 to a usage state, and the ambient temperature was set to room temperature. The evaluation test was conducted for 1 hour.

The result of this evaluation test on the sealing performance is shown in the following table.

TABLE 1

|  | Test example 1 | Test example 2 | Test example 3 | Test example 4 |
| --- | --- | --- | --- | --- |
| Diameter-increasing angle α (°) | 7.2 | 14.4 | 21.6 | 0 |
| Diameter ϕ (mm) | 52.0 | 52.0 | 52.0 | 54.2 |
| Dust intrusion amount (g) | 2.1 | 1.0 | 8.1 | 4.8 |

As shown in Table 1, when the test example 4 in which the diameter-increasing angle α is equal to 0° is compared with the test examples 1 and 2 in which the diameter-increasing angle α is larger than 0°, it is apparent that the sealing performance of the labyrinth seal (gap g11) formed by the hub pocket 130 and the side lip 129 in which the diameter-increasing a is larger than 0° is high. In the test examples 1 and 2 in which the diameter-increasing angle α is in the range from not less than 4° to not more than 18°, the dust intrusion amounts thereof are equal to 2.1 g and 1.0 g respectively, and the sealing performance of the labyrinth seal (gap g11) formed by the side lip 129 and the hub pocket 130 is high. On the other hand, in the test example 3 in which the diameter-increasing angle α is not in the range from not less than 4° to not more than 18°, the dust intrusion amount is equal to 8.1 g, and the sealing performance of the labyrinth seal (gap g11) formed by the side lip 129 and the hub pocket 130 is lower as compared with the test examples 1 and 2. As described above, it is apparent that the sealing structure 101 with a torsional damper and an oil seal according to the test example 1 and the test example 2 can greatly suppress the seal lip 124 of the oil seal 120 from being exposed to the foreign matter intruding from the damper pulley 110. That is, it is apparent that the sealing structure 1 with a torsional damper and an oil seal in which the diameter-increasing angle α is within the range from not less than 4° to not more than 18° can greatly suppress the seal lip 124 of the oil seal 120 from being exposed to foreign matter intruding from the damper pulley 110.

Evaluation Test 2: Evaluation of Gap Angle Difference δ

The present inventor fabricated sealing structures 101 (test examples 11 to 20) each with a torsional damper and an oil seal according to the eleventh embodiment of the present disclosure that included different combinations of the diameter-increasing angle α of the outer peripheral surface 131 of the hub pocket 130 and the inclination angle (inclination angle γ) with respect to the axis x of the side lip 129 (see FIG. 20), and conducted an evaluation test of the sealing performance of the sealing structures with a torsional damper and an oil seal. However, the test example 11 is the sealing structure with a torsional damper and an oil seal in which the diameter-increasing angle α is set to α=0° with respect to the sealing structure 101 with a torsional damper and an oil seal according to the eleventh embodiment of the present disclosure. The evaluation test of the sealing performance of the sealing structures according to the test examples 11 to 20 was likewise conducted by using the sealing device for test (see FIGS. 18 and 20) and the sealing performance test machine 170 (see FIGS. 19(a) and 19(b)) as in the case of the evaluation tests for the sealing devices of the test examples 1 to 4 described above.

In the test examples 11 to 15, the inclination angle γ with respect to the axis x of the side lip 129 was set to γ=7.2°, and in each test example, the diameter-increasing angle α of the outer peripheral surface 131 of the hub pocket 130 was changed, as the result of this, each of the difference (gap angle difference δ=α−γ) between the diameter-increasing angle α of the hub pocket 130 and the inclination angle γ of the side lip 129 was set to the different value. Furthermore, in the test examples 16 to 20, the inclination angle γ of the side lip 129 was set to γ=19.3°, and in each test example, the diameter-increasing angle α of the hub pocket 130 was changed, as the result of this, each of the gap angle difference δ was set to the different value.

Specifically, in the test example 11, the diameter-increasing angle α of the hub pocket 130 was set to α=0°, and the gap angle difference δ was set to δ=−7.2°. The minus value of the gap angle difference δ indicates that the side lip 129 is inclined more greatly than the outer peripheral surface 131 of the hub pocket 130. In the test example 12, the diameter-increasing angle α of the hub pocket 130 was set to α=7.2°, and the gap angle difference δ was set to δ=0°. In the test example 13, the diameter-increasing angle α of the hub pocket 130 was set to α=14.4°, and the gap angle difference δ was set to δ=7.2°. In the test example 14, the diameter-increasing angle α of the hub pocket 130 was set to α=19.3°, and the gap angle difference δ was set to δ=12.1°. In the test example 15, the diameter-increasing angle α of the hub pocket 130 was set to α=21.6°, and the gap angle difference δ was set to δ=14.4°. In the test example 16, the diameter-increasing angle α of the hub pocket 130 was set to α=19.3°, and the gap angle difference δ was set to δ=0°. In the test example 17, the diameter-increasing angle α of the hub pocket 130 was set to α=21.6°, and the gap angle difference δ was set to δ=2.3°. In the test example 18, the diameter-increasing angle α of the hub pocket 130 was set to α=26.5°, and the gap angle difference δ was set to δ=7.2°. In the test example 19, the diameter-increasing angle α of the hub pocket 130 was set to α=31.4°, and the gap angle difference δ was set to δ=12.1°. In the test example 20, the diameter-increasing angle α of the hub pocket 130 was set to α=33.7°, and the gap angle difference δ was set to δ=14.4°.

Figure 21:
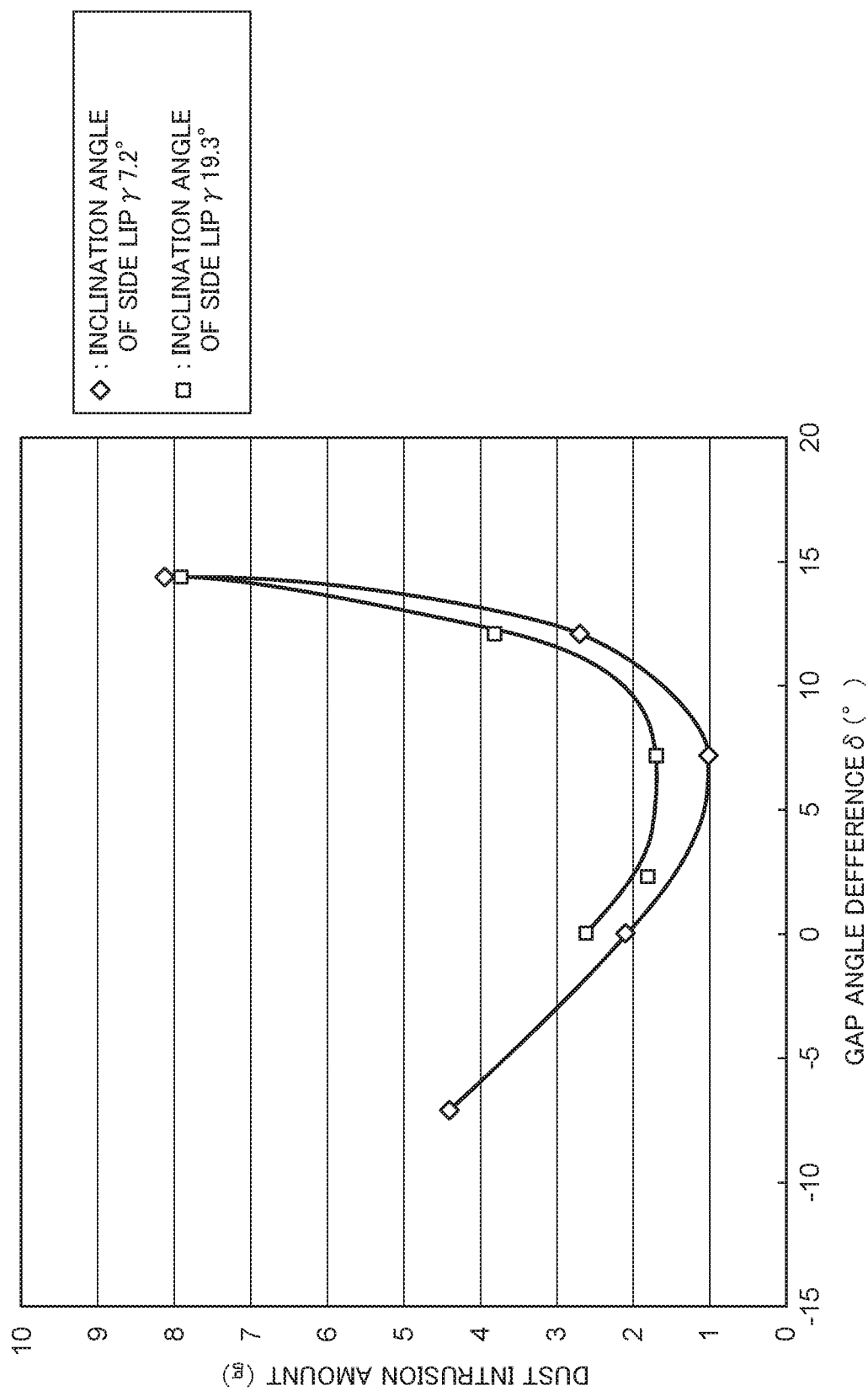
FIG. 21 is a diagram showing a relationship between a gap angle difference and a dust intrusion amount in the sealing structure shown in FIG. 15.

An evaluation test result of the present sealing performance is shown in FIG. 21 and the following table 2.

TABLE 2

| Test example | 11 | 12 | 13 | 14 | 15 | 16 | 17 | 18 | 19 | 20 |
|---|---|---|---|---|---|---|---|---|---|---|
| Diameter-increasing angle α (°) | 0 | 7.2 | 14.4 | 19.3 | 21.6 | 19.3 | 21.6 | 26.5 | 31.4 | 33.7 |
| Inclination angle γ (°) | 7.2 | 7.2 | 7.2 | 7.2 | 7.2 | 19.3 | 19.3 | 19.3 | 19.3 | 19.3 |
| Gap angle difference δ (°) | −7.2 | 0 | 7.2 | 12.1 | 14.4 | 0 | 2.3 | 7.2 | 12.1 | 14.4 |
| Dust intrusion amount (g) | 4.4 | 2.1 | 1.0 | 2.7 | 8.1 | 2.6 | 1.8 | 1.7 | 3.8 | 7.9 |

As shown in FIG. 21 and Table 2, from the present evaluation test, it is found that there is a relationship between the gap angle difference δ and the dust intrusion amount. Even when the value of the inclination angle γ of the side lip 129 was equal to γ=7.2° or γ=19.3°, there was found a tendency that the dust intrusion amount was reduced in the case of the gap angle difference δ ranging from not less than 1.0° to not more than 11.0°, the dust intrusion amount was further reduced in the case of the gap angle difference δ ranging from not less than 2.0° to not more than 9.0°, and the dust intrusion amount was still more reduced in the case of the gap angle difference δ ranging from not less than 3.0° to not more than 8.0°. Even when the value of the inclination angle γ of the side lip 129 was equal to γ=7.2° or γ=19.3°, there was found a tendency that the dust intrusion amount was most reduced in the case of the gap angle difference δ=7.2°. From this evaluation result, it is apparent that irrespective of the value of the gap angle difference γ of the side lip 129, the dust intrusion amount can be effectively reduced in the case of the gap angle difference δ ranging from not less than 1.0° to not more than 11.0°, the dust intrusion amount can be more reduced in the case of the gap angle difference δ ranging from not less than 2.0° to not more than 9.0°, and the dust intrusion amount can be still more reduced in the case of the gap angle difference δ ranging from not less than 3.0° to not more than 8.0°. Furthermore, in order to reduce the dust intrusion amount, it is appreciated to be most preferable that the gap angle difference δ is equal to 7.2° irrespective of the value of the inclination angle γ of the side lip 129.

Evaluation Test 3: Evaluation of Shaft Diameter of Boss Portion of Damper Pulley The present inventor fabricated sealing structures 101 (test examples 21 to 33) each with a torsional damper and an oil seal according to the eleventh embodiment of the present disclosure which included different combinations of the shaft diameter d (see FIG. 20) corresponding to the diameter of the shaft of the boss portion 114 of the damper pulley 110 and the gap angle difference δ, and conducted an evaluation test of the sealing performance of the sealing structures with a torsional damper and an oil seal. However, the test examples 21, 25, and 30 are sealing structures with a torsional damper and an oil seal in which the diameter-increasing angle α was set to α=0° with respect to the sealing structure 101 with a torsional damper and an oil seal according to the eleventh embodiment of the present disclosure. In the test examples 21 to 24, the shaft diameter d of the boss portion 114 was set to d=35 mm. In the test examples 25 to 29, the shaft diameter d of the boss portion 114 was set to d=42 mm. In the examples 30 to 33, the shaft diameter d of the boss portion 114 was set to d=50 mm. The evaluation test of the sealing performance of the sealing structures according to the test examples 21 to 33 was likewise conducted by using the sealing device for test (see FIGS. 18 and 20) and the sealing performance test machine 170 (FIGS. 19(a) and 19(b)) as in the case of the evaluation test for the sealing devices of the test examples 1 to 4 described above. In this evaluation test, the inclination angle γ of the side lip 129, a gap width a which is the width of the gap g1 in the radial direction, an overlap amount b which is an amount by which the side lip 129 and the hub pocket 130 overlap each other, and an interval c which is the interval in the axis x direction between the disc portion 116 of the damper pulley 110 and the oil seal 120 are respectively set to the same values among the sealing structures of the respective shaft diameters d. The overlap amount b is set to b=0, and the inclination angle γ of the side lip 129 is set to γ=7.2°.

Specifically, in the test example 21, the diameter-increasing angle α of the hub pocket 130 was set to α=0° and the gap angle difference δ was set to δ=−7.2°. In the test example 22, the diameter-increasing angle α of the hub pocket 130 was set to α=7.2°, and the gap angle difference δ was set to δ=0°. In the test example 23, the diameter-increasing angle α of the hub pocket 130 was set to α=14.4°, and the gap angle difference δ was set to δ=7.2°. In the test example 24, the diameter-increasing angle α of the hub pocket 130 was set to α=21.6°, and the gap angle difference δ was set to δ=14.4°. In the test example 25, the diameter-increasing angle α of the hub pocket 130 was set to α=0° and the gap angle difference δ was set to δ=−7.2°. In the test example 26, the diameter-increasing angle α of the hub pocket 130 was set to α=7.2°, and the gap angle difference δ was set to δ=0°. In the test example 27, the diameter-increasing angle α of the hub pocket 130 was set to α=14.4°, and the gap angle difference δ was set to δ=7.2°. In the test example 28, the diameter-increasing angle α of the hub pocket 130 was set to α=19.3°, and the gap angle difference δ was set to 8=12.1°. In the test example 29, the diameter-increasing angle α of the hub pocket 130 was set to α=21.6°, and the gap angle difference δ was set to δ=14.4°. In the test example 30, the diameter-increasing angle α of the hub pocket 130 was set to α=0° and the gap angle difference δ was set to δ=−7.2°. In the test example 31, the diameter-increasing angle α of the hub pocket 130 was set to α=7.2°, and the gap angle difference δ was set to δ=0°. In the test example 32, the diameter-increasing angle α of the hub pocket 130 was set to α=14.4°, and the gap angle difference δ was set to δ=7.2°. In the test example 33, the diameter-increasing angle α of the hub pocket 130 was set to α=21.6°, and the gap angle difference δ was set to δ=14.4°.

Figure 22:
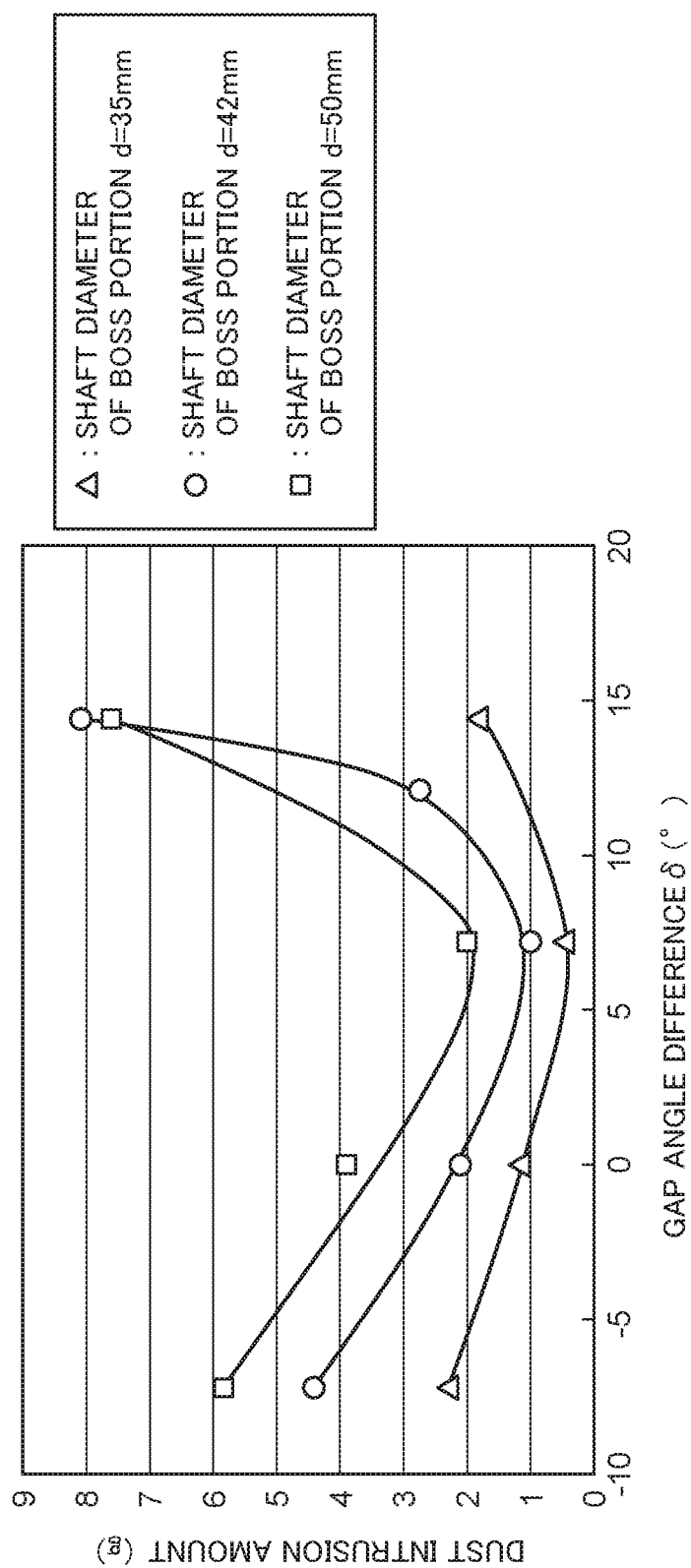
FIG. 22 is a diagram showing a relationship between a shaft diameter of a boss portion of a damper pulley and the dust intrusion amount in the sealing structure shown in FIG. 15.

An evaluation test result of the present sealing performance is shown in FIG. 22 and the following table 3.

TABLE 3

| Test example | 21 | 22 | 23 | 24 | 25 | 26 | 27 | 28 | 29 | 30 | 31 | 32 | 33 |
|---|---|---|---|---|---|---|---|---|---|---|---|---|---|
| Shaft diameter d (mm) | 35 | 35 | 35 | 35 | 42 | 42 | 42 | 42 | 42 | 50 | 50 | 50 | 50 |
| Diameter-increasing angle α (°) | 0 | 7.2 | 14.4 | 21.6 | 0 | 7.2 | 14.4 | 19.3 | 21.6 | 0 | 7.2 | 14.4 | 21.6 |
| Inclination angle γ (°) | 7.2 | 7.2 | 7.2 | 7.2 | 7.2 | 7.2 | 7.2 | 7.2 | 7.2 | 7.2 | 7.2 | 7.2 | 7.2 |
| Gap angle difference δ (°) | −7.2 | 0 | 7.2 | 14.4 | −7.2 | 0 | 7.2 | 12.1 | 14.4 | −7.2 | 0 | 7.2 | 14.4 |
| Dust intrusion amount (g) | 2.3 | 1.2 | 0.5 | 1.8 | 4.4 | 2.1 | 1.0 | 2.7 | 8.1 | 5.8 | 3.9 | 2.0 | 7.6 |

As shown in FIG. 22 and Table 3, from the present evaluation test, the same tendency as the aforementioned evaluation test 2 was also confirmed between the gap angle difference δ and the dust intrusion amount in each of the sealing structures having the shaft diameters d=35, 42, 50 mm. That is, in each of the sealing structures of shaft diameters d=35, 42, and 50 mm, there was found a tendency that the dust intrusion amount was reduced in the case of the gap angle difference δ ranging from not less than 1.0° to not more than 11.0°, the dust intrusion amount was more reduced in the case of the gap angle difference δ ranging from not less than 2.0° to not more than 9.0°, and the dust intrusion amount was still more reduced in the case of the gap angle difference δ ranging from not less than 3.0° to not more than 8.0°. It was also found in each of the sealing structures of the shaft diameter d=35, 42, 50 mm that the dust intrusion amount was most reduced in the case of the gap angle difference δ=7.2°. From this evaluation result, in each of the sealing structures 101 having different values of the shaft diameter d of the boss portion 114, it is appreciated that the dust intrusion amount can be reduced in the case of the gap angle difference δ ranging from not less than 1.0° to not more than 11.0°, the dust intrusion amount can be more reduced in the case of the gap angle difference δ ranging from not less than 2.0° to not more than 9.0°, and the dust intrusion amount can be still more reduced in the case of the gap angle difference δ ranging from not less than 3.0° to not more than 8.0°. Furthermore, it is appreciated in each of the sealing structures 101 having different values of the shaft diameter d of the boss portion 114 that the dust intrusion amount can be most reduced in the case of the gap angle difference δ of 7.2°. As described above, it is appreciated that the dust intrusion amount is minimized when the gap angle difference δ is equal to 7.2° irrespective of the value of the shaft diameter d of the boss portion 114. From this evaluation test, it was also appreciated that the dust intrusion amount was larger as the passage area of the gap g11 was larger, that is, the shaft diameter d was larger.

Evaluation Test 4: Evaluation of Gap Width a of Gap g11

The present inventor fabricated sealing structures 101 (test examples 41 to 44) each with a torsional damper and an oil seal according to the first embodiment of the present disclosure which were different in the gap width a of the gap g11 formed by the side lip 129 and the hub pocket 130, and conducted an evaluation test of the sealing performance of the sealing structures with a torsional damper and an oil seal. Furthermore, the evaluation test of the sealing performance of the sealing structures according to the present test examples 41 to 44 was likewise conducted by using the sealing device for test (see FIGS. 18 and 20) and the performance test machine 170 (see FIG. 20) as in the case of the evaluation test for the sealing devices of the test examples 1 to 4 described above (see FIG. 20). The diameter-increasing angle ca of the hub pocket 130, the inclination angle γ of the side lip 129, the overlap amount b between the side lip 129 and the hub pocket 130, the interval c between the disc portion 116 of the damper pulley 110 and the oil seal 120, and the shaft diameter d of the boss portion 114 are respectively the same values among the test examples 41 to 44. It is to be noted that the overlap amount b is set to b=0, and the inclination angle γ of the side lip 129 is set to γ=7.2°.

Specifically, the gap width a of the gap g11 was set to a=2.1 mm in the test example 41, the gap width a of the gap g11 was set to a=1.6 mm in the test example 42, and the gap width a of the gap g11 was set to a=1.1 mm in the test example 43, and the gap width a of the gap g11 was set to a=0.6 mm in the test example 44.

Figure 23:
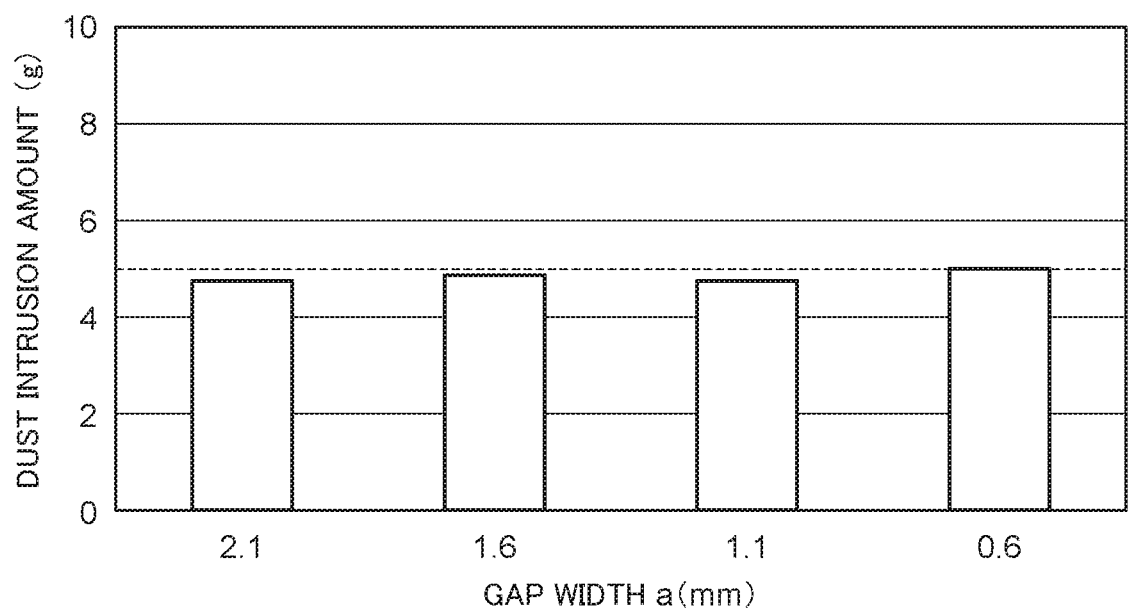
FIG. 23 is a diagram showing a relationship between a gap width of a gap formed by a side lip and a hub pocket in the sealing structure shown in FIG. 15 and dust intrusion amount.

An evaluation test result of the present sealing performance is shown in FIG. 23 and the following table 4.

TABLE 4

|  | Test example | | | |
| --- | --- | --- | --- | --- |
|  | 41 | 42 | 43 | 44 |
| Gap width a (mm) | 2.1 | 1.6 | 1.1 | 0.6 |
| Dust intrusion amount (g) | 4.8 | 4.9 | 4.8 | 5.0 |

As shown in FIG. 23 and Table 4, in the test examples 41 to 44, almost no difference was observed in dust intrusion amount. Thus, from the present evaluation test, it was appreciated that when the shaft diameter d of the boss portion 114 was fixed, change of the gap width a of the gap g11 had little influence on the sealing performance of the sealing structure 101.

Evaluation Test 5: Evaluation of Particle Diameter of Test Powder

The present inventor conducted this evaluation test in order to evaluate the influence of the difference in size of foreign matter on the sealing performance of the sealing structure 101 with a torsional damper and an oil seal. In the present evaluation test, sealing structures 101 (test examples 51 to 60) with a torsional damper and an oil seal according to the eleventh embodiment of the present disclosure having different gap angle differences δ were manufactured, and an evaluation test of the sealing performance was conducted by separately using two kinds of different test powder of JIS type 1 and JIS type 3. However, the test examples 51 and 56 are sealing structures with a torsional damper and an oil seal in which the diameter-increasing angle α is set to a set to 0° with respect to the sealing structure 101 with a torsional damper and an oil seal according to the eleventh embodiment of the present disclosure described above. The particle size of the test powder of JIS type 1 is equal to 150 μm or more, the amount of the test powder is equal to 5 vol %, the particle size of the test powder of JIS type 3 ranges from 5 to 75 μm, and the amount of the test power is equal to 5 vol %. This evaluation test was likewise conducted by using the sealing device for test (see FIGS. 18 and 20) and the sealing performance test machine 170 (see FIGS. 19(a) and 19(b)) as in the case of the evaluation tests for the sealing devices of the test examples 1 to 4 described above. The inclination angle γ of the side lip 129, the gap width a of the gap g11, the overlap amount b between the side lip 129 and the hub pocket 130, the interval c between the disc portion 116 of the damper pulley 110 and the oil seal 120, and the shaft diameter d of the boss portion 114 respectively have the same values among the test examples 51 to 60. The overlap amount b is set to b=0, the inclination angle γ of the side lip 129 is set to γ=7.2°, and the shaft diameter d is set to d=42 mm.

Specifically, in the test examples 51 and 56, the diameter-increasing angle α of the hub pocket 130 was set to α=0°, and the gap angle difference δ was set to δ=−7.2°. In the test examples 52 and 57, the diameter-increasing angle α of the hub pocket 130 was set to α=7.2°, and the gap angle difference δ was set to δ=0°. In the test examples 53 and 58, the diameter-increasing angle α of the hub pocket 130 was set to α=14.4°, and the gap angle difference δ was set to δ=7.2°. In the test Examples 54 and 59, the diameter-increasing angle α of the hub pocket 130 was set to α=19.3°, and the gap angle difference δ was set to δ=12.1°. In the test examples 55 and 60, the diameter-increasing angle α of the hub pocket 130 was set to α=21.6°, and the gap angle difference δ was set to δ=14.4°.

Figure 24:
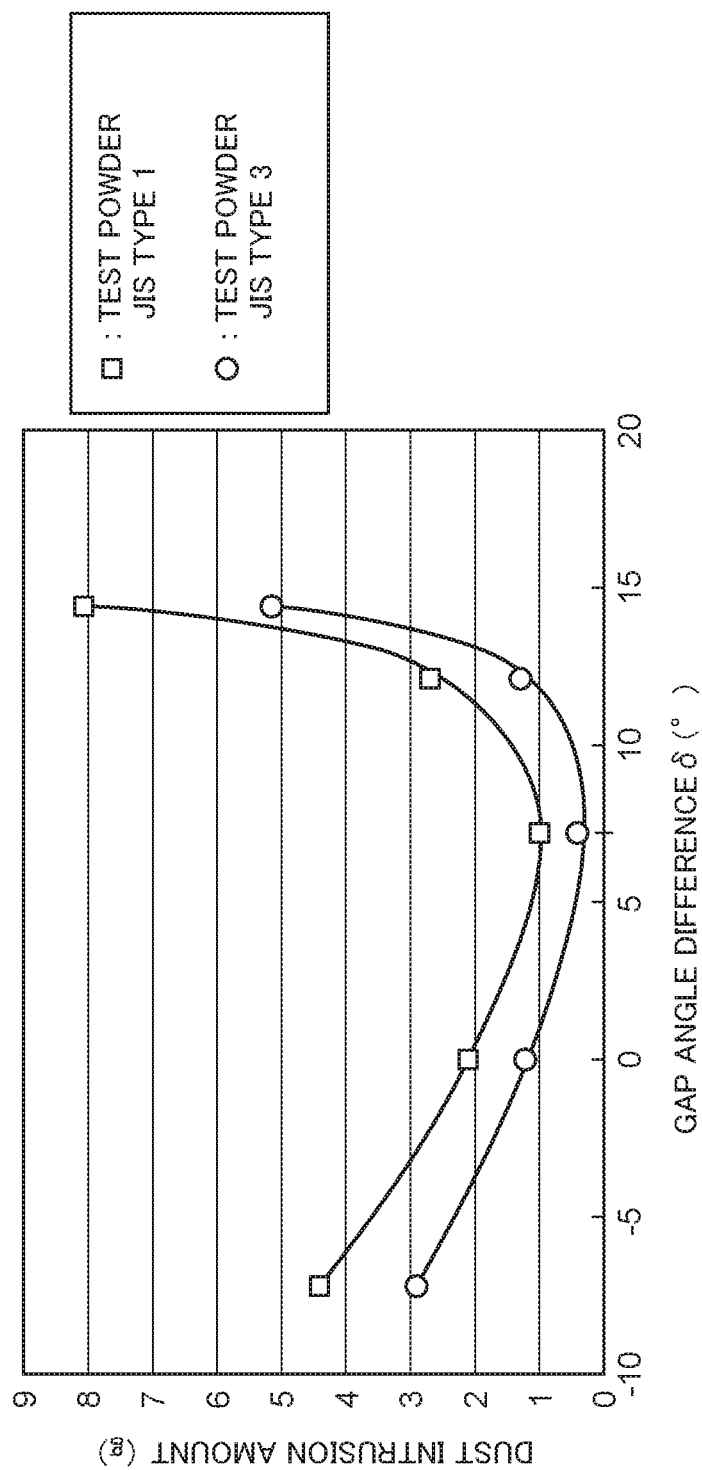
FIG. 24 is a diagram showing a relationship between a particle size of test powder and the dust intrusion amount in the sealing structure shown in FIG. 15.

An evaluation test result of the present sealing performance is shown in FIG. 24 and the following table 5.

TABLE 5

| Test example | 51 | 52 | 53 | 54 | 55 | 56 | 57 | 58 | 59 | 60 |
| --- | --- | --- | --- | --- | --- | --- | --- | --- | --- | --- |
| Diameter-increasing angle α (°) | 0 | 7.2 | 14.4 | 19.3 | 21.6 | 0 | 7.2 | 14.4 | 19.3 | 21.6 |
| Inclination angle γ (°) | 7.2 | 7.2 | 7.2 | 7.2 | 7.2 | 7.2 | 7.2 | 7.2 | 7.2 | 7.2 |
| Gap angle difference δ (°) | −7.2 | 0 | 7.2 | 12.1 | 14.4 | −7.2 | 0 | 7.2 | 12.1 | 14.4 |
| Test powder | JIS type 1 | | | | | JIS type 3 | | | | |
| Dust intrusion amount (g) | 4.4 | 2.1 | 1.0 | 2.7 | 8.1 | 2.9 | 1.2 | 0.4 | 1.3 | 5.2 |

As shown in FIG. 24 and Table 5, from the present evaluation test, when JIS type 3 having a small particle size was used as the test powder, the dust intrusion amount decreased as compared with a case where JIS type 1 was used, but the same tendency as the aforementioned evaluation test 2 was found between the gap angle difference δ and the dust intrusion amount for the test power having the respective particle sizes even when JIS types 1 and 3 having different particle sizes were used. That is, even in the sealing structures using JIS types 1 and 3 having different particle sizes as the test powder, there was found a tendency that the dust intrusion amount was reduced in the case of the gap angle difference δ ranging from not less than 1.0° to not more than 11.0°, the dust intrusion amount was more reduced in the case of the gap angle difference δ ranging from not less than 2.0° to not more than 9.0°, and the dust intrusion amount was still more reduced in the case of gap angle difference δ ranging from not less than 3.0° to not more than 8.0°. Furthermore, even in the sealing structures which respectively use JIS types 1 and 3 types having different particle sizes as the test powder, it was also found that the dust intrusion amount was most reduced when the gap angle difference δ was set to δ=7.2°. From this evaluation result, it is appreciated that irrespective of the size of the foreign matter to be exposed, the dust intrusion amount can be reduced in the case of the gap angle difference δ ranging from not less than 1.0° to 11.0°, the intrusion amount can be more reduced in the case of the gap angle difference δ ranging from not less than 2.0° to not more than 9.0°, and the dust intrusion amount an can be still more reduced in the case of the gap angle difference δ ranging from not less than 3.0° to not more than 8.0° in the sealing structure 101. Furthermore, it is also appreciated that irrespective of the size of the foreign matter to be exposed, the dust intrusion amount can be most reduced when the gap angle difference δ is equal to 7.2° in the sealing structure 101.

Next, a sealing structure with a torsional damper and an oil seal as a sealing structure with an annular pocket and a sealing device according to a twenty-first embodiment of the present disclosure will be described. The sealing structure 102 with a torsional damper and an oil seal according to the twelfth embodiment of the present disclosure is different from the sealing structure 101 with a torsional damper and an oil seal according to the eleventh embodiment of the present disclosure described above only in the shape of the annular gap formed by the side lip 129 and the outer peripheral surface 131 of the hub pocket 130. Hereinafter, with respect to configurations having the same functions or similar functions as or to those of the sealing structure 101 with a torsional damper and an oil seal according to the eleventh embodiment of the present disclosure described above, the description thereon will be omitted while the configurations are represented by the same reference signs, and only different configurations will be described.

Figure 25:
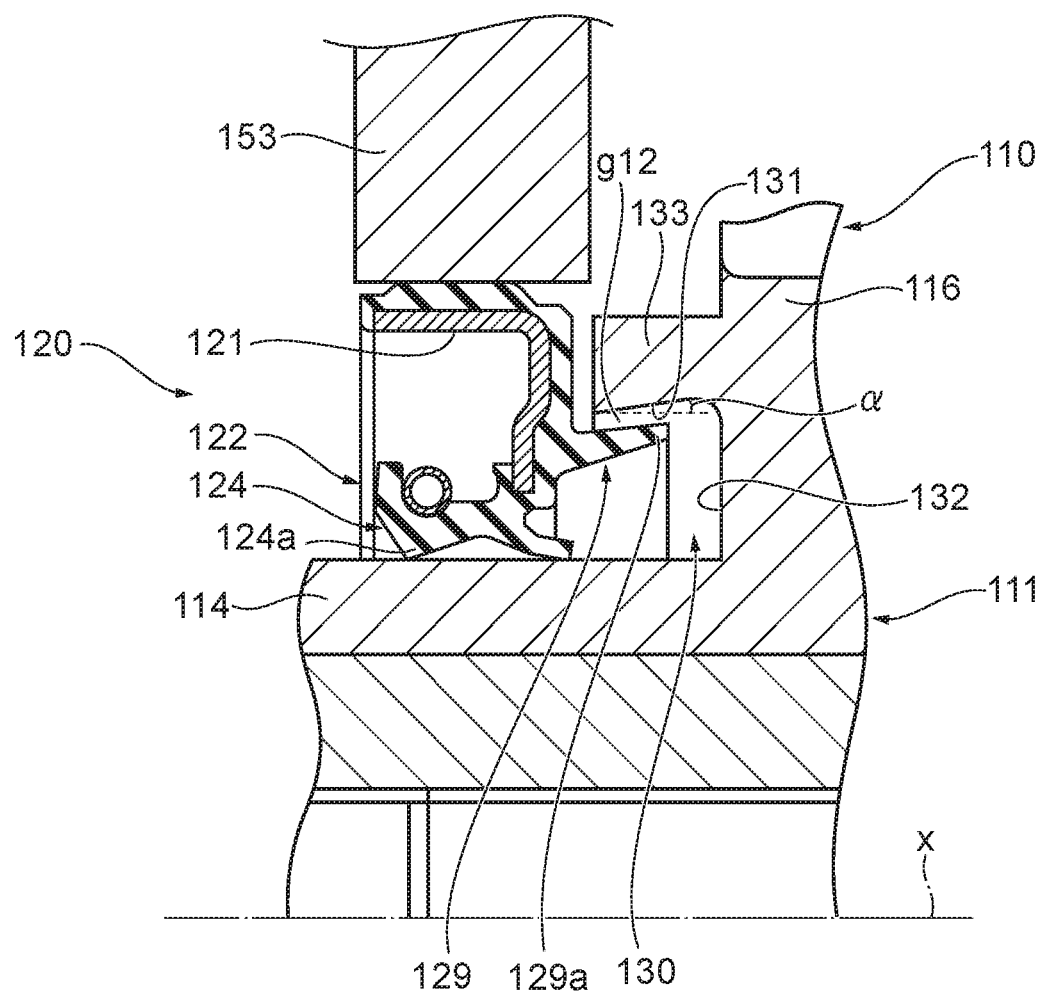
FIG. 25 is a partial enlarged view of a cross-section along an axis to show a schematic configuration of a sealing structure with a torsional damper and an oil seal according to a twelfth embodiment of the present disclosure.

FIG. 25 is a partially enlarged view of a cross-section taken along the axis to show a schematic configuration of the sealing structure 102 with a torsional damper and an oil seal according to the twelfth embodiment of the present disclosure.

As shown in FIG. 25, a portion on the outer end 129a side of the side lip 129 of the oil seal 120 intrudes into the inside of the hub pocket 130, and the side lip 129 and the outer peripheral surface 131 of the hub pocket 130 overlap each other over the axis x direction in the radial direction. That is, the side lip 129 and the outer peripheral surface 131 of the hub pocket 130 face each other in the radial direction, and an annular gap g12 is formed between the side lip 129 and the outer peripheral surface 131 of the hub pocket 130. That is, the side lip 129 and the outer peripheral surface 131 of the hub pocket 130 overlap each other.

The annular gap g12 formed by the side lip 129 and the outer peripheral surface 131 of the hub pocket 130 forms a labyrinth seal. Therefore, like the above-described sealing structure 101, foreign matter intruding from the damper pulley 110 can be suppressed from further intruding to the seal lip 124 side. As a result, it is possible to suppress the seal lip 124 of the oil seal 120 from being exposed to foreign matter intruding from the damper pulley 110, and it can be suppressed that the lip tip end portion 124a bites foreign matter and thus is damaged or deteriorated, so that the sealing performance of the oil seal 120 deteriorates to cause leakage of oil.

As described later, the sealing performance as the labyrinth seal of the gap g12 is enhanced as the overlapping (overlap) range over the axis x direction between the side lip 129 and the outer peripheral surface 131 of the hub pocket 130 is broader.

As described above, the sealing structure 102 with a torsional damper and an oil seal according to the twelfth embodiment of the present disclosure can suppress the seal lip 124 of the oil seal 120 from being exposed to foreign matter intruding from the damper pulley 110 like the sealing structure 101 with a torsional damper and an oil seal according to the eleventh embodiment of the present disclosure.

Next, the sealing performance of the sealing structure 102 with a torsional damper and an oil seal according to the twelfth embodiment of the present disclosure will be described.

Evaluation Test 6: Evaluation of Overlap Amount b

The present inventor conducted an evaluation test for evaluating an effect of the difference of an overlap amount b corresponding to a length by which the side lip 129 and the outer peripheral surface 131 of the hub pocket 130 overlap each other in the axis x direction on the sealing performance of the sealing structure 102 with a torsional damper and an oil seal. In the present evaluation test, the present inventor fabricated sealing structures 102 (test examples 61 to 77) each with a torsional damper and an oil seal according to the twelfth embodiment of the present disclosure in which different overlap amounts b were set for the diameter-increasing angle α of each hub pocket 130, and conducted an evaluation test of the sealing performance. However, the test examples 72 to 77 are the sealing structures with a torsional damper and an oil seal in which the diameter-increasing angle α was set to α=0° with respect to the sealing structure 102 with a torsional damper and an oil seal according to the second embodiment of the present disclosure. In the test examples 61 to 65, the diameter-increasing angle α of the hub pocket 130 was set to α=7.2°, and in the test examples 66 to 71, the diameter-increasing angle α of the hub pocket 130 was set to α=14.4°. The present evaluation test was likewise conducted by using the sealing device for test (see FIGS. 18 and 20) and the sealing performance test machine 170 (see FIGS. 19(a) and 19(b)) as in the case of the evaluation test for the sealing devices of the test examples 1 to 4 described above. The inclination angle γ of the side lip 129 and the shaft diameter d of the boss portion 114 respectively have the same values among the test examples 61 to 74. The inclination angle γ was set to γ=7.2°. Furthermore, in the test examples 61 to 70 and the test examples 72 to 76, the overlap amount b was set to each of the following values by moving an attachment A having the hub pocket 130 formed therein (see FIG. 20) in the axis x direction. Therefore, in the test examples 61 to 70 and the test examples 72 to 76, the interval c between the disc portion 116 of the damper pulley 110 and the oil seal 120 has different values depending on the set overlap amount. On the other hand, in the test examples 71 and 77, the value of the interval c was set to the same values as the interval c in the test examples 61 and 72 (overlap amount b=0) by cutting the outer surface of the elastic body portion 122 of the oil seal 120 facing the disc portion 116 of the damper pulley 110.

Specifically, the overlap amount b was set to b=0 mm in the test examples 61, 66, and 72, the overlap amount b was set to b=0.6 mm in the test examples 62, 67, 71, 73, and 77, the overlap amount b was set to b=1.2 mm in the test examples 63, 68, 74, the overlap amount b was set to b=1.8 mm in the text examples 64, 69 and 75, and the overlap amount b was set to b=2.1 mm in the test examples 65, 70 and 76.

Figure 26:
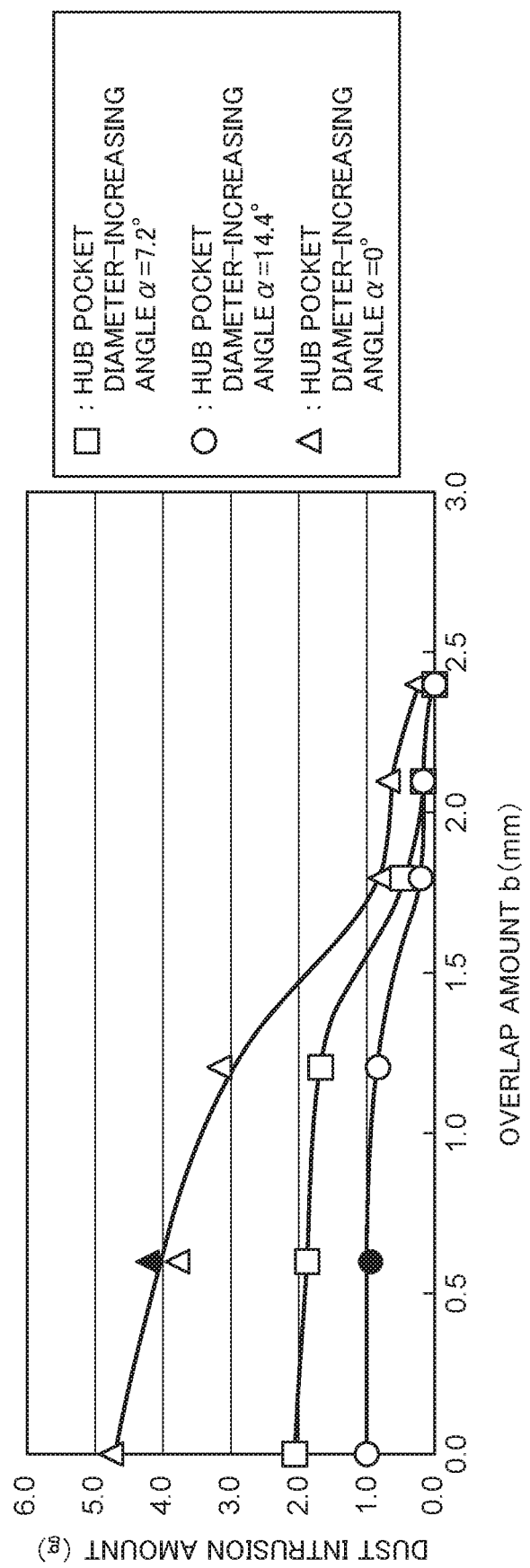
FIG. 26 is a diagram showing a relationship between an overlap amount and a dust intrusion amount in the sealing structure shown in FIG. 25.

An evaluation test result of the present sealing performance is shown in FIG. 26 and the following table 6.

TABLE 6

| Test example | 61 | 62 | 63 | 64 | 65 | 66 | 67 | 71 | 68 | 69 | 70 | 72 | 73 | 77 | 74 | 75 | 76 |
|---|---|---|---|---|---|---|---|---|---|---|---|---|---|---|---|---|---|
| Diameter- increasing angle α (°) | 7.2 | 7.2 | 7.2 | 7.2 | 7.2 | 14.4 | 14.4 | 14.4 | 14.4 | 14.4 | 14.4 | 0 | 0 | 0 | 0 | 0 | 0 |
| Inclination angle γ (°) | 7.2 | 7.2 | 7.2 | 7.2 | 7.2 | 7.2 | 7.2 | 7.2 | 7.2 | 7.2 | 7.2 | 7.2 | 7.2 | 7.2 | 7.2 | 7.2 | 7.2 |
| Overlap amount b (mm) | 0 | 0.6 | 1.2 | 1.8 | 2.1 | 0 | 0.6 | 0.6 | 1.2 | 1.8 | 2.1 | 0 | 0.6 | 0.6 | 1.2 | 1.8 | 2.1 |
| Interval c (mm) | 3.2 | 2.6 | 2.0 | 1.4 | 1.1 | 3.2 | 2.6 | 3.2 | 2.0 | 1.4 | 1.1 | 3.2 | 2.6 | 3.2 | 2.0 | 1.4 | 1.1 |
| Dust intrusion amount (g) | 2.05 | 1.80 | 1.65 | 0.50 | 0.25 | 1.00 | 0.90 | 0.95 | 0.85 | 0.25 | 0.20 | 4.80 | 3.80 | 4.25 | 3.20 | 0.80 | 0.70 |

As shown in FIG. 26 and Table 6, it is found from this evaluation test that there is a relationship between the overlap amount b and the dust intrusion amount. Specifically, it is found that the dust intrusion amount decreases as the overlap amount b increases similarly at each diameter-increasing angle α. A black circle and a black triangle in FIG. 26 correspond to test results of the test examples 71 and 77 respectively, and show substantially similar results to those of the corresponding test examples 67 and 73 which have the same overlap amount b (b=0.6 mm) and in which the interval c is reduced according to the value of the overlap amount b. Therefore, in the present evaluation test, it can be considered that the distance c between the disc portion 116 of the damper pulley 110 and the oil seal 120 does not affect the dust intrusion amount.

As described above, with respect to the sealing structure 102 with a torsional damper and an oil seal according to the twelfth embodiment of the present disclosure, it is found that the amount of dust intruding into the inside beyond the gap g12 can be more reduced and the sealing performance of the sealing structure 102 can be more enhanced as the overlap amount b is larger. Specifically, it is conceivable to increase the overlap amount b by increasing the length in the extension direction of the side lip 129 in the sealing structure 102 according to the present embodiment. However, when the length in the extension direction of the side lip 129 formed of an elastic member such as a rubber elastic material is increased, the side lip 129 sags vertically by its own weight. Therefore, although it is preferable that the overlap amount b is as large as possible, the upper limit value of the overlap amount b is set, for example, in a range which enables the side lip 129 to maintain a desired shape against gravity or other force applied in the usage state. Furthermore, from FIG. 26 and Table 6, it is found that when the overlap amount b increases from 1.2 mm to 1.8 mm in the sealing structure having each diameter-increasing angle α, the dust intrusion amount remarkably decreases, and it is preferable that the lower limit value of the overlap amount b is equal to a value between 1.2 mm and 1.8 mm, or 1.8 mm.

Next, a sealing structure with a torsional damper and an oil seal as a sealing structure with an annular pocket and a sealing device according to a thirteenth embodiment of the present disclosure will be described. The sealing structure 103 with a torsional damper and an oil seal according to the thirteenth embodiment of the present disclosure is different from the sealing structure 101 with a torsional damper and an oil seal according to the eleventh embodiment of the present disclosure described above in a configuration forming the hub pocket 130. Hereinafter, with respect to configurations having the same or similar functions as or to the sealing structure 101 with a torsional damper and an oil seal according to the eleventh embodiment of the present disclosure, the description on the configurations will be omitted while the configurations are represented by the same reference signs, and only different configurations will be described.

Figure 27:
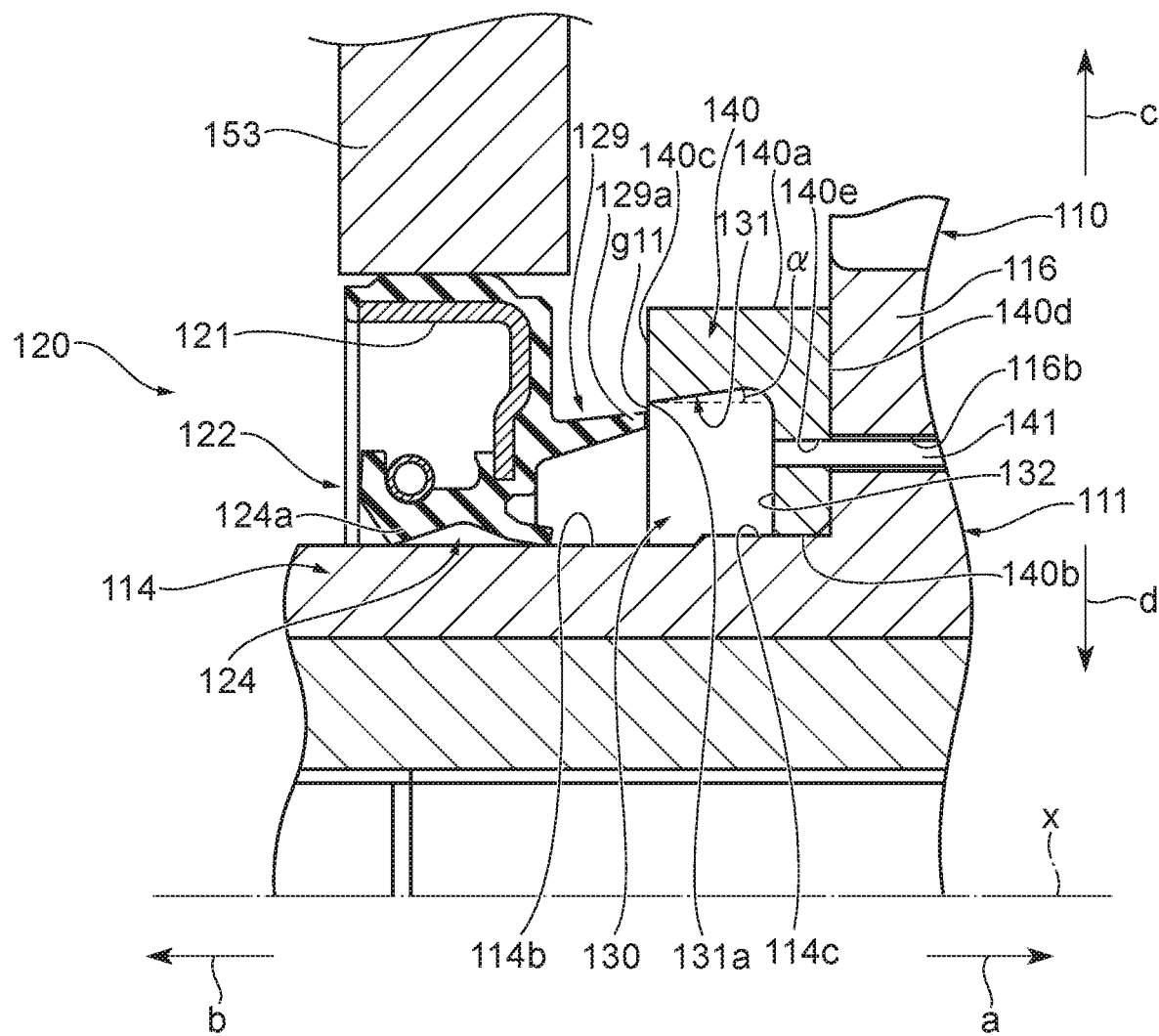
FIG. 27 is a partially enlarged cross-sectional view of a cross-section taken along an axis to show a schematic configuration of a sealing structure with a torsional damper and an oil seal according to a thirteenth embodiment of the present disclosure.

FIG. 27 is a partially enlarged cross-sectional view of a cross-section taken along the axis to show a schematic configuration of the sealing structure 103 with a torsional damper and an oil seal according to the thirteenth embodiment of the present disclosure. As shown in FIG. 27, in the damper pulley 110 of the sealing structure 103 with a torsional damper and an oil seal, the outer peripheral surface 131 of the hub pocket 130 and the bottom surface 132 of the hub pocket 130 are not formed in the hub 111. The sealing structure 103 with a torsional damper and an oil seal has an accessory ring member 140 which is attached to the damper pulley 110 and is a separate body from the hub 111, and the outer peripheral surface 131 of the hub pocket 130 and the bottom surface 132 of the hub pocket 130 are formed in the accessory ring member 140.

The accessory ring member 140 is a disc-shaped member in a hollow annular shape centered about the axis x, and formed so as to be fittable to the boss portion 114 of the damper pulley 110. A recessed part is formed from one side face to form the outer peripheral surface 131 of the hub pocket 130 and the bottom surface 132 of the hub pocket 130. Specifically, as shown in FIG. 27, the accessory ring member 140 has an outer peripheral surface 140a which is a surface on the outer periphery side and an inner peripheral surface 140b which is a surface on the inner peripheral surface in which a through-hole inserted through the boss portion 114 to be fitted is formed in the damper pulley 110. A recessed part which is recessed to the outside is formed in a side surface 140c which is a side surface facing the inside is formed in the accessory ring member 140 to form the outer peripheral surface 131 of the hub pocket 130 and the bottom surface 132 of the hub pocket 130.

A stepped surface 114c which is an outer peripheral surface continuing to the outer peripheral surface 114b on the outside is formed on the boss portion 114 of the damper pulley 110. The stepped surface 114c has a larger diameter than the outer peripheral surface 114b, and protrudes outward beyond the outer peripheral surface 114b. The outer peripheral surface 114b and the stepped surface 114c are smoothly connected to each other. The inner peripheral surface 140b of the accessory ring member 140 is fitted to the stepped surface 114c of the boss portion 114 to be attached to the boss portion 114.

The accessory ring member 140 is fitted to the damper pulley 110 by a fixing member 141 so as to be relatively immovable. Under this fitted state, a side surface 140d of the accessory ring member 140 which is a side surface facing the outside of the accessory ring member 140 is in contact with the side surface of the disc portion 116. The fixing member 141 is, for example, a bolt, a rivet or a pin, and is engaged with a through-hole 116b which is a through-hole formed in the disc portion 116 so as to extend in the axis x direction, and a through-hole 140e which is formed in the accessory ring member 140 so as to penetrate between the bottom surface 132 and the side surface 140d and extend in the axis x direction, thereby fixing the accessory ring member 140 to the damper pulley 110. For example, one or both of the through-hole 116b and the through-hole 140 serve as a screw hole, and the fixing member 141 which is a bolt is screwed into the screw hole, whereby the accessory ring member 140 is fixed to the damper pulley 110. When the fixing member 141 is a pin or a rivet, the fixing member 141 is fitted to or engaged with the through-hole 116b and the through-hole 140e, whereby the accessory ring member 140 is fixed to the damper pulley 110. A method of fixing the accessory ring member 140 is not limited to the above-described method, and a member for realizing another well-known applicable fixing method may be used as the fixing member. Since the accessory ring member 140 is attached to the damper pulley 110 by the fixing member 141, it is firmly fixed.

As in the case of the sealing structure 101 with a torsional damper and an oil seal described above, the annular gap g11 is formed between the outer end 129a of the side lip 129 of the oil seal 120 and the inner end 131a of the outer peripheral surface 131 of the hub pocket 130 in a state where the accessory ring member 140 is fitted to the damper pulley 110.

The material of the accessory ring member 140 may be a metal material or a resin material, for example, stainless steel, ABS resin, or the like. It is preferable that the resin material of the accessory ring member 140 is resin which is capable of withstanding ambient temperature of a use environment such as an engine room.

The sealing structure 103 with a torsional damper and an oil seal according to the thirteenth embodiment of the present disclosure described above can achieve the same function and effect as the sealing structure 101 with a torsional damper and an oil seal according to the eleventh embodiment of the present disclosure, and can suppress the seal lip 124 of the oil seal 120 from being exposed to foreign matter intruding from the damper pulley 110.

Furthermore, in the sealing structure 103 with a torsional damper and an oil seal according to the thirteenth embodiment of the present disclosure, since the outer peripheral surface 131 of the hub pocket 130 and the bottom surface 132 of the hub pocket 130 are formed in the accessory ring member 140, working of the hub pocket 130 can be facilitated. In the sealing structures 101 and 102 with a torsional damper and an oil seal described above, the hub pocket 130 is formed in the hub 111, and the hub pocket 130 is formed by performing a cutting work on the hub 111 which is formed by casting. The weight of the hub 111 is large, it is necessary to perform the working operation on the hub pocket 130 so that a tool for the cutting work and the boss portion 114 do not interfere with each other, and it is difficult to work the hub pocket 130 in the sealing structure 101 and 102 with a torsional damper and an oil seal. On the other hand, in the sealing structure 103 with a torsional damper and an oil seal, the annular member as a separate body from the hub 111 is worked to form the outer peripheral surface 131 of the hub pocket 130 and the bottom surface 132 of the hub pocket 130, thereby fabricating the accessory ring member 140, and the accessory ring member 140 is fitted to the damper pulley 110 to form the hub pocket 130, so that the working of the hub pocket 130 can be facilitated. In particular, it is possible to facilitate the working of the outer peripheral surface 131 which is an inclined surface of the hub pocket 130.

In the sealing structure 103 with a torsional damper and an oil seal according to the thirteenth embodiment of the present disclosure, the stepped surface 114c projecting in the outer peripheral direction is formed on the outside of the outer peripheral surface 114b in the boss portion 114 of the damper pulley 110, and the accessory ring member 140 is fitted to the stepped surface 114c. Therefore, it is possible to prevent damage to the outer peripheral surface 114b which is a lip sliding surface coming into contact with the lip tip end portion 124a of the seal lip 124 when the accessory ring member 140 is fitted.

Next, a sealing structure with a torsional damper and an oil seal as a sealing structure with an annular pocket and a sealing device according to a fourth embodiment of the present disclosure will be described. The sealing structure 104 with a torsional damper and an oil seal according to the fourteenth embodiment of the present disclosure is different from the sealing structure 103 with a torsional damper and an oil seal according to the thirteenth embodiment of the present disclosure described above only in the shape of the annular gap formed by the side lip 129 and the outer peripheral surface 131 of the hub pocket 130. Furthermore, the sealing structure 104 with a torsional damper and an oil seal according to the fourteenth embodiment of the present disclosure is different in the configuration constituting the hub pocket 130 from the sealing structure 102 with a torsional damper and an oil seal according to the twelfth embodiment of the present disclosure described above, and has the accessory ring member 140. Hereinafter, with respect to configurations having the same or similar functions as or to those of the sealing structures 102 and 103 with a torsional dampers and an oil seals according to the twelfth and thirteenth embodiments of the present disclosure described above, the description on these configurations will be omitted while the configurations are represented by the same reference signs, and only different configurations will be described.

Figure 28:
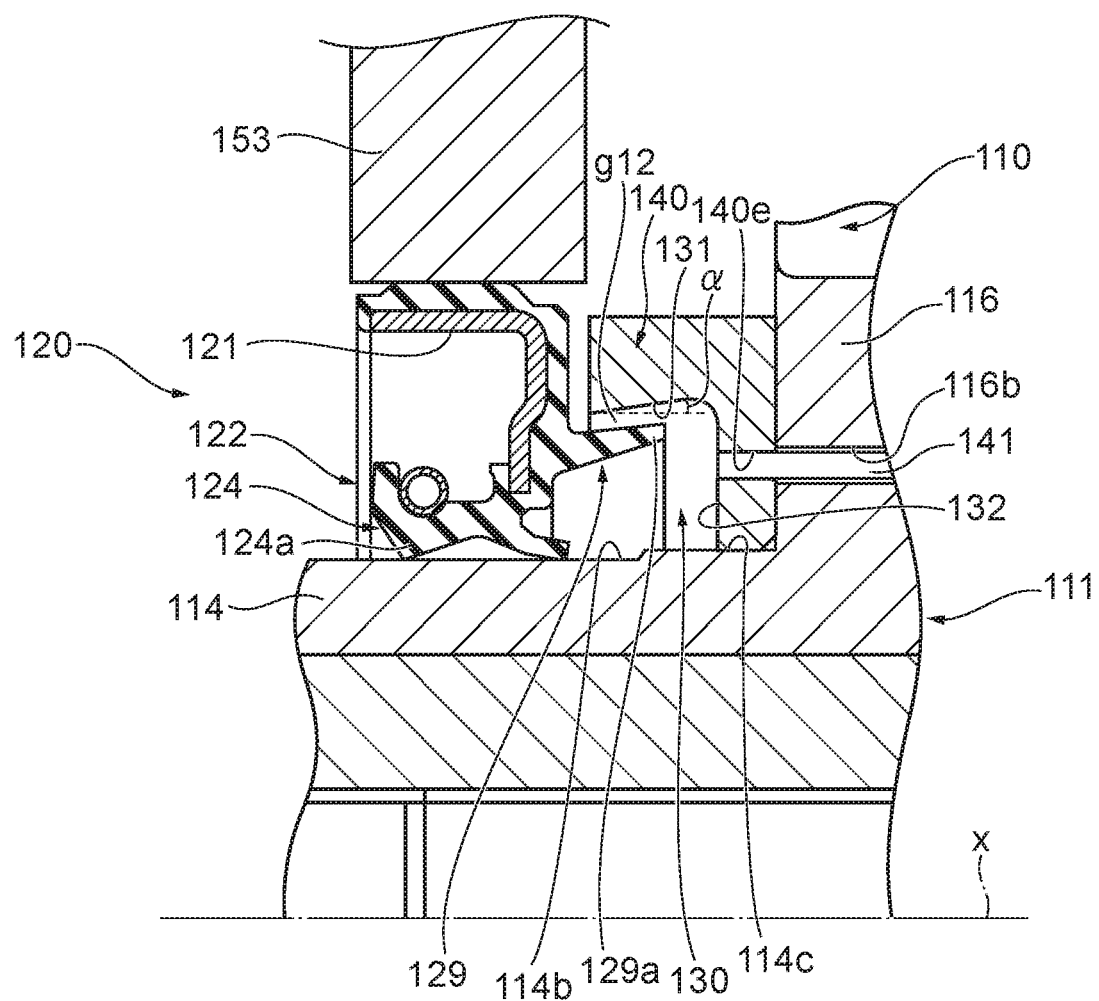
FIG. 28 is a partially enlarged cross-sectional view of a cross-section taken along an axis to show a schematic structure of a sealing structure with a torsional damper and an oil seal according to a fourteenth embodiment of the present disclosure.

FIG. 28 is a partially enlarged cross-sectional view of a cross-section taken along the axis to show a schematic configuration of the sealing structure 104 with a torsional damper and an oil seal according to the fourteenth embodiment of the present disclosure. As shown in FIG. 28, as in the case of the sealing structure 102 with a torsional damper and an oil seal according to the second embodiment of the present disclosure, in the sealing structure 104 with a torsional damper and an oil seal, a portion on the outer end 129a side of the side lip 129 of the oil seal 120 intrudes to the inside of the hub pocket 130, and the side lip 129 and the outer peripheral surface 131 of the hub pocket 130 are mutually overlapped (overlap each other) over the axis x direction in the radial direction. That is, the side lip 129 and the outer peripheral surface 131 of the hub pocket 130 face each other in the radial direction, and the annular gap g12 is formed between the side lip 129 and the outer peripheral surface 131 of the hub pocket 130, and forms a labyrinth seal. In the sealing structure 104 with a torsional damper and an oil seal, the outer peripheral surface 131 of the accessory ring member 140 extends inward to be longer so that the side lip 129 and the outer peripheral surface 131 of the hub pocket 130 overlap each other. Alternatively, the attached position of the accessory ring member 140 is located on the inside of the attached position of the accessory ring member 140 in the sealing structure 103 with a torsional damper and an oil seal according to the thirteenth embodiment of the present disclosure. Alternatively, the side lip 129 extends outward to be longer.

The sealing structure 104 with a torsional damper and an oil seal according to the fourteenth embodiment of the present disclosure having the above-described configuration can exert the same function and effect as the sealing structures 102 and 103 with a torsional dampers and an oil seals according to the twelfth and thirteenth embodiments of the present disclosure.

As described above, as in the case of the sealing structures 102 and 103 with a torsional dampers and an oil seals according to the twelfth and thirteenth embodiments described above, the sealing structure 104 with a torsional damper and an oil seal according to the fourteenth embodiment of the present disclosure can suppress the seal lip 124 of the oil seal 120 from being exposed to foreign matter intruding from the damper pulley 110.

Next, a variant of the accessory ring member 140 in the sealing structures 103, 104 with a torsional dampers and an oil seals according to the thirteenth and fourteenth embodiments of the present disclosure will be described hereinafter.

Figure 29:
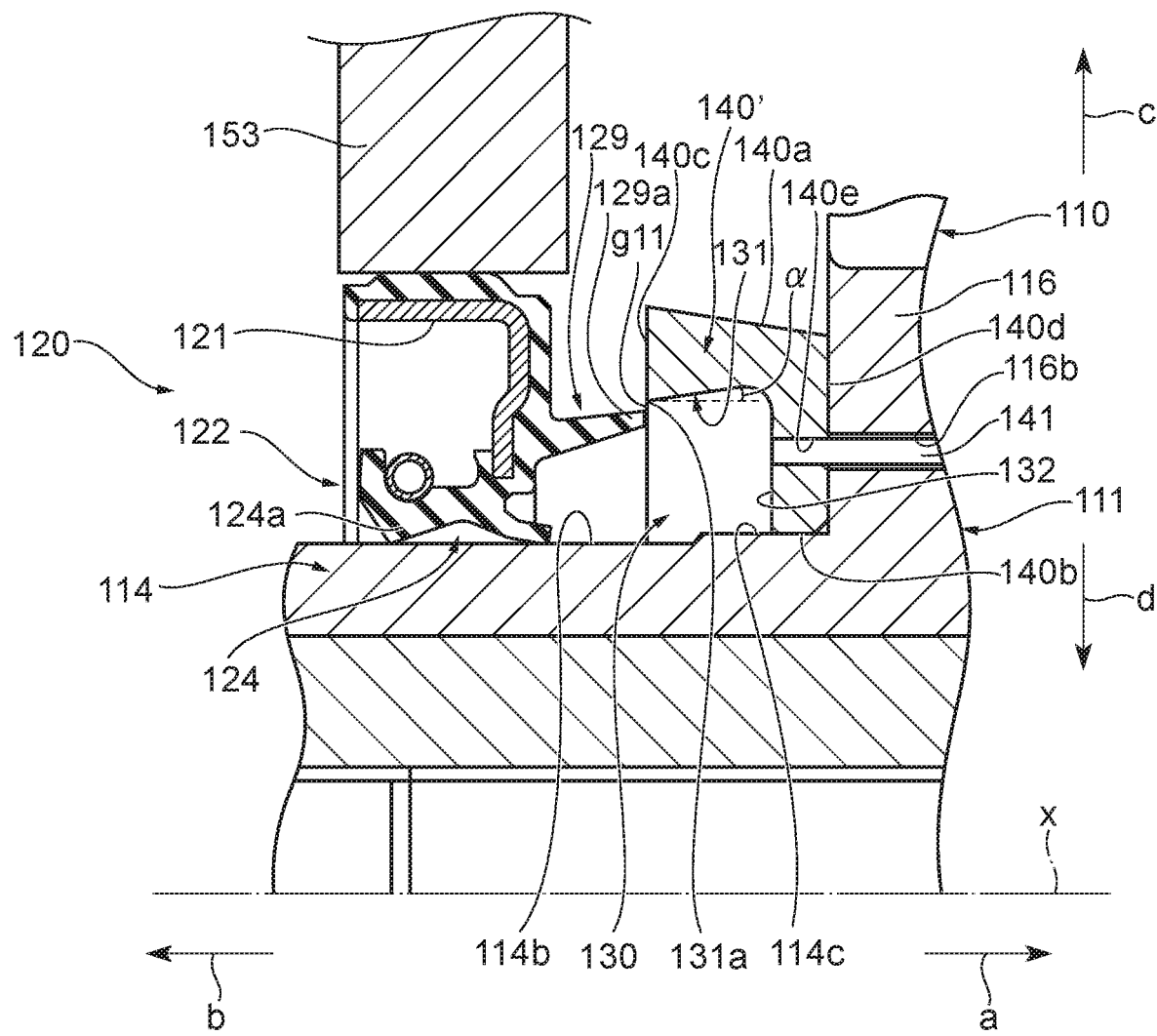
FIG. 29 is a cross-sectional view showing a schematic structure of a first variant of an attached annular member in the sealing structure with a torsional damper and an oil seal according to the thirteenth and fourteenth embodiments of the present disclosure.

FIG. 29 is a cross-sectional view showing a schematic structure of a first variant of the accessory ring member 140 in the sealing structures 103, 104 with a torsional dampers and an oil seals according to the thirteenth and fourteenth embodiments of the present disclosure. An outer peripheral surface 140a of an accessory ring member 140' according to the first variant forms an annular surface which expands to the outer periphery side toward the inside in the axis x direction, for example, a tapered surface having a conical surface shape. As a result, it is possible to accumulate foreign matter intruding from the damper pulley 110 on the outer peripheral surface 140a of the accessory ring member 140' to suppress the foreign matter from reaching the oil seal 120. Furthermore, the foreign matter accumulated on the outer peripheral surface 140a of the accessory ring member 140' can be discharged downward by its own weight or by rotation of the damper pulley 110. A state where the accessory ring member 140' according to the first variant is attached to the sealing structure 103 with a torsional damper and an oil seal is shown in FIG. 29, but the accessory ring member 140' according to the first variant can be applied in the sealing structure 104 with a torsional damper and an oil seal like the accessory ring member 140. Even when the accessory ring member 140' according to the present variant is used, the same effect as the sealing structures 103, 104 with a torsional damper and an oil seal according to the thirteenth and fourteenth embodiments of the present disclosure can be exerted.

Next, a sealing structure with a torsional damper and an oil seal as a sealing structure with an annular pocket and a sealing device according to a fifteenth embodiment of the present disclosure will be described. The sealing structure 105 with a torsional damper and an oil seal according to the fifteenth embodiment of the present disclosure differs in a configuration constituting the hub pocket 130 from the sealing structure 101 with a torsional damper and an oil seal according to the eleventh embodiment of the present disclosure. Hereinafter, with respect to configurations having the same or similar functions as or to those of the sealing structure 101 with a torsional damper and an oil seal according to the eleventh embodiment of the present disclosure, the description on the configurations will be omitted while the configurations are represented by the same reference signs, and only different configurations will be described.

Figure 30:
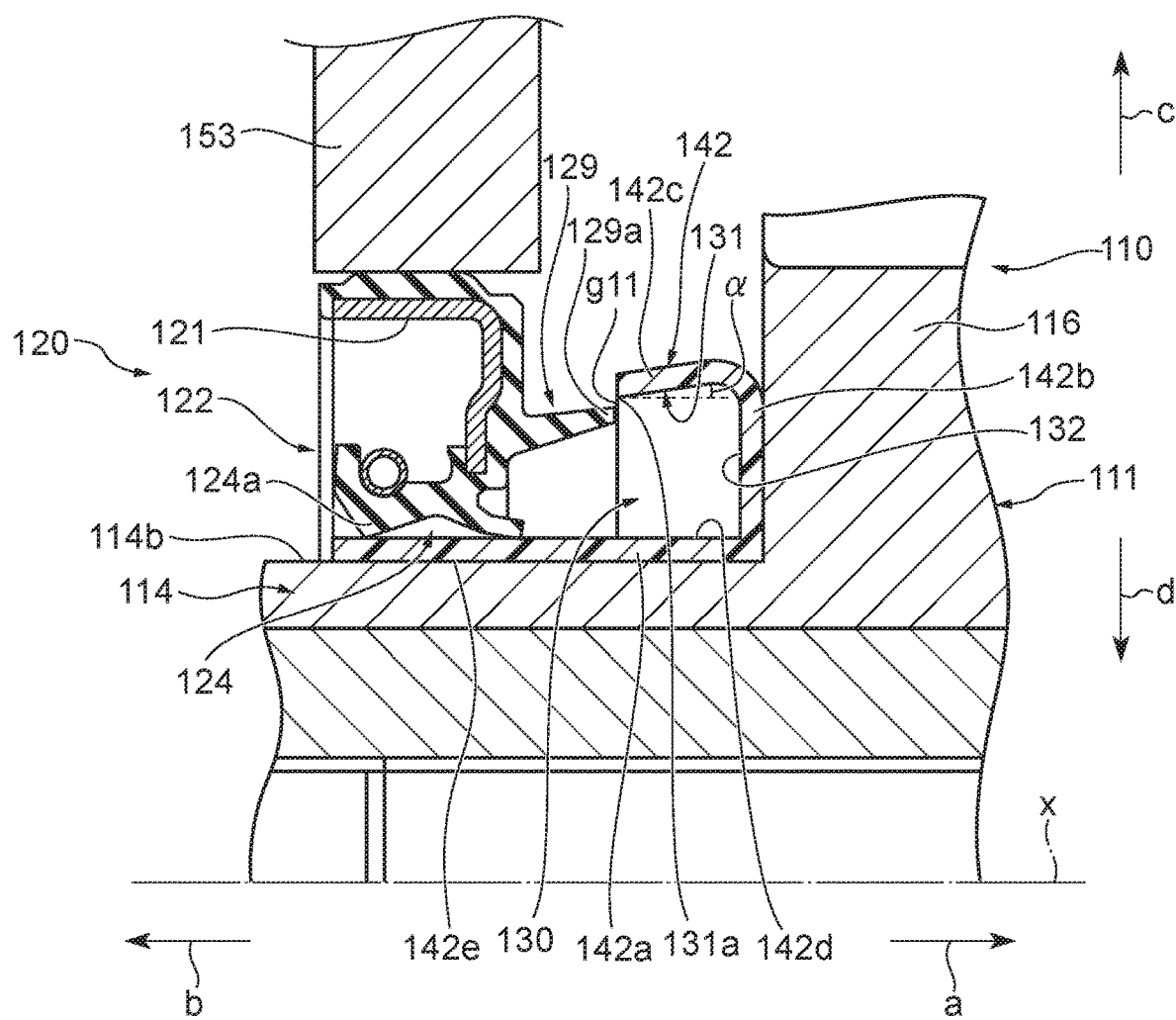
FIG. 30 is a partially enlarged cross-sectional view along an axis to show a schematic configuration of a sealing structure with a torsional damper and an oil seal according to a fifteenth embodiment of the present disclosure.

FIG. 30 is a partially enlarged cross-sectional view of a cross-section taken along the axis to show a schematic configuration of a sealing structure 105 with a torsional damper and an oil seal according to a fifteenth embodiment of the present disclosure. As shown in FIG. 30, the hub pocket 130 is not formed in the hub 111 in the damper pulley 110 of the sealing structure 105 with a torsional damper and a oil seal. The sealing structure 105 with a torsional damper and an oil seal has an accessory ring member 142 that is separate from the hub 111 attached to the damper pulley 110, and the hub pocket 130 is formed in this accessory ring member 142.

The accessory ring member 142 is an annular member in a hollow annular shape centered about the axis x and is formed so as to be fittable to the boss portion 114 of the damper pulley 110. A recessed part is formed from one side face to form the hub pocket 130. Specifically, as shown in FIG. 30, the accessory ring member 142 includes a tubular portion 142a which is a cylindrical portion centered about the axis x, a disc portion 142b which is a disc-shaped portion extending from an outer end portion of the tubular portion 142a to the outer periphery side in the radial direction, and an outer peripheral portion 142c which is a portion extending inward from an end portion on the outer periphery side of the disc portion 142b. The accessory ring member 142 is formed of a metal material, and one metal member, for example, a metal plate is subjected to press working or the like to be formed into an accessory ring member 142. The tubular portion 142a, the disc portion 142b, and the outer peripheral portion 142c are integrally formed from the same material, and have the same or substantially the same thickness. The metal material of the accessory ring member 142 includes, for example, stainless steel or SPCC (cold rolled steel).

As shown in FIG. 30, in accessory ring member 142, the tubular portion 142a, the disc portion 142b, and an outer peripheral portion 142c define a space to form the hub pocket 130. Specifically, a surface on the inner periphery side of the outer peripheral portion 142c forms the outer peripheral surface 131 of the hub pocket 130, and the outer peripheral portion 142c extends while inclined at the same angle (inclination angle α) as the outer peripheral surface 131 of the hub pocket 130 with respect to the axis x. An inner surface of the disc portion 142b forms the bottom surface 132 of the hub pocket 130, and an outer peripheral surface 142d which is a surface on the outer periphery side of the tubular portion 142a forms a surface on the inner periphery side which faces the outer peripheral surface 131 of the hub pocket 130.

The tubular portion 142a of the accessory ring member 142 is formed so as to be fittable to the boss portion 114 of the damper pulley 110, and an inner peripheral surface 142e which is a surface on the inner periphery side of the tubular portion 142a is in close contact with the outer peripheral surface 114b of the boss portion 114 under a state where the accessory ring member 142 is attached to the boss portion 114. The tubular portion 142a is fitted to the boss portion 114, whereby the accessory ring member 142 is attached so as to be immovable relatively to the hub 111 of the damper pulley 110. At this time, the disc portion 142b of the accessory ring member 142 may be in contact with the disc portion 116 of the hub 111, or may be spaced from the disc portion 116 of the hub 111 at a predetermined interval.

As shown in FIG. 30, the tubular portion 142a of the accessory ring member 142 extends inwardly to the lip tip end portion 124a of the oil seal 120 or beyond the lip tip end portion 124a, and the outer peripheral surface 142d of the tubular portion 142a are slidably in contact with the lip tip end portion 124a. As described above, in the present embodiment, unlike the respective embodiments described above, not the outer peripheral surface 114b of the boss portion 114, but the outer peripheral surface 142d of the tubular portion 142a of the accessory ring member 142 forms a lip sliding surface of the oil seal 120. Therefore, the outer peripheral surface 142*d* of the tubular portion 142*a* is formed by processing such as polishing, coating or the like. In the present embodiment, it is possible to omit the processing (working or the like) for making the outer peripheral surface 114*b* of the boss portion 114 into the lip sliding surface.

As in the sealing structure 101 with a torsional damper and an oil seal described above, the annular gap g11 is formed between the outer end 129*a* of the side lip 129 of the oil seal 120 and the inner end 131*a* of the outer peripheral surface 131 of the hub pocket 130 in a state where the accessory ring member 142 is attached to the damper pulley 110.

The sealing structure 105 with a torsional damper and an oil seal according to the fifteenth embodiment of the present disclosure described above can exert the same function and effect as the sealing structure 101 with a torsional damper and an oil seal according to the eleventh embodiment of the present disclosure, and can suppress the seal lip 124 of the oil seal 120 from being exposed to foreign matter intruding from the damper pulley 110.

In the sealing structure 105 with a torsional damper and an oil seal according to the fifteenth embodiment of the present disclosure, since the hub pocket 130 is formed in the accessory ring member 142, it is possible to facilitate the working of the hub pocket 130 as in the case of the sealing structure 103 with a torsional damper and an oil seal according to the thirteenth embodiment of the present disclosure described above.

Next, a sealing structure with a torsional damper and an oil seal as a sealing structure with an annular pocket and a sealing device according to a sixteenth embodiment of the present disclosure will be described. The sealing structure 106 with a torsional damper and an oil seal according to the sixteenth embodiment of the present disclosure is different from the sealing structure 105 with a torsional damper and an oil seal according to the fifteenth embodiment of the present disclosure described above only in the configuration of the annular gap formed by the side lip 129 and the outer peripheral surface 131 of the hub pocket 130. Furthermore, the sealing structure 106 with a torsional damper and an oil seal according to the sixteenth embodiment of the present disclosure is different from the sealing structure 102 with a torsional damper and an oil seal according to the second embodiment of the present disclosure only in the configuration forming the hub pocket 130, and has the accessory ring member 142 described above. Hereinafter, with respect to configurations having the same or similar functions as or to those of the sealing structures 102, 105 with a torsional dampers and an oil seals according to the twelfth and fifteenth embodiments of the present disclosure, the description on the configurations will be omitted while the configurations are represented by the same reference signs, and only different configurations will be described.

Figure 31:
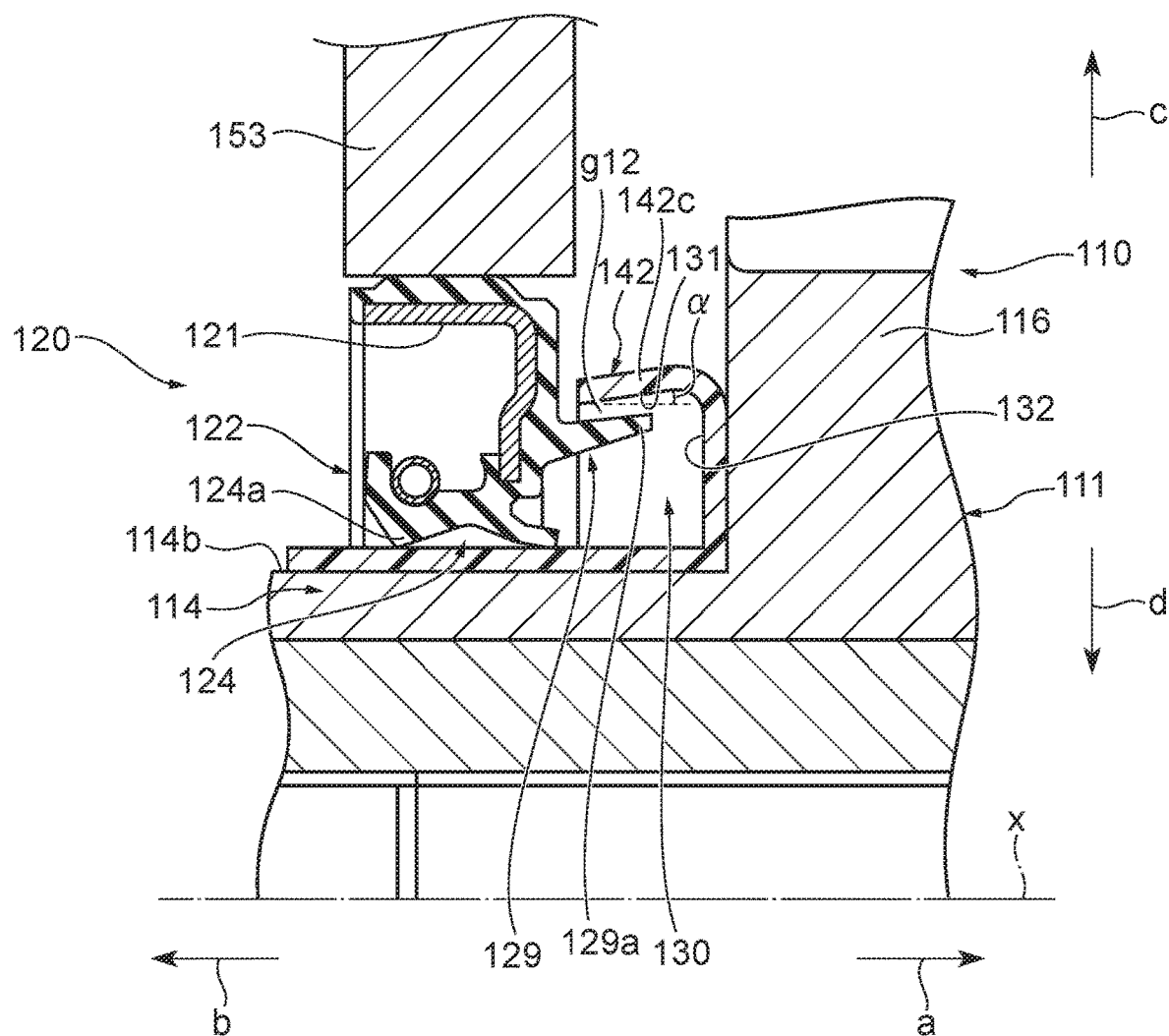
FIG. 31 is a partially enlarged cross-sectional view along an axis to show a schematic configuration of a sealing structure with a torsional damper and an oil seal according to a sixteenth embodiment of the present disclosure.

FIG. 31 is a partially enlarged cross-sectional view of a cross-section taken along the axis to show the schematic configuration of the sealing structure 106 with a torsional damper and an oil seal according to the sixteenth embodiment of the present disclosure. As shown in FIG. 31, as in the case of the sealing structure 102 with a torsional damper and an oil seal according to the twelfth embodiment of the present disclosure, in the sealing structure 106 with a torsional damper and an oil seal, a portion on the outer end 129*a* side of the side lip 129 of the oil seal 120 intrudes to the inside of the hub pocket 130, and the side lip 129 and the outer peripheral surface 131 of the hub pocket 130 are mutually overlapped (overlap each other) over the axis x direction in the radial direction. That is, the side lip 129 and the outer peripheral surface 131 of the hub pocket 130 face each other in the radial direction, and the annular gap g12 is formed between the side lip 129 and the outer peripheral surface 131 of the hub pocket 130, and forms a labyrinth seal. In the sealing structure 106 with a torsional damper and an oil seal, the outer peripheral portion 142*c* of the accessory ring member 142 extends inwards to be longer so that the side lip 129 and the outer peripheral surface 131 of the hub pocket 130 overlap each other. Alternatively, the attached position of the accessory ring member 142 is located on the inside of the attached position of the accessory ring member 142 in the sealing structure 105 with a torsional damper and an oil seal according to the fifteenth embodiment of the present disclosure. Alternatively, the side lip 129 extends outward to be longer.

The sealing structure 106 with a torsional damper and an oil seal according to the sixteenth embodiment of the present disclosure having the above-described configuration can exert the same function and effect as the sealing structures 102 and 105 with a torsion dampers and an oil seals according to the twelfth and fifteenth embodiments of the present disclosure described above.

As described above, as in the case of the sealing structures 102 and 105 with a torsional damper and an oil seal according to the twelfth and fifteenth embodiments of the present disclosure described above, the sealing structure 106 with a torsional damper and an oil seal according to the sixteenth embodiment of the present disclosure can suppress the seal lip 124 of the oil seal 120 from being exposed to foreign matter intruding from the damper pulley 110.

Next, a variant of the accessory ring member 142 in the sealing structures 105, 106 with a torsional damper and an oil seal according to the fifteenth and sixteenth embodiments of the present disclosure described above will be described hereinafter.

Figure 32:
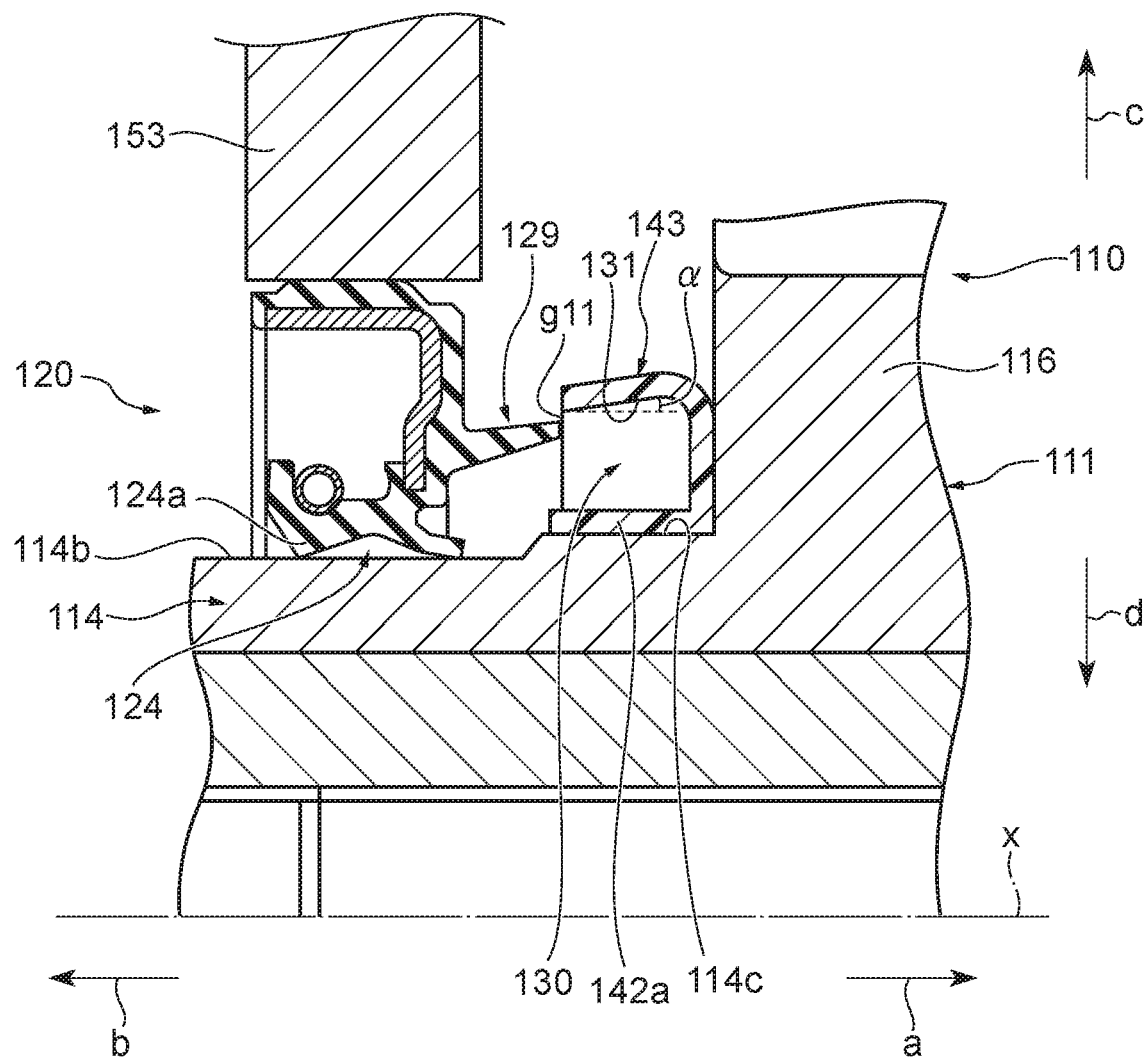
FIG. 32 is a cross-sectional view showing a schematic structure of a first variant of an attached annular member in the sealing structure with a torsional damper and an oil seal according to the fifteenth and sixteenth embodiments of the present disclosure.

FIG. 32 is a cross-sectional view showing a schematic structure of a first variant of the accessory ring member 142 in the sealing structures 105, 106 with a torsional damper and an oil seal according to the fifteenth and sixteenth embodiments of the present disclosure. As shown in FIG. 32, in the accessory ring member 143 according to the first variant, the length of the tubular portion 142*a* is shorter and the tubular portion 142*a* does not form the lip sliding surface on the outer peripheral surface as compared with the aforementioned accessory ring member 142. Therefore, when the accessory ring member 143 according to the present variant is used, the outer peripheral surface 114*b* of the boss portion 114 of the damper pulley 110 forms the lip sliding surface, and it is impossible to omit the processing (working or the like) on the lip sliding surface of the outer peripheral surface 114*b*.

When the accessory ring member 143 according to the present variant is used, as shown in FIG. 32, it is preferable that a stepped surface 114*c* which is an outer peripheral surface continuing to the outer peripheral surface 114*b* on the outside is formed on the boss portion 114 of the damper pulley 110. The stepped surface 114*c* has a larger diameter than the outer peripheral surface 114*b*, and protrudes outward beyond the outer peripheral surface 114*b*. The tubular portion 142*a* is fitted to the stepped surface 114*c* of the boss portion 114, whereby the accessory ring member 143 is fixed to the boss portion 114. This makes it possible to prevent damage to the outer peripheral surface 114*b* which is the lip sliding surface with which the lip tip end portion 124*a* of the seal lip 124 comes into contact when the accessory ring member 143 is fitted. A state where the accessory ring member 143 according to the first variant is attached to the sealing structure 105 with a torsional damper and an oil seal is shown in FIG. 32, but the accessory ring member 143 according to the first variant is applicable to the sealing structure 106 with a torsional damper and an oil seal like the accessory ring member 142. In this case, it is also preferable that the stepped surface 114c which is the outer peripheral surface continuing to the outer peripheral surface 114b on the outside is formed on the boss portion 114 of the damper pulley 110. Even when the accessory ring member 143 according to the present variant is used, the same effect as the sealing structures 105, 106 with a torsional damper and an oil seal according to the fifteenth and sixteenth embodiments of the present disclosure can be exerted.

Figure 33:
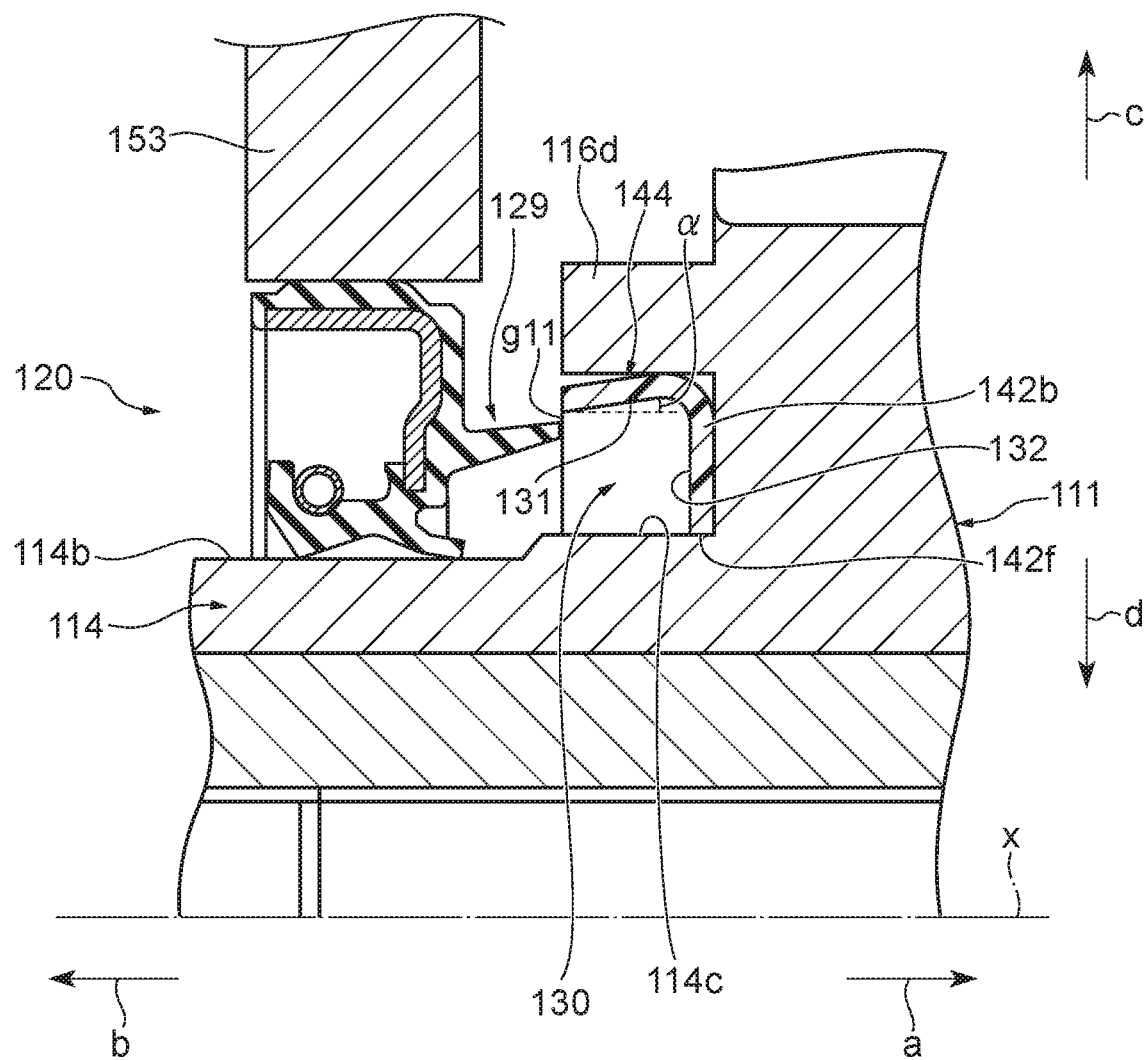
FIG. 33 is a cross-sectional view showing a schematic structure of a second variant of the attached annular member in the sealing structure with a torsional damper and an oil seal according to the fifteenth and sixteenth embodiments of the present disclosure.

FIG. 33 is a cross-sectional view showing a schematic configuration of a second variant of the accessory ring member 142 in the sealing structures 105, 106 with a torsional damper and an oil seal according to the fifteenth and sixteenth embodiments of the present disclosure. As shown in FIG. 33, as compared with the accessory ring member 142, an accessory ring member 144 according to the second variant does not have the tubular portion 142a, and the accessory ring member 144 does not form the lip sliding surface. Therefore, when the accessory ring member 144 according to the present variant is used, as in the case where the accessory ring member 143 is used, the outer peripheral surface 114b of the boss portion 114 of the damper pulley 110 forms the lip sliding surface, and it is impossible to omit the processing (working or the like) on the lip sliding surface of the outer peripheral surface 114b. The accessory ring member 144 is fitted to the boss portion 114 and fixed to the hub 111 at the inner peripheral end 142f which is an end portion on the inner periphery side of the disc portion 142b.

Furthermore, when the accessory ring member 144 according to the present variant is used, as shown in FIG. 33, it is preferable that the stepped surface 114c which is an outer peripheral surface continuing to the outer peripheral surface 114b on the outside is formed on the boss portion 114 of the damper pulley 110. The stepped surface 114c has a larger diameter than the outer peripheral surface 114b, and protrudes outward beyond the outer peripheral surface 114b. The accessory ring member 144 is fitted to the stepped surface 114c of the boss portion 114 at the inner peripheral end 142f of the disc portion 142b, and fixed to the boss portion 114. This makes it possible to prevent damage to the outer peripheral surface 114b which is the lip sliding surface with which the lip tip end portion 124a of the seal lip 124 comes into contact when the accessory ring member 144 is fitted. Furthermore, when the accessory ring member 144 according to the present variant is used, the disc portion 116 of the hub 111 of the damper pulley 110 may be provided with an annular protrusion portion 116d for interposing the accessory ring member 144 between the boss portion 114 and the annular protrusion portion 116d as shown in FIG. 33. As a result, the accessory ring member 144 can be firmly fixed by the stepped surface 114c of the boss portion 114 and the inner surface of the protrusion portion 116d. The protrusion portion 116d may be provided on the disc portion 116 of the hub 111 when the aforementioned accessory ring member 143 is used.

A state where the accessory ring member 144 according to the second variant is attached to the sealing structure 105 with a torsional damper and an oil seal is shown in FIG. 33, but the accessory ring member 144 according to the second variant may be used in the sealing structure 106 with a torsional damper and an oil seal like the accessory ring member 142. In this case, it is also preferable that the stepped surface 114c which is the outer peripheral surface continuing to the outer peripheral surface 114b on the outside is formed on the boss portion 114 of the damper pulley 110. Even when the accessory ring member 144 according to the present variant is used, the same effect as the sealing structures 105, 106 with a torsional damper and an oil seal according to the fifteenth and sixteenth embodiments of the present disclosure described above can be exerted.

Next, a sealing structure with a torsional damper and an oil seal as a sealing structure with an annular pocket and a sealing device according to a seventeenth embodiment of the present disclosure will be described. The sealing structure 107 with a torsional damper and an oil seal according to the seventeenth embodiment of the present disclosure is different from the sealing structure 101 with a torsional damper and an oil seal according to the eleventh embodiment of the present disclosure described above in the configuration forming the hub pocket 130. Hereinafter, with respect to configurations having the same or similar functions as or to the sealing structure 101 with a torsional damper and an oil seal according to the eleventh embodiment of the present disclosure, the description on the configurations will be omitted while the configurations are represented by the same reference signs, and only different configurations will be described.

Figure 34:
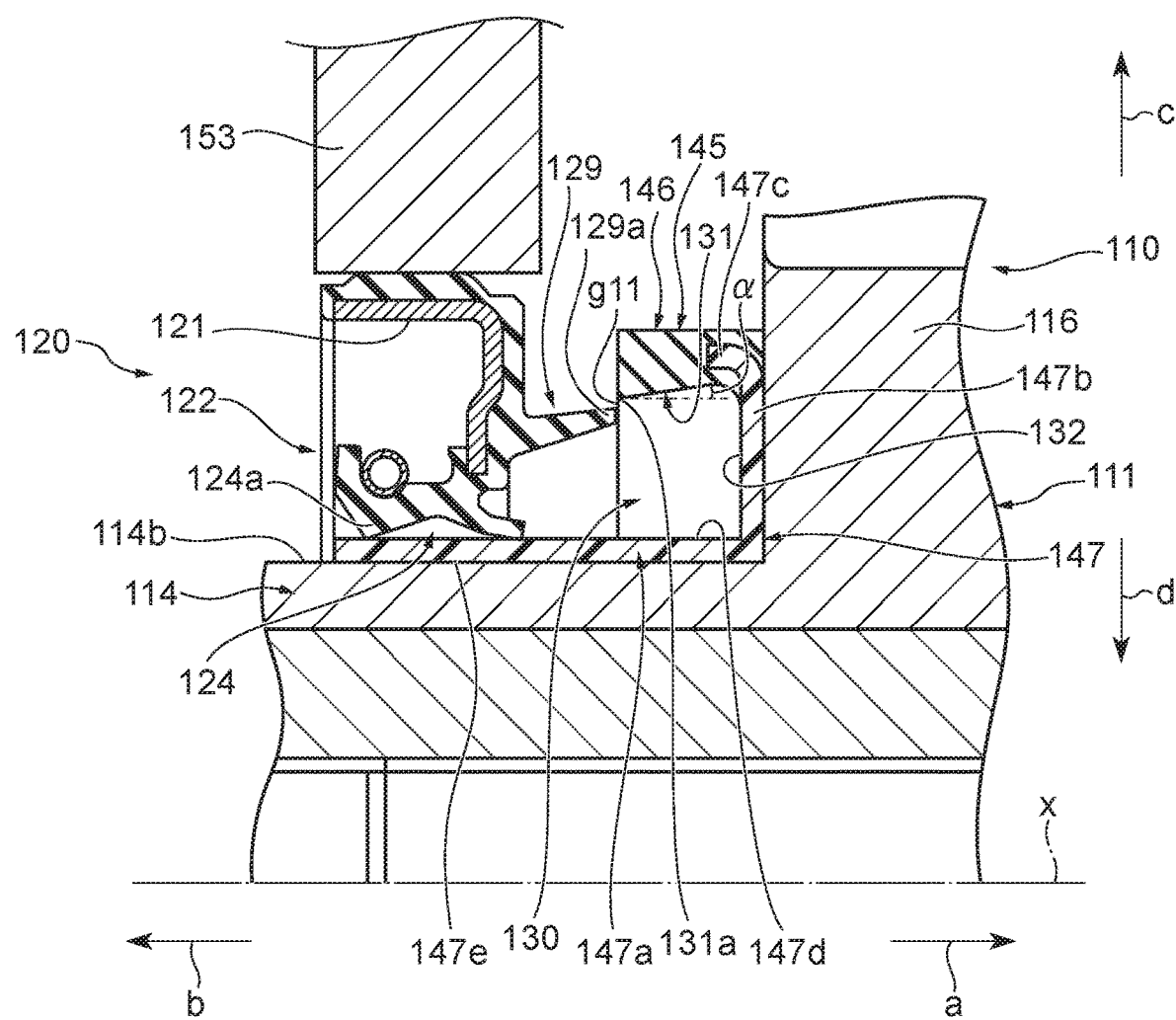
FIG. 34 is a partially enlarged cross-sectional view of a cross-section taken along an axis to show a schematic configuration of a sealing structure with a torsional damper and an oil seal according to a seventeenth embodiment of the present disclosure.

FIG. 34 is a partially enlarged cross-sectional view of a cross-section taken along the axis to show a schematic configuration of the sealing structure 107 with a torsional damper and an oil seal according to the seventeenth embodiment of the present disclosure. As shown in FIG. 34, in the damper pulley 110 of the sealing structure 107 with a torsional damper and an oil seal, the hub pocket 130 is not formed in the hub 111 of the damper pulley 110 as in the case of the sealing structure 105 with a torsional damper and an oil seal according to the fifteenth embodiment. The sealing structure 107 with a torsional damper and an oil seal has an accessory ring member 145 which is a separate body from the hub 111 attached to the damper pulley 110, and the hub pocket 130 is formed in the accessory ring member 145.

The accessory ring member 145 is an annular member in a hollow annular shape centered about the axis x, and is formed so as to be fittable to the boss portion 114 of the damper pulley 110. A recessed part is formed from one side surface of the accessory ring member 145 to form a hub pocket 130. Specifically, as shown in FIG. 34, the accessory ring member 145 includes an elastic flange portion 146 in an annular shape which is formed of an elastic material and centered about the axis x, and a metal ring portion 147 in an annular shape which is formed of a metal material and centered about the axis x.

The metal ring portion 147 includes a tubular portion 147a which is a cylindrical portion centered about the axis x, a disc portion 147b which is a disc-shaped portion extending radially from an outer end portion of the tubular portion 147a to the outer periphery side, and an outer peripheral portion 147c which is a portion bent from an end portion on the outer periphery side of the disc portion 147b and extending inwards. As described above, the metal ring portion 147 is formed of a metal material, and it is formed by performing process working or the like on one metal member, for example, a metal plate. The tubular portion 147a, the disc portion 147b, and the outer peripheral portion 147c are integrally formed from the same material, and have the same or substantially the same thickness. The metal material of the metal ring portion 147 includes, for example, stainless steel or SPCC (cold rolled steel).

The elastic flange portion 146 is formed of, for example, a rubber material. The rubber elastic material of the elastic body portion 122 of the oil seal 120 described above is usable as the rubber material of the elastic flange portion 146. As shown in FIG. 34, the elastic flange portion 146 is an annular member extending in the axis x direction, and it is attached to the outer periphery side of the metal ring portion 147, and extends inward from the disc portion 147b of the metal ring portion 147. Specifically, the outer peripheral portion 147c and an end portion on the outer periphery side of the disc portion 147b of the metal ring portion 147 and the vicinity thereof are embedded in the elastic flange portion 146 from the outside, and the elastic flange portion 146 is held in the accessory ring member 145. Furthermore, the inner peripheral surface of the elastic flange portion 146 forms the outer peripheral surface 131 of the hub pocket 130, and the outer peripheral surface 131 extends while inclined at an inclination angle α with respect to the axis x as described above. The elastic flange portion 146 is formed by cross-linking molding and is crosslinked and bonded to the metal ring portion 147 under the crosslinking molding.

As described above, in the accessory ring member 145, the tubular portion 147a of the metal ring portion 147, the disc portion 147b of the metal ring portion 147, and the elastic flange portion 146 define a space to form the hub pocket 130. An inner surface of the disc portion 147b of the metal ring portion 147 forms the bottom surface 312 of the hub pocket 130, and an outer peripheral surface 147d which is an surface on the outer periphery side of the tubular portion 147a of the metal ring portion 147 forms a surface on the inner periphery side which faces the outer peripheral surface 131 of the hub pocket 130.

The tubular portion 147a of the metal ring portion 147 is formed so as to be fittable to the boss portion 114 of the damper pulley 110, and an inner peripheral surface 147e which is a surface on the inner periphery side of the tubular portion 147a is in close contact with the outer peripheral surface 114b of the boss portion 114 in a state where the accessory ring member 145 is attached to the boss portion 114. Furthermore, the tubular portion 147a of the metal ring portion 147 is fitted to the boss portion 114, whereby the accessory ring member 145 is attached so as to be immovable relatively to the hub 111 of the damper pulley 110. At this time, the disc portion 147b of the metal ring portion 147 abuts on the disc portion 116 of the hub 111, or is spaced from the disc portion 116 at a predetermined interval.

As shown in FIG. 34, the tubular portion 147a of the metal ring portion 147 extends inward to the lip tip end portion 124a of the oil seal 120 or beyond the lip tip end portion 124a, and the outer peripheral surface 147d of the tubular portion 147a are slidably in contact with the lip tip end portion 124a. As described above, in the present embodiment, unlike the above-described embodiments, not the outer peripheral surface 114b of the boss portion 114, but the outer peripheral surface 147d of the tubular portion 147a of the metal ring portion 147 of the accessory ring member 145 forms the lip sliding surface of the oil seal 120. Therefore, like the aforementioned accessory ring member 142 (FIG. 20), the outer peripheral surface 147d of the tubular portion 147a is formed by processing such as polishing, coating or the like. In the present embodiment, as in the case of the sealing structure 105 according to the fifth embodiment of the present disclosure, it is possible to omit the processing (working or the like) for making the outer peripheral surface 114b of the boss portion 114 into the lip sliding surface. The outer peripheral portion 147c of the metal ring portion 147 has a length which enables holding of at least the elastic flange portion 146.

Under a state where the accessory ring member 145 is attached to the damper pulley 110, the annular gap g11 is formed between the outer end 129a of the side lip 129 of the oil seal 120 and the inner end 131a of the outer peripheral surface 131 of the hub pocket 130 as in the case of the sealing structure 101 with a torsional damper and an oil seal described above.

The sealing structure 107 with a torsional damper and an oil seal according to the seventeenth embodiment of the present disclosure described above can exert the same function and effect as the sealing structure 101 with a torsional damper and an oil seal according to the eleventh embodiment of the present disclosure, and can suppress the seal lip 124 of the oil seal 120 from being exposed to foreign matter intruding from the damper pulley 110.

In the sealing structure 107 with a torsional damper and an oil seal according to the seventeenth embodiment of the present disclosure, the outer peripheral surface 131 of the hub pocket 130 is formed by the elastic flange portion 146 formed of an elastic material in the accessory ring member 145 on which the hub pocket 130 is formed. Therefore, it is possible to accurately form the outer peripheral surface 131 so that the diameter-increasing angle α of the outer peripheral surface 131 of the hub pocket 130 is equal to a desired value. This is because the molding using a rubber material can more enhance the dimensional accuracy of molded articles than the press working on a metal material. Furthermore, even when the side lip 129 comes into contact with the elastic flange portion 146 due to eccentricity of the boss portion 114 of the damper pulley 110 or the like, the elastic flange portion 146 absorbs an impact because it is formed of an elastic material such as a rubber material, which makes it difficult to damage the side lip 129. Furthermore, in press forming of a metal member, when the shape of the metal member becomes complicated, residual stress occurs in the metal member, and the entire metal member is easily distorted. However, in the accessory ring member 145, the shape of the metal ring portion 147 formed of a metal material can be simplified, and the forming accuracy (dimensional accuracy) of the metal ring portion 147 can be enhanced.

In the sealing structure 107 with a torsional damper and an oil seal according to the seventeenth embodiment of the present disclosure, since the hub pocket 130 is formed in the accessory ring member 145, it is possible to facilitate the working of the hub pocket 130 like the sealing structure 103 with a torsional damper and an oil seal according to the thirteenth embodiment of the present disclosure described above.

In the sealing structure 107 with a torsional damper and an oil seal described above, the side lip 129 of the oil seal 120 does not intrude to the inside of the hub pocket 130, but a portion on the side of the outer end 129a of the side lip 129 intrudes to the inside of the hub pocket 130, so that the side lip 129 and the outer peripheral surface 131 of the hub pocket 130 may overlap each other radially over the axis x direction. That is, like the aforementioned sealing structures 102 and 106 (FIGS. 25 and 31), the side lip 129 and the outer peripheral surface 131 of the hub pocket 130 may face each other in the radial direction, and the annular gap g12 may be formed between the side lip 129 and the outer peripheral surface 131 of the hub pocket 130.

Furthermore, in the sealing structure 107 with a torsional damper and an oil seal described above, the shape of the metal ring portion 147 of the accessory ring member 145 is not limited to the above-described shape, and it may be, for example, such a shape that the tubular portion 147a does not extend to the seal lip 124, and the boss portion 114 of the damper pulley 110 forms a lip sliding surface like the above-described accessory ring member 143 shown in FIG. 32. In this case, as shown in FIG. 32, it is preferable that a stepped surface 114c which is an outer peripheral surface continuing to the outer peripheral surface 114b on the outside is formed in the boss portion 114 of the damper pulley 110, and the accessory ring member 145 is fitted to the stepped surface 114c.

Furthermore, the shape of the metal ring portion 147 of the accessory ring member 145 may be a shape which does not have the tubular portion 147a like the accessory ring member 144 shown in FIG. 33 described above. In this case, as shown in FIG. 33, it is preferable that the shape of the hub 111 of the damper pulley 110 is a shape having the protrusion portion 116d and the stepped surface 114c.

Next, a sealing structure with a torsional damper and an oil seal as a sealing structure with an annular pocket and a sealing device according to an eighteenth embodiment of the present disclosure will be described. The sealing structure 108 with a torsional damper and an oil seal according to the eighteenth embodiment of the present disclosure differs in the configuration of the gap g11 from the sealing structure 101 with a torsional damper and an oil seal according to the eleventh embodiment of the present disclosure. Hereinafter, with respect to configurations having the same or similar functions as or to the sealing structure 101 with a torsional damper and an oil seal according to the eleventh embodiment of the present disclosure, the description on the configurations will be omitted while the configurations are represented by the same reference signs, and only different configurations will be described.

Figure 35:
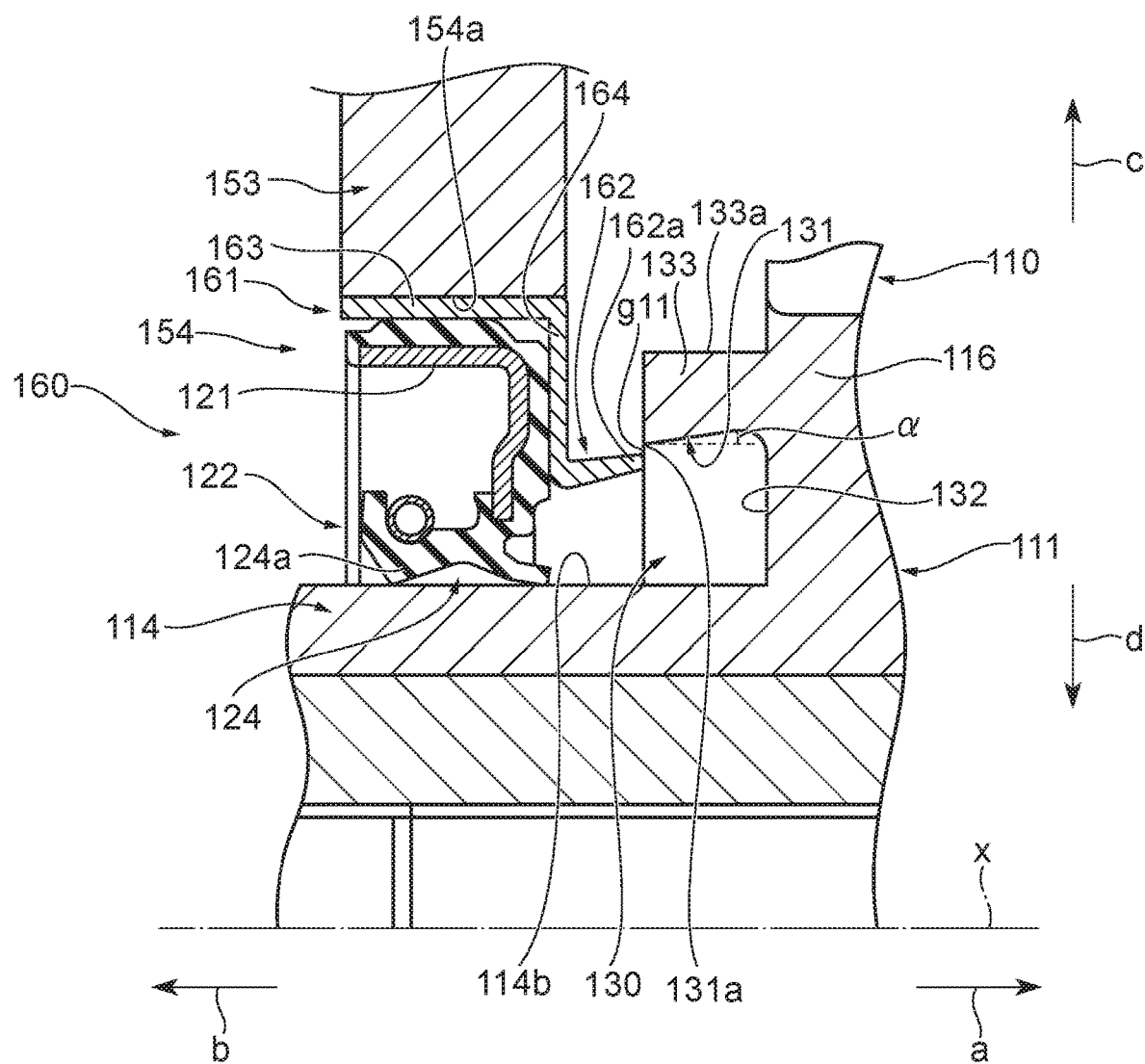
FIG. 35 is a partially enlarged cross-sectional view of a cross-section taken along an axis to show a schematic configuration of a sealing structure with a torsional damper and an oil seal according to an eighteenth embodiment of the present disclosure.

FIG. 35 is a partially enlarged cross-sectional view of a cross-section taken along the axis to show a schematic configuration of the sealing structure 108 with a torsional damper and an oil seal according to the eighteenth embodiment of the present disclosure. As shown in FIG. 35, the sealing structure 108 with a torsional damper and an oil seal has an oil seal 160 instead of the oil seal 120 in the above-described sealing structure 101, and also has a ring member 161 forming the gap g11. The oil seal 160 differs from the oil seal 120 in that it does not have the side lip 129 and it is not directly fitted to the through-hole 154 of the front cover 153.

The ring member 161 is an annular member in a hollow annular shape centered about the axis x, has a projecting portion 162 as a side lip forming an outer peripheral surface which is inclined at the same inclination angle γ (see FIG. 20) as the outer peripheral surface of the side lip 129 of the oil seal 120 described above, and is fittable to the through-hole 154 of the front cover 153. Specifically, the ring member 161 includes a fitting portion 163 in a cylindrical shape centered about the axis x, and a disc-shaped support portion 164 extending from an outer end portion of the fitting portion 163 to the inner periphery side, and the projecting portion 162 extends from an end portion on the inner periphery side of the support portion 164 to a side opposite to the fitting portion 163 and extends to the hub pocket 130.

The fitting portion 163 is formed so as to be fittable to the through-hole 154 of the front cover 153, and also is formed so as to come into close contact with the inner peripheral surface 154a of the through-hole 154 on the peripheral surface on the outer periphery side when the fitting portion 163 is fitted into the through-hole 154 of the front cover 153.

The projecting portion 162 is a portion in an annular shape centered about the axis x, and forms the gap g11 between the projecting portion 162 and the inner end 131a of the outer peripheral surface 131 of the hub pocket 130 at the outer end 162a as an outer end portion.

The ring member 161 is formed of a metal material or a resin material, and for example stainless steel, SPCC (cold rolled steel) or the like is used as the metal material. When the sealing structure 108 is used in an environment where rust is likely to occur, stainless steel is preferable as the metal material of the ring member 161. The ring member 161 is formed as a separate body from the oil seal 160 by a press working or a resin forming, as shown in FIG. 35, by pressing the support portion 164 of the ring member 161 while the oil seal 160 is internally fitted in the ring member 161, the fitting portion 163 is fitted into the through-hole 154 of the front cover 153, and the ring member 161 is fitted and attached to the front cover 153, whereby the oil seal 160 and the ring member 161 are fitted to the front cover 153 to form the gap g11.

The projecting portion 162 of the ring member 161 is not limited to a shape in which the projecting portion 162 does not intrude to the inside of the hub pocket 130, and like the side lip 129 of the sealing structure 102 described above, a portion on the outer end 162a side of the projecting portion 162 may intrude to the inside of the hub pocket 130, and the projecting portion 162 and the outer peripheral surface 131 of the hub pocket 130 may overlap each other radially over the axis x direction. That is, like the sealing structure 102 (FIG. 25) described above, the projecting portion 162 and the outer peripheral surface 131 of the hub pocket 130 may face each other in the radial direction, and the annular gap g12 may be formed between the projecting portion 162 and the outer peripheral surface 131 of the hub pocket 130.

The sealing structure 108 with a torsional damper and an oil seal according to the eighteenth embodiment of the present disclosure can exert the same effect as the sealing structures 101 and 102 with a torsional damper and an oil seal according to the eleventh and twelfth embodiments of the present disclosure. Furthermore, the ring member 161 is formed of a metal material or a resin material and has higher rigidity than a member formed of a rubber material, and the projecting portion 162 is difficult to be deformed by its own weight. Therefore, when the projecting portion 162 forms the gap g12 between the projecting portion 162 and the hub pocket 130, the projecting portion 162 can be lengthened without sagging by its own weight. Therefore, the overlap amount b between the projecting portion 162 and the hub pocket 130 can be increased, and the amount of foreign matter intruding through the gap g12 can be reduced.

The oil seal 160 and the ring member 161 in the present embodiment can be applied in place of the oil seal 120 in the sealing structures 103 to 107 with a torsional damper and an oil seal according to the thirteenth to the seventeenth embodiments of the present disclosure described above.

Figure 36:
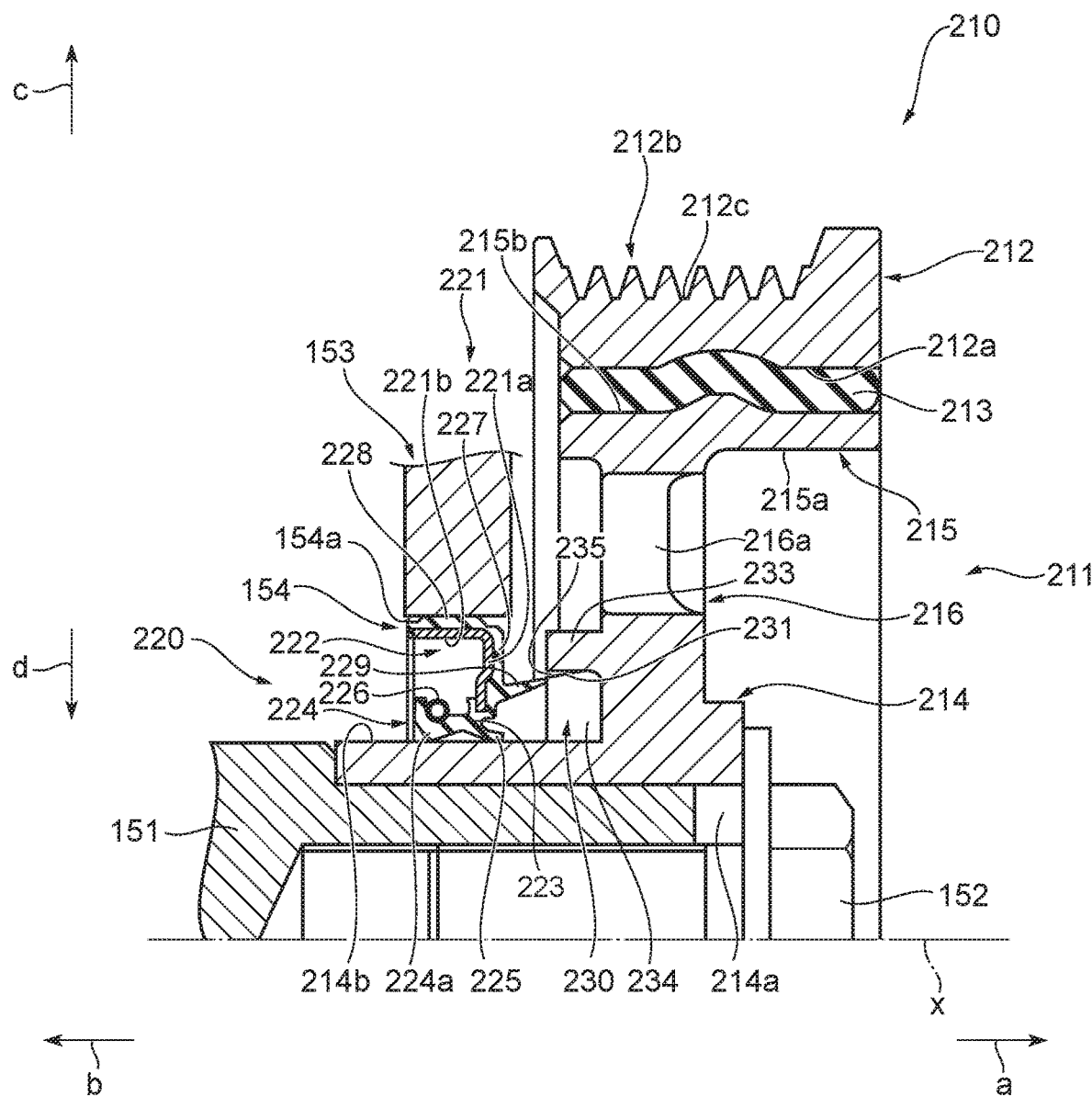
FIG. 36 is a cross-sectional view of a cross-section taken along an axis to show a schematic structure of a sealing structure with a torsional damper and an oil seal as a sealing structure with an annular pocket and a sealing device according to a nineteenth embodiment of the present disclosure.

FIG. 36 is a partial cross-sectional view of a cross-section taken along an axis to show a schematic structure of a sealing structure with a torsional damper and an oil seal as a sealing structure with an annular pocket and a sealing device according to a nineteenth embodiment of the present disclosure. In the sealing structure with a torsional damper and an oil seal according to the nineteenth embodiment of the present disclosure, a sealing structure with an annular pocket and a sealing device according to the present disclosure is applied to a torsional damper and an oil seal of an engine of a vehicle. For convenience of description, the direction of an arrow a (see FIG. 36) in the axis x direction is defined as an outside (one side), and the direction of an arrow b (see FIG. 36) in the axis x direction is defined as an inside (the other side). More specifically, the outside is a direction away from a space to be sealed, and the inside is a direction approaching the space to be sealed. Furthermore, in a direction vertical to the axis x (hereinafter also referred to as "radial direction"), a direction away from the axis x (the direction of an arrow c in FIG. 36) is defined as an outer periphery side and a direction approaching the axis x (the direction of an arrow d in FIG. 36) is defined as an inner periphery side.

As shown in FIG. 36, the sealing structure 201 with a torsional damper and an oil seal according to the nineteenth embodiment of the present disclosure includes a damper pulley 210 which is a torsional damper as the functional member, and an oil seal 220 as the sealing device. The damper pulley 210 is fixed to one end of the crankshaft 151 of the engine by the bolt 152, and the oil seal 220 aims to perform sealing between the through-hole 154 of the front cover 153 of the engine and the damper pulley 210.

The damper pulley 210 includes a hub 211, a pulley 212 as a mass body, and a damper elastic body 213 arranged between the hub 211 and the pulley 212. The hub 211 is a member in an annular shape around the axis x, more specifically, a member in an annular shape centered or substantially centered about the axis x, and includes a boss portion 214 on the inner periphery side, a rim portion 215 on the outer periphery side, a disc-shaped disc portion 216 for connecting the boss portion 214 and the rim portion 215. The hub 211 is manufactured, for example, from a metal material by casting or the like.

In the hub 211, the boss portion 214 is a portion in an annular shape centered or substantially centered about the axis x in which a through-hole 214a is formed, and the disc portion 216 extends from the outer peripheral surface of an outer portion of the boss portion 214 in the outer peripheral direction. The boss portion 214 has an outer peripheral surface 214b which is a surface on the outer periphery side of a cylindrical inner portion, and the outer peripheral surface 214b is made as a smooth surface and serves as a sealing surface of the oil seal 220 as described later. The rim portion 215 is a portion in an annular shape centered or substantially centered about the axis x, more specifically, a cylindrical shape, and is a portion which is located concentrically with respect to the boss portion 214 and on the outer periphery side than the boss portion 214. The disc portion 216 extends in the inner peripheral direction from the inner peripheral surface 215a which is a surface on the inner periphery side of the rim portion 215. A damper elastic body 213 is pressure-bonded to an outer peripheral surface 215b which is a surface on the outer periphery side surface of the rim portion 215.

Figure 37:
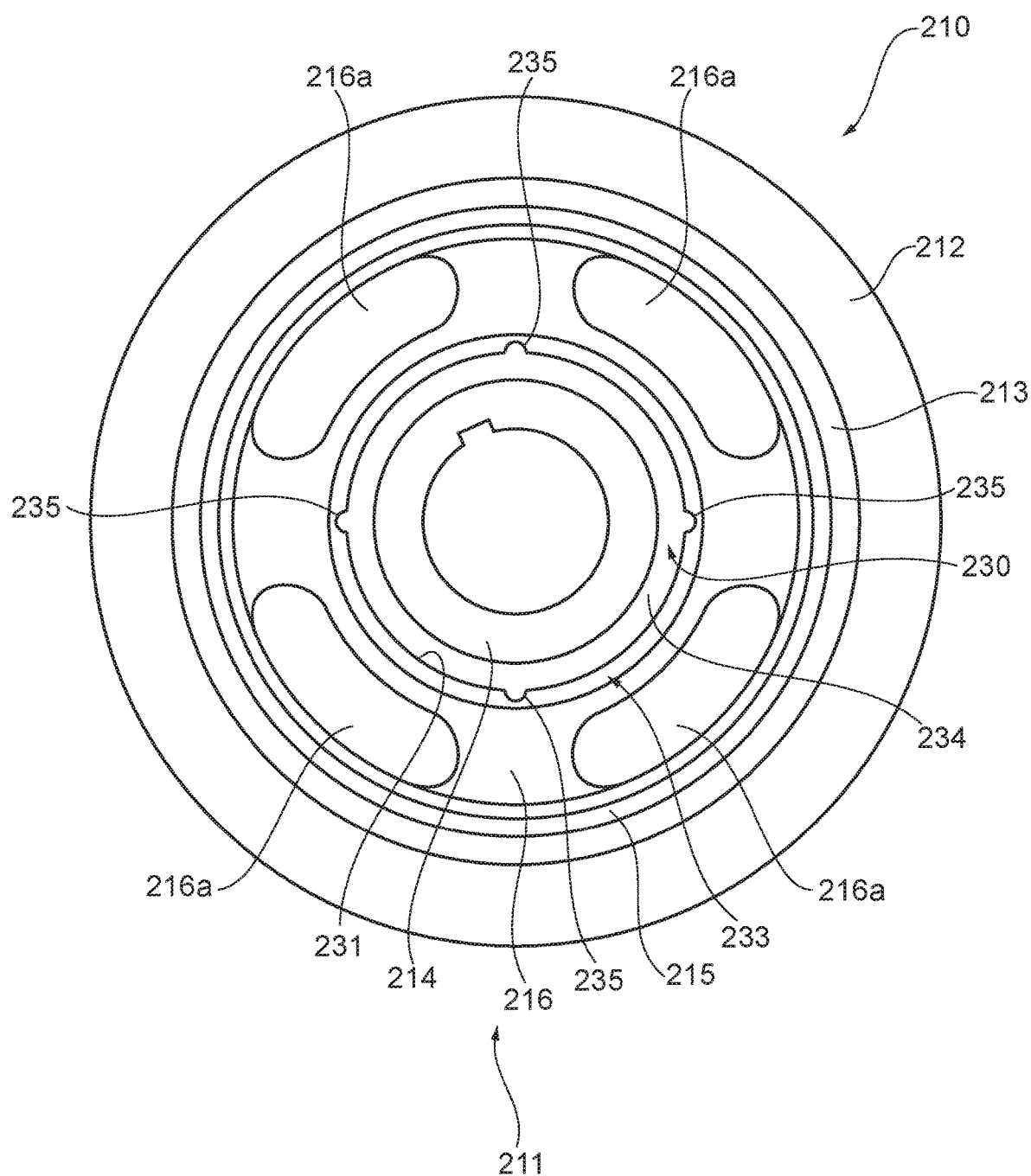
FIG. 37 is a rear view showing the schematic structure of the torsional damper in the sealing structure shown in FIG. 36.

The disc portion 216 extends between the boss portion 214 and the rim portion 215 to connect the boss portion 214 and the rim portion 215. The disc portion 216 may extend in a direction vertical to the axis x, or may extend in a direction inclined with respect to the axis x. Furthermore, the disc portion 216 may be shaped such that a cross-section along the axis x (hereinafter also simply referred to as "cross-section") is curved or extends straightly. Furthermore, as shown in FIGS. 36 and 37, at least one window portion 216a which is a through-hole penetrating through the disc portion 216 between the inside and the outside is formed in the disc portion 216. In the present embodiment, four window portions 216a are formed such that the window portion 216c are located at equal angular intervals in the peripheral direction concentrically with respect to the axis x (see FIG. 37). The window portions 216a serve to reduce the weight of the hub 211, and thus the damper pulley 210.

The pulley 212 is a member in an annular shape centered or substantially centered about the axis x, and has such a shape that it covers the hub 211 on the outer periphery side. Specifically, an inner peripheral surface 212a which is a surface on the inner periphery side of the pulley 212 has a shape corresponding to the outer peripheral surface 215b of the rim portion 215 of the hub 211, and as shown in FIG. 36, the pulley 212 is positioned so that the inner peripheral surface 212a thereof faces the outer peripheral surface 215b of the rim portion 215 with a space therebetween in the radial direction. In addition, plural annular v-grooves 212c are formed on the outer peripheral surface 212b which is a surface on the outer periphery side of the pulley 212 so that a timing belt (not shown) can be wound around the annular v-grooves 212c.

The damper elastic body 213 is provided between the pulley 212 and the rim portion 215 of the hub 211. The damper elastic body 213 is a damper rubber and is formed by crosslinking (vulcanization) molding from a rubber-like elastic material excellent in heat resistance, cold resistance, and fatigue strength. The damper elastic body 213 is press-fitted between the pulley 212 and the rim portion 215 of the hub 211, and is fitted and fixed to the inner peripheral surface 212a of the pulley 212 and the outer peripheral surface 215b of the rim portion 215.

In the damper pulley 210, the pulley 212 and the damper elastic body 213 form a damper portion, and are synchronized with each other so that the torsional-direction natural frequency of the damper portion coincides with the torsional-direction natural frequency of the crankshaft 151 which is a predetermined vibration frequency range in which the torsional angle of the crankshaft 151 is maximized. That is, the inertial mass in the circumferential direction of the pulley 112 and the torsional-direction shearing spring constant of the damper elastic body 213 are adjusted so that the torsional-direction natural frequency of the damper portion is coincident with the torsional-direction natural frequency of the crankshaft 151. As shown in the figure, the damper pulley 210 may not be a so-called single mass type, but may be a double mass type having two inertial masses (mass bodies), or a type having plural inertial masses.

Furthermore, the damper pulley 210 has a hub pocket 230 as a pocket in an annular shape around an axis x which extends in the peripheral direction along the boss portion 214 of the hub 211 and is recessed to the outside (one side) in the axis x direction. Details of the hub pocket 230 will be described later with reference to FIG. 38.

As described above, the damper pulley 210 is attached to one end of the crankshaft 151. Specifically, as shown in FIG. 36, one end of the crankshaft 151 is inserted into the through-hole 214a of the boss portion 214 of the hub 211, the bolt 152 is screwed to the crankshaft 151 from the outside, and the damper pulley 210 is fixed to the crankshaft 151. A key such as a woodruff key engaging with the crankshaft 151 and the boss portion 214 is provided between the crankshaft 151 and the boss portion 214, so that the damper pulley 210 is not rotatable relatively to the crankshaft 151.

Under a state where the damper pulley 210 is attached to the crankshaft 151, the damper pulley 210 is set to a state where an inner portion having the outer peripheral surface 214b of the boss portion 214 is inserted in the through-hole 154 of the front cover 153, and an annular space is formed between the outer peripheral surface 214b of the boss portion 214 and the through-hole 154 of the front cover 153.

As shown in FIG. 36, the oil seal 220 includes a metal reinforcing ring 221 in an annular shape centered or substantially centered about the axis x, and an elastic body portion 222 constituted by an elastic body in an annular shape centered or substantially centered about the axis x. The elastic body portion 222 is integrally attached to the reinforcing ring 221. For example, stainless steel or SPCC (cold rolled steel) is used as the metal material of the reinforcing ring 221. Various rubber materials are used for the elastic body of the elastic body portion 222. Various rubber materials include, for example, synthetic rubbers such as nitrile rubber (NBR), hydrogenated nitrile rubber (H-NBR), acrylic rubber (ACM), and fluororubber (FKM).

The reinforcing ring 221 is substantially L-shaped in cross-section, and includes a disc portion 221a and a tubular portion 221b. The disc portion 221a is a hollow disc-shaped portion expanding in a direction vertical or substantially vertical to the axis x, and the tubular portion 221b is a cylindrical or substantially cylindrical portion extending from an end portion on the outer periphery side of the disc portion 221a to the inside in the axis x direction.

The elastic body portion 222 is attached to the reinforcing ring 221 and is integrally formed with the reinforcing ring 221 such that the elastic body portion 222 covers the reinforcing ring 221 from the outside and the outer periphery side in the present embodiment. The elastic body portion 222 includes a lip waist portion 223, a seal lip 224, and a dust lip 225. As shown in FIG. 36, the lip waist portion 223 is a portion positioned in the vicinity of an end portion on the inner periphery side of the disc portion 221a of the reinforcing ring 221, and the seal lip 224 is a portion that extends inward from the lip waist portion 223 and is arranged so as to face the tubular portion 221b of the reinforcing ring 221. The dust lip 225 extends from the lip waist portion 223 toward the axis x direction.

The seal lip 224 has, at an end portion on the inside thereof, an annular lip tip end portion 224a having a wedge shape whose cross-sectional shape protrudes to the inner periphery side. As described later, the lip tip end portion 224a is formed so that the lip tip portion 224a is in close contact with the outer peripheral surface 214b of the boss portion 214 of the hub 211 in a manner that the outer peripheral surface 214b is slidable so as to seal the space between the seal lip 224 and the damper pulley 210. Furthermore, a garter spring 226 for applying strained force directing to the inner periphery side to the seal lip 224 is fitted to the outer peripheral portion side of the seal lip 224.

The dust lip 225 is a part extending from the lip waist portion 223, and extends to the outside and the inner periphery side. Intrusion of foreign matter in the direction to the lip tip end portion 224a in a usage state is prevented by the dust lip 225.

Furthermore, the elastic body portion 222 includes a rear cover 227 and a gasket portion 228. The rear cover 227 covers the disc portion 221a of the reinforcing ring 221 from the outside, and the gasket portion 228 covers the tubular portion 221b of the reinforcing ring 221 from the outer periphery side.

Furthermore, the oil seal 220 has a side lip 229 extending toward the direction to the outside. Details of the side lip 229 will be described later with reference to FIG. 38.

The reinforcing ring 221 is manufactured by, for example, press working or forging, and the elastic body portion 222 is molded by cross-linking (vulcanization) molding using a mold. In the crosslinking molding, the reinforcing ring 221 is placed in the mold, the elastic body portion 222 is adhesively bonded to the reinforcing ring 221 by crosslinking (vulcanization) bonding, whereby the elastic body portion 222 is molded integrally with the reinforcing ring 221.

As described above, the oil seal 220 seals a space formed between the through-hole 154 of the front cover 153 and the outer peripheral surface 214b of the boss portion 214 of the damper pulley 210. Specifically, the oil seal 220 is press-fitted into and attached to the through-hole 154 of the front cover 153, and the gasket portion 228 of the elastic body portion 222 is compressed to liquid-tightly contact the inner peripheral surface 154a which is a surface on the inner periphery side of the through-hole 154. As a result, the space between the oil seal 220 and the through-hole 154 of the front cover 153 is hermetically sealed. Furthermore, the lip tip end portion 224a of the seal lip 224 liquid-tightly contacts the outer peripheral surface 214b of the boss portion 214 of the hub 211, and the space between the oil seal 220 and the damper pulley 210 is hermetically sealed.

Figure 38:
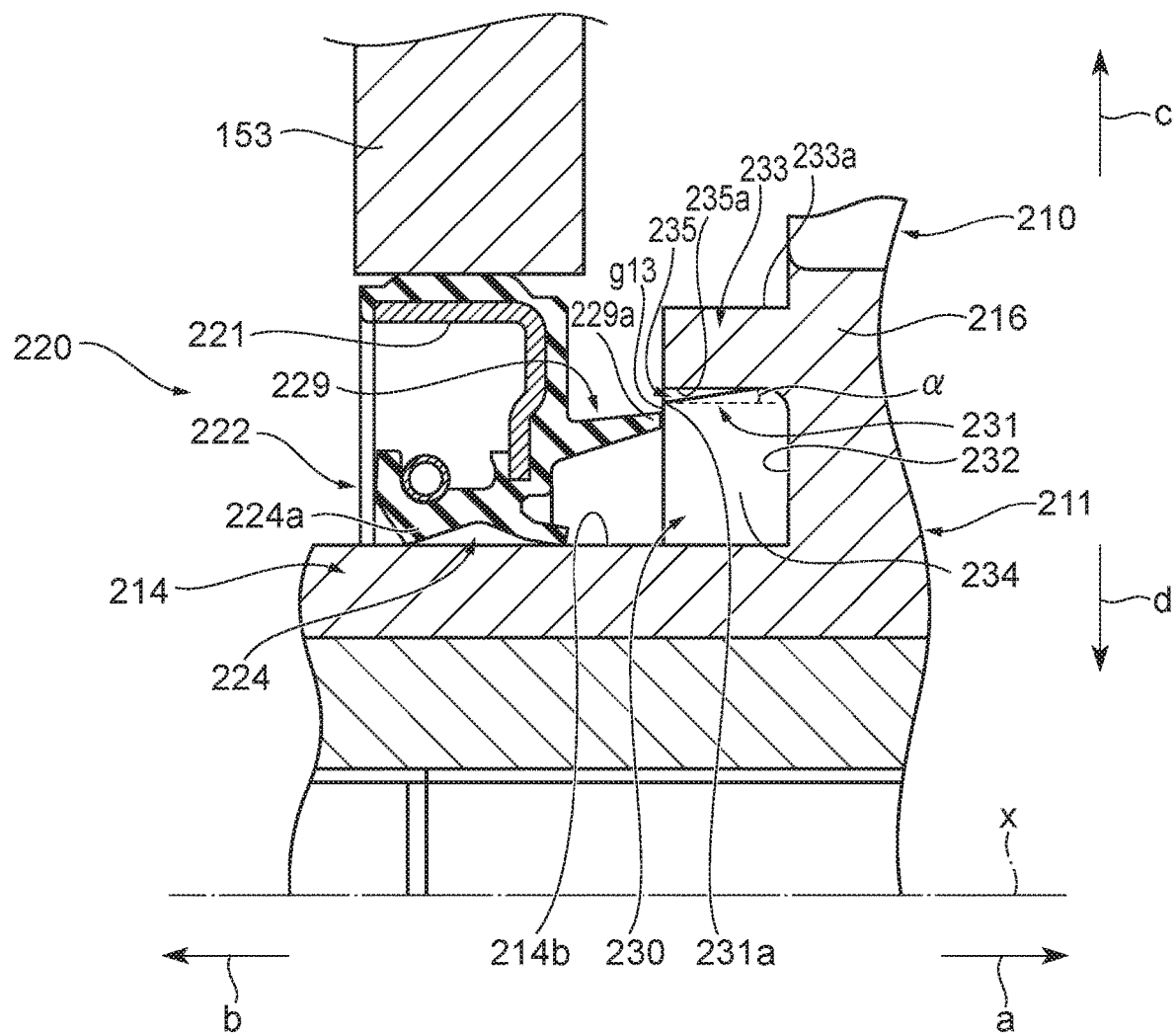
FIG. 38 is a partially enlarged sectional view of the sealing structure with a torsional damper and an oil seal shown in FIG. 36.

Next, the hub pocket 230 of the damper pulley 210 and the side lip 229 of the oil seal 220 will be described with reference to FIG. 38. FIG. 38 is a partially enlarged sectional view of the sealing structure 201 with a torsional damper and an oil seal.

As shown in FIG. 38, the hub pocket 230 has an outer peripheral surface 231 which is an annular surface around the axis x and extending along the axis x, and forms a recessed part 234 as an annular portion around the axis x which is recessed to the outside in the axis x direction. In the damper pulley 210, the hub pocket 230 is a recessed part which is formed inside the disc portion 216, and recessed to the outside while extending so as to surround the outer peripheral surface 214b of the boss portion 214. Specifically, the outer peripheral surface 231 of the hub pocket 230 is formed by a ridge portion 233 which is an annular portion protruding from the disc portion 216 of the hub 211 to the inside and enclosing the boss portion 214 on the outer periphery side. An annular inner peripheral surface facing the outer peripheral surface 214b of the boss portion 214 of the ridge portion 233 forms the outer peripheral surface 231. The hub pocket 230 is defined by the outer peripheral surface 231, a bottom surface 232 extending between the outer peripheral surface 231 and the outer peripheral surface 214b of the boss portion 214, and the outer peripheral surface 214b of the boss portion 214.

The outer peripheral surface 231 of the hub pocket 230 is an annular surface which increases in diameter toward the outer side (one side) in the axis x direction, and expands to the outer periphery side toward the outside in the axis x direction, and for example, a tapered surface in a conical surface shape or a substantially conical surface shape centered or substantially centered about the axis x.

As described above, the hub pocket 230 may be defined by forming the outer peripheral surface 231 by the annular ridge portion 233 extending from the disc portion 216 of the hub 211 in the direction to the inside, or may be defined by forming the outer peripheral surface 231 by forming the recessed part 234 recessed to the direction toward the outside in the disc portion 216. In this case, the outer peripheral surface of the recessed part 234 forms the outer peripheral surface 231. It is to be noted that the hub pocket 230 may be formed by the ridge portion 233 and the recessed part formed in the disc portion 216.

As shown in FIG. 38, the side lip 229 of the oil seal 220 extends to the outside (one side in the axis x direction), and more specifically, extends in parallel to the axis x, or extends obliquely with respect to the axis x in the direction to the outside direction and the outer peripheral direction. Furthermore, an outer end 229a which is an end portion on the outside of the side lip 229 is located radially on the inner peripheral side than an inner end 231a which is an end portion on the inside of the outer peripheral surface 231 of the hub pocket 230, and does not enter into the inside of the hub pocket 230 in the axis x direction (the direction to the outside). An annular gap g13 is formed between the outer end 229a of the side lip 229 and the inner end 231a of the outer peripheral surface 231 of the hub pocket 230.

The annular gap g13 formed by the outer end 229a of the side lip 229 and the inner end 231a of the outer peripheral surface 231 of the hub pocket 230 forms a labyrinth seal. Therefore, even when foreign matter such as muddy water, sand or dust intrudes from the outside through the window portion 216a of the disc portion 216 of the hub 211 in addition to foreign matter intruding from between the front cover 153 and the damper pulley 210, the intruding foreign matter is suppressed from further intruding to the seal lip 224 side by the labyrinth seal (gap g13) formed by the side lip 229 and the hub pocket 230. As a result, the seal lip 224 of the oil seal 220 can be suppressed from being exposed to foreign matter intruding from the outside. Therefore, it can be suppressed that the lip tip end portion 224a bites foreign matter and thus is damaged or deteriorated, and the sealing performance of the oil seal 220 deteriorates to cause leakage of oil.

Furthermore, the outer peripheral surface 231 of the hub pocket 230 forming the labyrinth seal (the gap g13) has a shape which increases in diameter toward the outside as described above, so that the foreign matter can be more effectively suppressed from further intruding to the seal lip 224 side in the labyrinth seal.

As described above, foreign matter can be suppressed from intruding to the seal lip 224 side beyond the gap g13 by the labyrinth seal (gap g13) formed by the outer peripheral surface 231 of the hub pocket 230 and the side lip 229 of the oil seal 220. However, when the foreign matter crosses over the gap g13, the foreign matter may accumulate on the outer peripheral surface 231 of the hub pocket 230. The outer peripheral surface 231 increases in diameter as approaching to the disc portion 216 side of the hub 211, and foreign matter tends to accumulate at the back of the outer peripheral surface 231 (the disc portion 216 side). When foreign matter accumulates on the outer peripheral surface 231, it is conceivable that the sealing effect of the labyrinth seal (the gap g13) is deteriorated and the accumulating foreign matter moves to the seal lip 224 side. Therefore, in the sealing structure with the annular pocket and the sealing device according to the present disclosure, a foreign matter discharge groove 235 is provided to prevent foreign matter from accumulating on the outer peripheral surface 231 or in the hub pocket 230.

As shown in FIGS. 37 and 38, the foreign matter discharge groove 235 is a groove which is formed on the outer peripheral surface 231 of the hub pocket 230, and recessed in the outer peripheral direction while extending from one side (outside) to the other side (inside) in the axis x direction. The outer peripheral surface 231 of the hub pocket 230 has at least one foreign matter discharge groove 235. In the present embodiment, the outer peripheral surface 231 has plural foreign matter discharge grooves 235 at equiangular intervals in the circumferential direction. For example, as shown in FIG. 37, the outer peripheral surface 231 has four foreign matter discharge grooves 235.

The foreign matter discharge grooves 235 are formed such that bottom portions 235a which are portions on the outer peripheral side thereof extend along the axis x in the radial direction, and for example, the bottom portions 235a of the foreign matter discharge grooves 235 extend at equal intervals in the radial direction from the axis x over the extension direction of the foreign matter discharge grooves 235. The bottom portion 235a which is a portion on the outer peripheral side of the foreign matter discharge groove 235 is a portion represented by a locus obtained by connecting points farthest from the axis x on outlines of the foreign matter discharge groove 235 in respective cross-sections orthogonal to the axis x over the extension direction of the foreign matter discharge groove 235 between an end portion on the outside and an end portion on the inside of the foreign matter discharge groove 235. The bottom portion 235a of the foreign matter discharge groove 235 may extend to be away from the axis x as shifting from the outside to the inside in the axis x direction. Further, as shown in FIG. 37, the foreign matter discharge groove 235 may extend in parallel to the axis x in the circumferential direction (when the foreign matter discharge groove 235 is viewed in the radial direction), or may extend obliquely with respect to the axis x in the circumferential direction. As shown in FIGS. 37 and 38, in the present embodiment, the foreign matter discharge groove 235 extends in parallel to the axis x in the circumferential direction and extends in parallel to the axis x in the radial direction, that is, extends in parallel to the axis x.

The foreign matter discharge groove 235 may extend over the entire outer peripheral surface 231 between the outside and the inside, or may extend outward from the end portion on the inside of the outer peripheral surface 231 (the inner end 231a) to some middle point of the outer peripheral surface 231. Furthermore, the outlines of the foreign matter discharge groove 235 on cross-sections orthogonal to the extension direction may have the same shape or different shapes over the extension direction. For example, the outline of the foreign matter discharge groove 235 on the cross-section orthogonal to the extension direction of the foreign matter discharge groove 235 may be set such that the width of the outline in the circumferential direction increases toward the inside.

As described above, in the hub pocket 230, the foreign matter discharge grooves 235 are formed on the outer peripheral surface 231, and foreign matter intruding to the hub pocket 230 are easily passed through the foreign matter discharge grooves 235 and discharged to the outside of the hub pocket 230. Therefore, it is possible to suppress foreign matter from accumulating inside the hub pocket 230 such as the outer peripheral surface 231 or the like. When the bottom portion 235a of the foreign matter discharge groove 235 extends so as to be away from the axis x as shifting from the outside to the inside in the axis x direction, foreign matter in the hub pocket 230 can be more easily discharged to the outside through the foreign matter discharge groove 235 with centrifugal force generated by rotation of the damper pulley 210 as compared with the case where the bottom portion 235a of the foreign matter discharge groove 235 extends at equal intervals from the axis x. Furthermore, when the foreign matter discharge groove 235 extends obliquely with respect to the axis x in the circumferential direction, foreign matter in the hub pocket 230 can be easily discharged to the outside through the foreign matter discharge groove 235 by a screw effect based on the rotation of the damper pulley 210. Furthermore, when the width in the circumferential direction of the outline on the cross-section orthogonal to the extension direction of the foreign matter discharge groove 235 is larger toward the inside, foreign matter in the hub pocket 230 can be more easily discharged to the outside through the foreign matter discharge groove 235.

In the sealing structure 201 using a torsional damper and an oil seal according to the nineteenth embodiment of the present disclosure, as described above, foreign matter intruding from the outside can be suppressed from further intruding to the seal lip 224 side by the labyrinth seal (gap g13) formed by the side lip 229 and the hub pocket 230. Furthermore, the foreign matter discharge grooves 235 are formed on the outer peripheral surface 231 of the hub pocket 230, and even when foreign matter passes through the gap g13 and intrudes into the hub pocket 230, the foreign matter can be discharged to the outside through the foreign matter discharge grooves 235, so that the foreign matter can be suppressed from accumulating in the hub pocket 230. Therefore, the sealing structure 201 can efficiently suppress foreign matter from further intruding to the seal lip 224 side beyond the hub pocket 230.

As described above, according to the sealing structure 201 with a torsional damper and an oil seal according to the nineteenth embodiment of the present disclosure, the seal lip 224 of the oil seal 220 can be efficiently suppressed from being exposed to foreign matter intruding from the outside.

Next, a sealing structure with a torsional damper and an oil seal as a sealing structure with an annular pocket and a sealing device according to a twentieth embodiment of the present disclosure will be described. The sealing structure 202 with a torsional damper and an oil seal according to the twentieth embodiment of the present disclosure differs from the sealing structure with a torsional damper and an oil seal according to the nineteenth embodiment of the present disclosure only in the shape of the annular gap formed by the side lip 229 and the outer peripheral surface 231 of the hub pocket 230. Hereinafter, with respect to configurations having the same or similar functions as or to those of the sealing structure 201 with a torsional damper and an oil seal according to the nineteenth embodiment of the present disclosure, the description on the configurations will be omitted while the configurations are represented by the same reference signs, and only different configurations will be described.

Figure 39:
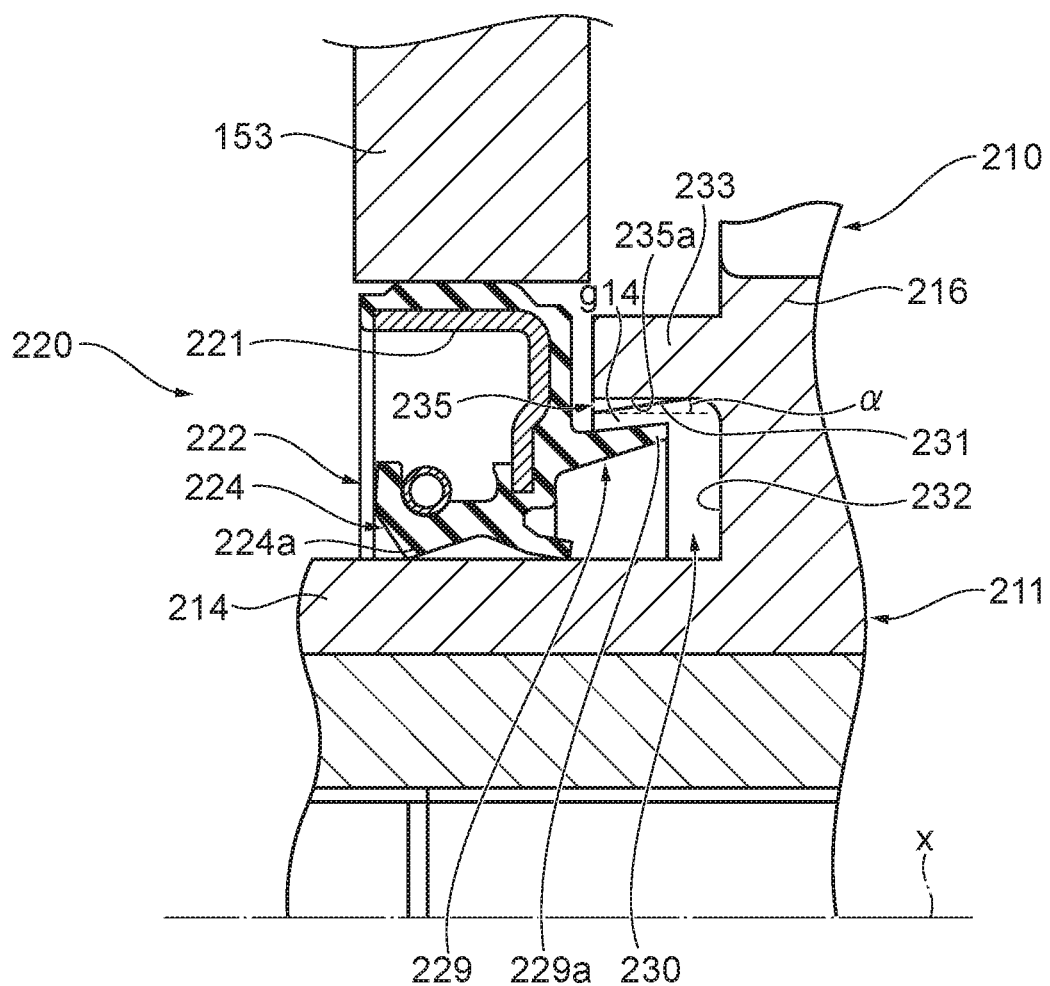
FIG. 39 is a partially enlarged cross-sectional view of a cross-section taken along an axis to show a schematic structure of a sealing structure with a torsional damper and an oil seal as a sealing structure with an annular pocket and a sealing device according to a twentieth embodiment of the present disclosure.

FIG. 39 is a partially enlarged cross-sectional view of a cross-section taken along the axis to show a schematic configuration of the sealing structure 202 with a torsional damper and an oil seal according to the twentieth embodiment of the present disclosure. As shown in FIG. 39, a portion on the outer end 229a side of the side lip 229 of the oil seal 220 enters into the inside of the hub pocket 230, and the side lip 229 and the outer peripheral surface 231 of the hub pocket 230 overlap each other over the axis x direction in the radial direction. That is, the side lip 229 and the outer peripheral surface 231 of the hub pocket 230 face each other in the radial direction, and an annular gap g14 is formed between the side lip 229 and the outer peripheral surface 231 of the hub pocket 230. That is, the side lip 229 and the outer peripheral surface 231 of the hub pocket 230 overlap each other.

The annular gap g14 formed by the side lip 229 and the outer peripheral surface 231 of the hub pocket 230 forms a labyrinth seal. Therefore, like the above-described sealing structure 201, foreign matter intruding from the damper pulley 210 can be suppressed from further intruding to the seal lip 224 side. As a result, it is possible to suppress the seal lip 224 of the oil seal 220 from being exposed to the foreign matter intruding from the damper pulley 210, and it can be suppressed that the lip tip end portion 224a bites foreign matter and thus is damaged or deteriorated, and the sealing performance of the oil seal 220 deteriorates to cause leakage of oil. Furthermore, the foreign matter discharge grooves 235 are formed on the outer peripheral surface 231 of the hub pocket 230, and even when foreign matter passes through the gap g14 and intrudes into the hub pocket 230, the foreign matter can be discharged to the outside through the foreign matter discharge grooves 235, so that it is possible to suppress the foreign matter from accumulating in the hub pocket 230. Therefore, the sealing structure 202 can efficiently suppress foreign matter from further intruding to the seal lip 324 side beyond the hub pocket 230.

As described above, according to the sealing structure 202 with a torsional damper and an oil seal according to the twentieth embodiment of the present disclosure, it is possible efficiently suppress the seal lip 224 of the oil seal 220 from being exposed to foreign matter intruding from the outside.

Next, a sealing structure with a torsional damper and an oil seal as a sealing structure with an annular pocket and a sealing device according to the twenty-first embodiment of the present disclosure will be described. The sealing structure 203 with a torsional damper and an oil seal according to the twenty-first embodiment of the present disclosure differs from the sealing structure 201 with a torsional damper and an oil seal according to the nineteenth embodiment of the present disclosure in the configuration forming the hub pocket 230. Hereinafter, with respect to configurations having the same or similar functions as or to those of the sealing structure 201 with a torsional damper and n oil seal according to the nineteenth embodiment of the present disclosure described above, the description on the configurations will be omitted while the configurations are represented by the same reference signs, and only different configurations will be described.

Figure 40:
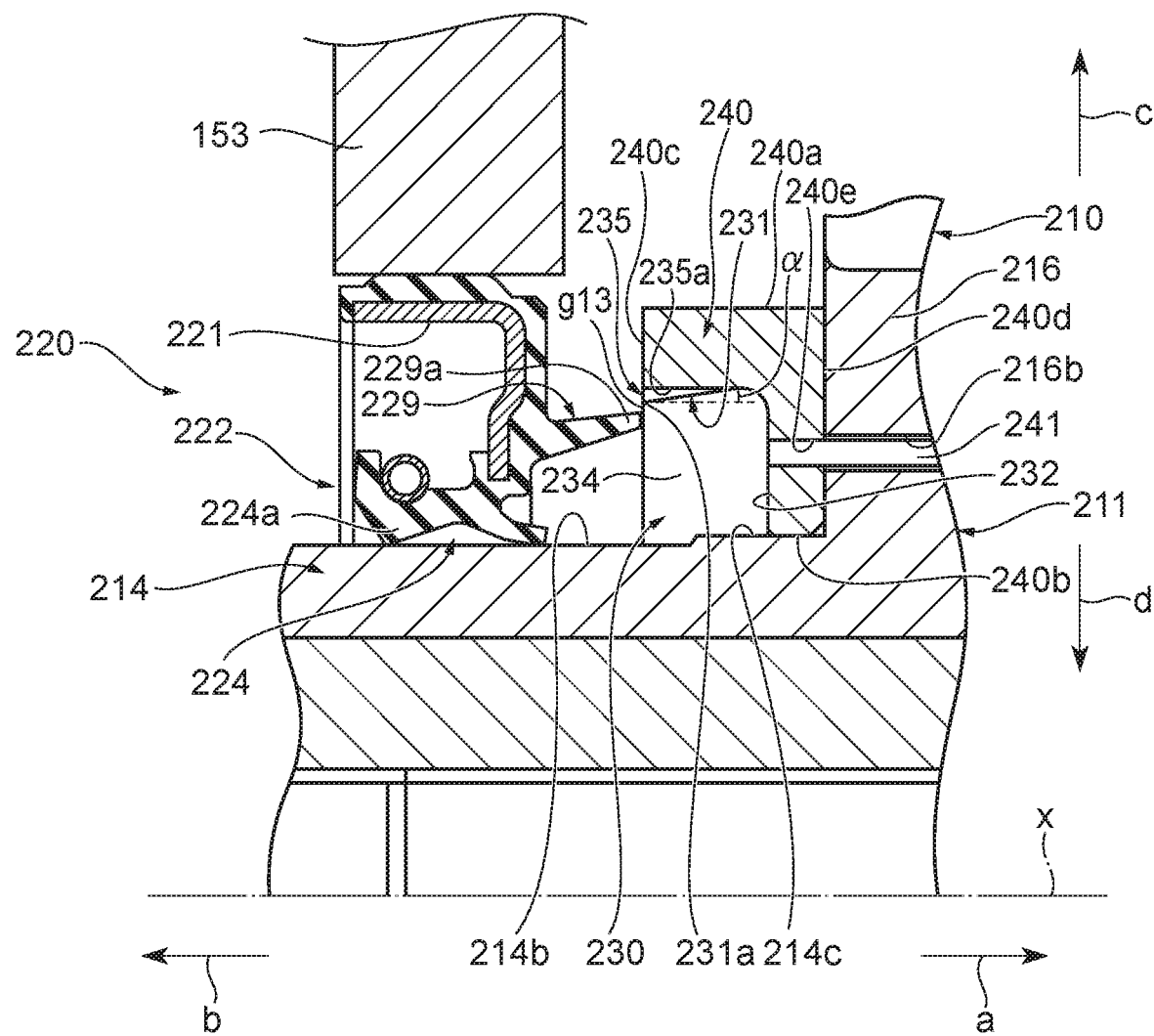
FIG. 40 is a partially enlarged cross-sectional view of a cross-section taken along an axis to show a schematic configuration of a sealing structure with a torsional damper and an oil seal as a sealing structure with an annular pocket and a sealing device according to a twenty-first embodiment of the present disclosure.

FIG. 40 is a partially enlarged cross-sectional view of a cross-section taken along the axis to show a schematic configuration of the sealing structure 203 with a torsional damper and an oil seal according to the twenty-first embodiment of the present disclosure. As shown in FIG. 40, in the damper pulley 210 in the sealing structure 3 with a torsional damper and an oil seal, the outer peripheral surface 231 and the bottom surface 232 of the hub pocket 230 are not formed in the hub 211. The sealing structure 203 with a torsional damper and an oil seal does not have the ridge portion 233, and has an accessory ring member 240 as a separate body from the hub 211 attached to the damper pulley 210, and the outer peripheral surface 231 and the bottom surface 232 of the hub pocket 230 are formed in this accessory ring member 240.

The accessory ring member 240 is a hollow disc-shaped member in an annular shape around the axis x, and is formed so as to be fittable to the boss portion 214 of the damper pulley 210. A recessed part is formed from one side surface of the accessory ring member 240 to form the outer peripheral surface 231 and the bottom surface 232 of the hub pocket 230. Specifically, as shown in FIG. 40, the accessory ring member 240 has an outer peripheral surface 240a which is a surface on the outer periphery side, and an inner peripheral surface 240b which is a surface on the inner periphery side for forming a through-hole into which the boss portion 214 is inserted and fitted.

In the accessory ring member 240, a recessed part 234 recessed outward is formed on a side surface 240c which is a side surface facing the inside, thereby forming the outer peripheral surface 231 and the bottom surface 232 of the hub pocket 230.

A stepped surface 214c which is an outer peripheral surface continuing to the outer peripheral surface 214b on the outside is formed in the boss portion 214 of the damper pulley 210. The stepped surface 214c has a larger diameter than the outer peripheral surface 214b, and projects outward beyond the outer peripheral surface 214b. Furthermore, the outer peripheral surface 214b and the stepped surface 214c are smoothly connected to each other. The inner peripheral surface 240b is fitted to the stepped surface 214c of the boss portion 214, whereby the accessory ring member 240 is fitted to the boss portion 214. This makes it possible to prevent damage to the outer peripheral surface 214b which is a lip sliding surface in contact with the lip tip end portion 224a of the seal lip 224 when the accessory ring member 240 is fitted.

The accessory ring member 240 is attached to the damper pulley 210 by a fixing member 241 so as to be relatively immovable. Under this attached state of the accessory ring member 240, a side surface 240d which is a side surface facing the outside of the accessory ring member 240 is in contact with the side surface of the disc portion 216. The fixing member 241 is, for example, a bolt, a rivet or a pin, and engaged with a through-hole 216b which is a through-hole extending in the axis x direction and formed in the disc portion 216, and a through-hole 240e which is a through-hole extending in the axis x direction and penetrating between the bottom surface 232 and the side surface 240d formed in the accessory ring member 240, thereby fixing the accessory ring member 240 to the damper pulley 210. For example, one or both of the through-hole 216b and the through-hole 240e are screw holes, and the fixing member 241 which is a bolt is screwed into the screw hole, whereby the accessory ring member 240 is fixed to the damper pulley 210. When the fixing member 241 is a pin or a rivet, the fixing member 241 is fitted into or engaged with the through-hole 216b and the through-hole 240e, whereby the accessory ring member 240 is fixed to the damper pulley 210. The method of fixing the accessory ring member 240 is not limited to the above-described method, and the fixing member 241 may be one for realizing another well-known applicable fixing method. Since the accessory ring member 240 is fixed to the damper pulley 210 by the fixing member 241, the accessory ring member 240 is firmly fixed.

Under a state where the accessory ring member 240 is attached to the damper pulley 210, an annular interval g13 is formed between the outer end 229a of the side lip 229 of the oil seal 220 and the inner end 231a of the outer peripheral surface 231 of the hub pocket 230 like the sealing structure 201 described above, and a labyrinth seal (gap g13) is formed.

The material of the accessory ring member 240 may be a metal material or a resin material, for example, stainless steel, ABS resin, or the like. It is preferable that the resin material of the accessory ring member 240 is resin that can withstand the ambient temperature of a use environment such as an engine room.

Furthermore, the foreign matter discharge groove 235 is formed on the outer peripheral surface 231 in the accessory ring member 240 like the above-described sealing structure 201. One foreign matter discharge groove 235 is formed on the outer peripheral surface 231 or plural foreign matter discharge grooves 235 are formed at equiangular intervals in the circumferential direction on the outer peripheral surface 231.

The sealing structure 203 with a torsional damper and an oil seal according to the twenty-first embodiment of the present disclosure described above can perform the same action and effect as the sealing structure 201 with a torsional damper and an oil seal according to the nineteenth embodiment of the present disclosure, and can efficiently suppress the seal lip 224 of the oil seal 220 from being exposed to foreign matter intruding from the outside.

In the sealing structure 203 with a torsional damper and an oil seal according to the twenty-first embodiment of the present disclosure, since the outer peripheral surface 231 and the bottom surface 232 of the hub pocket 230 are formed in the accessory ring member 240, the processing of the hub pocket 230 can be facilitated.

In the sealing structure 203 with a torsional damper and an oil seal according to the twenty-first embodiment of the present disclosure, the side lip 229 of the oil seal 220 does not entered into the inside of the hub pocket 230, but a portion on the outer end 229a side of the side lip 229 of the oil seal 220 may enter into the inside of the hub pocket 230, and the side lip 229 and the outer peripheral surface 231 of the hub pocket 230 may overlap each other over the axis x direction in the radial direction like the side lip 229 in the sealing structure 202 shown in FIG. 39. That is, the side lip 229 and the outer peripheral surface 231 of the hub pocket 230 face each other in the radial direction, whereby an annular gap (gap g14) may be formed between the side lip 229 and the outer peripheral surface 231 of the hub pocket 230. In this case, for example, as compared with the sealing structure 203 shown in FIG. 40, the outer peripheral surface 231 of the accessory ring member 240 extends to be long inward, or the attached position of the accessory ring member 240 is set inside.

Next, a sealing structure with a torsional damper and an oil seal as a sealing structure with an annular pocket and a sealing device according to a twenty-second embodiment of the present disclosure will be described. The sealing structure 204 with a torsional damper and an oil seal according to the twenty-second embodiment of the present disclosure differs in the configuration forming the hub pocket 230 from the sealing structure 201 with a torsional damper and an oil seal according to the nineteenth embodiment of the present disclosure. Hereinafter, with respect to configurations having the same or similar functions as or to those of the sealing structure 201 with a torsional damper and an oil seal according to the nineteenth embodiment of the present disclosure, the description on the configurations will be omitted while the configurations are represented by the same reference signs, and only different configurations will be described.

Figure 41:
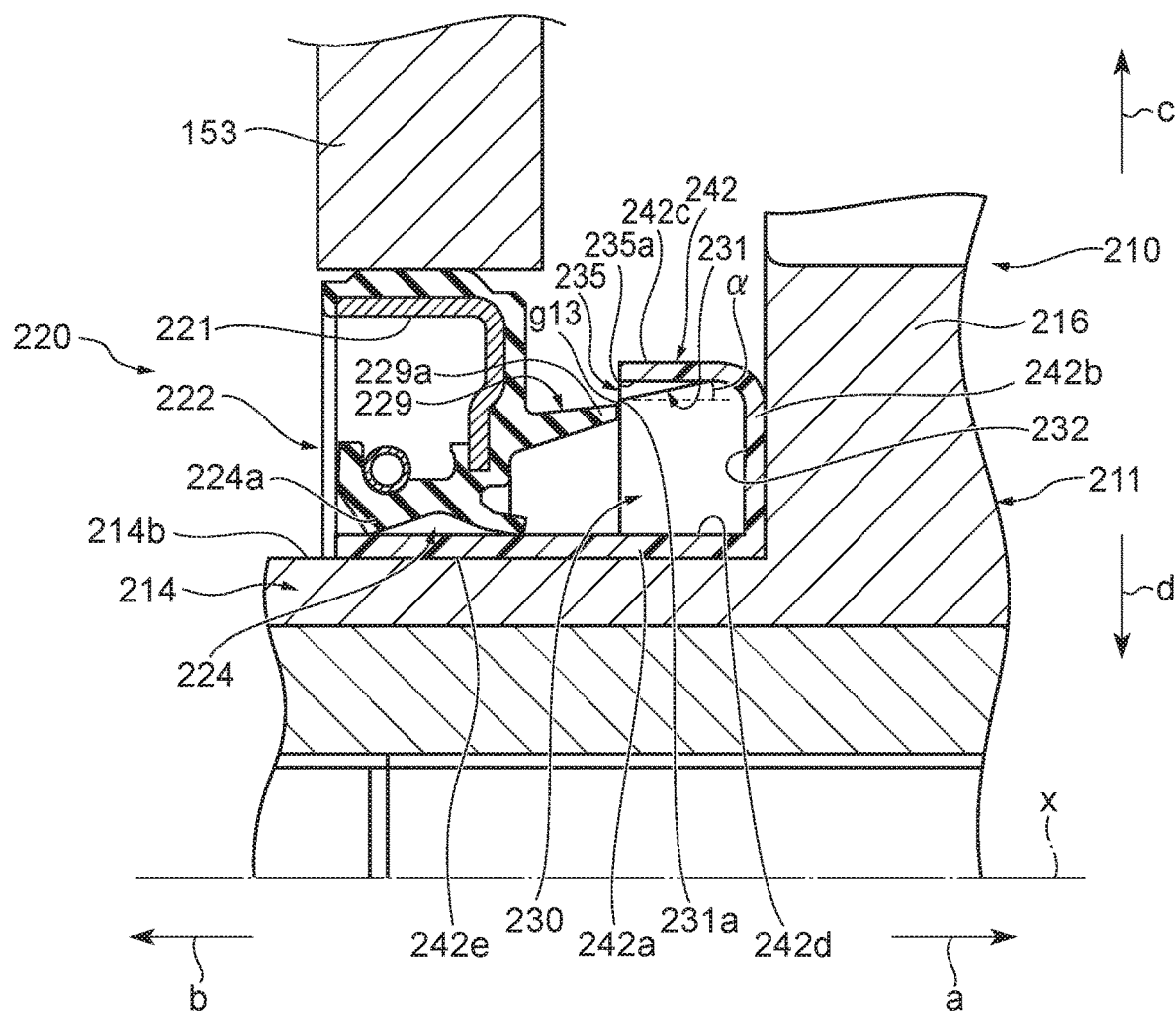
FIG. 41 is a partially enlarged cross-sectional view of a cross-section taken along an axis to show a schematic configuration of a sealing structure with a torsional damper and an oil seal as a sealing structure with an annular pocket and a sealing device according to a twenty-second embodiment of the present disclosure.

FIG. 41 is a partially enlarged cross-sectional view of a cross-section taken along the axis to show a schematic configuration of the sealing structure 204 with a torsional damper and an oil seal according to the twenty-second embodiment of the present disclosure. As shown in FIG. 41, in the damper pulley 210 in the sealing structure 204 with a torsional damper and an oil seal, the hub pocket 230 is not formed in the hub 211. The sealing structure 204 with a torsional damper and an oil seal does not have the ridge portion 233, and has an accessory ring member 242 as a separate body from the hub 211 attached to the damper pulley 210. The hub pocket 230 is formed in this accessory ring member 242.

The accessory ring member 242 is a hollow annular member in an annular shape around the axis x, and is formed so as to be fittable to the boss portion 214 of the damper pulley 210. A recessed part is formed from one side surface of the accessory ring member 242 to form the hub pocket 230. Specifically, as shown in FIG. 41, the accessory ring member 242 includes a tubular portion 242a which is a cylindrical portion centered or substantially centered about the axis x, a disc portion 242b which is a disc-shaped portion extending from an end portion on the outside of the tubular portion 242a to the outer periphery side in the radial direction, and an outer peripheral portion 242c which is a portion extending from an end portion on the outer periphery side of the disc portion 242b to the inside. The accessory ring member 242 is formed of a metal material, and one metal member, for example, a metal plate is subjected to press working or the like to be formed into the accessory ring member 242. The tubular portion 242a, the disc portion 242b, and the outer peripheral portion 242c are integrally formed from the same material, and have the same or substantially the same thickness. Stainless steel or SPCC (cold rolled steel) is used as the metal material of the accessory ring member 242.

As shown in FIG. 41, in the accessory ring member 242, the tubular portion 242a, the disc portion 242b, and the outer peripheral portion 242c define a space to form the hub pocket 230. Specifically, a surface on the inner periphery side of the outer peripheral portion 242c forms the outer peripheral surface 231 of the hub pocket 230, and the outer peripheral portion 242c extends while inclined at the same angle (inclination angle α) as the outer peripheral surface 231 of the hub pocket 230 with respect to the axis x. Furthermore, a surface on the inside of the disc portion 242b forms the bottom surface 232 of the hub pocket 230, and an outer peripheral surface 242d which is a surface on the outer periphery side of the tubular portion 242a forms a surface on the inner peripheral side which faces the outer peripheral surface 231 of the hub pocket 230.

The tubular portion 242a of the accessory ring member 242 is formed so as to be fittable to the boss portion 214 of the damper pulley 210. In a state where the accessory ring member 242 is attached to the boss portion 214, an inner peripheral surface 242e which is a surface on the inner periphery side of the tubular portion 242a is in close contact with the outer peripheral surface 214b of the boss portion 214. Furthermore, the tubular portion 242a is fitted to the boss portion 214, whereby the accessory ring member 242 is attached in a manner that the accessory ring member 242 is immovable relatively to the hub 211 of the damper pulley 210. In this case, the disc portion 242b of the accessory ring member 242 may contact the disc portion 216 of the hub 211, or may be spaced from the disc portion 216 at a predetermined interval.

As shown in FIG. 41, the tubular portion 242a of the accessory ring member 242 extends inward to the lip tip end portion 224a of the oil seal 220 or beyond the lip tip end portion 224a, and the outer peripheral surface 242d of the tubular portion 242a is slidably in contact with lip tip end portion 224a. As described above, in the present embodiment, unlike the above-described embodiments, not the outer peripheral surface 214b of the boss portion 214, but the outer peripheral surface 242d of the tubular portion 242a of the accessory ring member 242 forms the lip sliding surface of the oil seal 220. Therefore, the outer peripheral surface 242d of the tubular portion 242a is formed by processing such as polishing, coating, or the like. In the present embodiment, it is possible to omit the processing (working, etc.) of making the outer peripheral surface 214b of the boss portion 214 into the lip sliding surface.

In a state where the accessory ring member 242 is attached to the damper pulley 210, the annular gap g13 is formed between the outer end 229a of the side lip 229 of the oil seal 220 and the inner end 231a of the outer peripheral surface 231 of the hub pocket 230 like the sealing structure 201 with a torsional damper and an oil seal.

Figure 42:
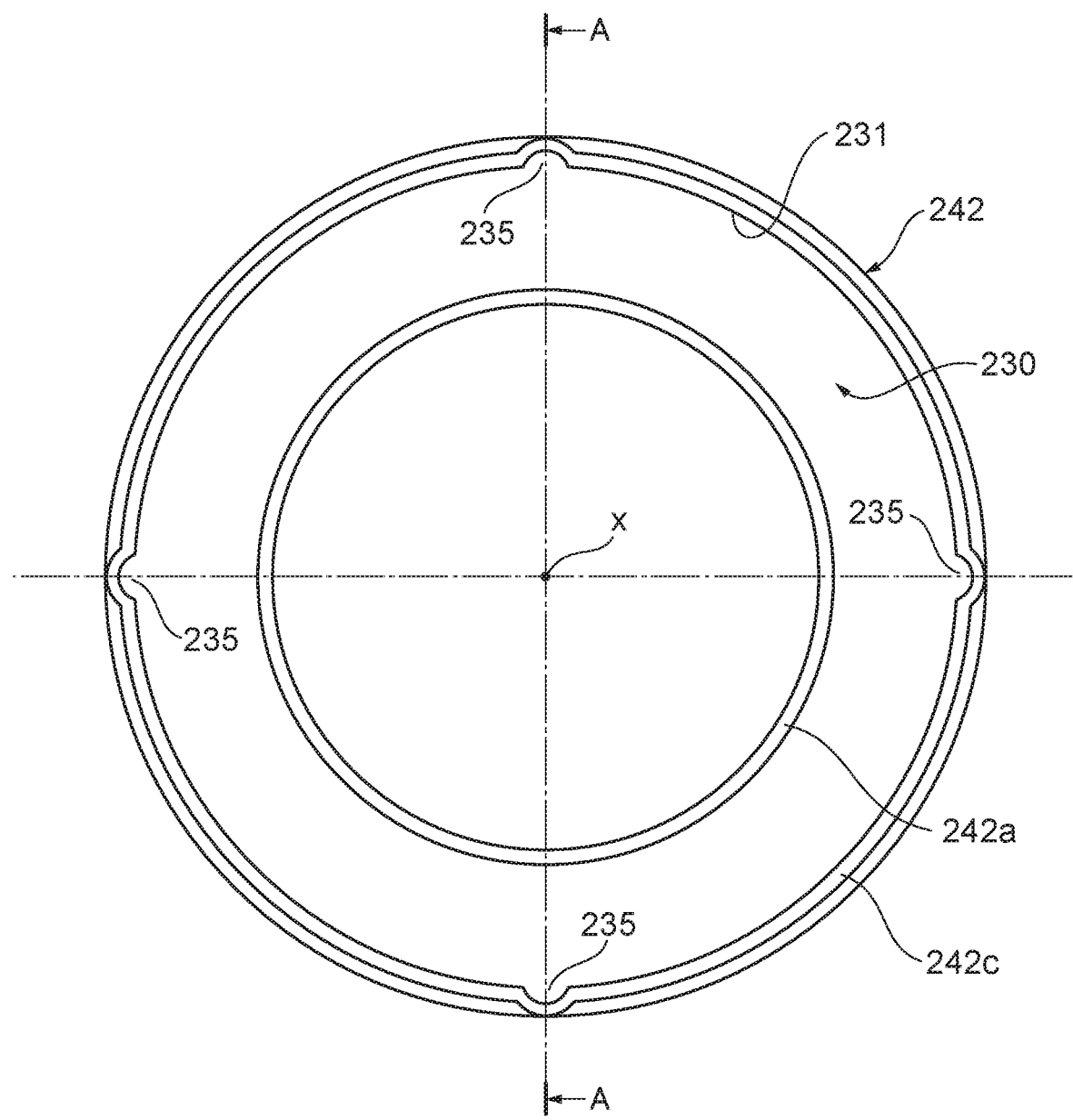
FIG. 42 is a front view of an attached annular member in the schematic configuration of the sealing structure with a torsional damper and an oil seal shown in FIG. 41.
Figure 43:
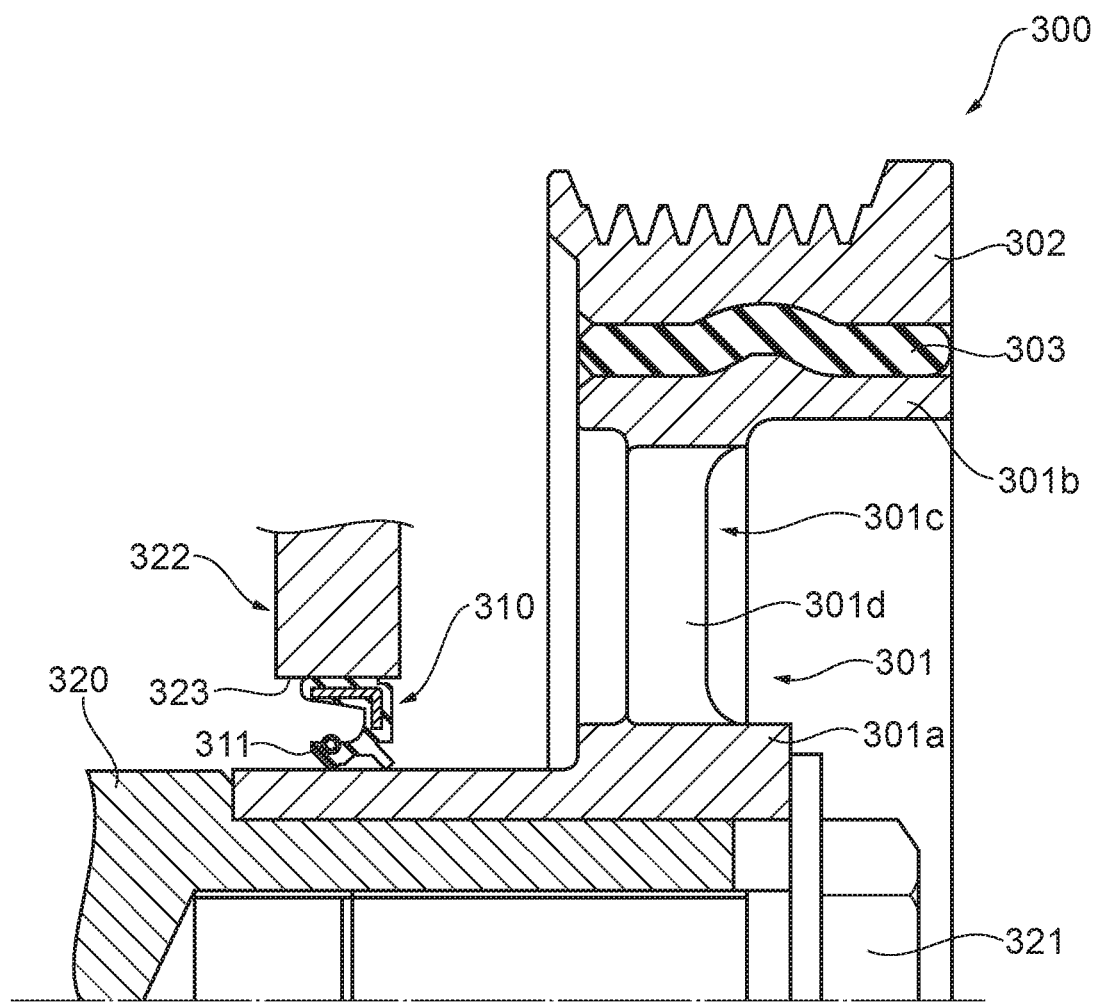
FIG. 43 is a partial cross-sectional view of a cross-section taken along an axis line to schematically show conventional configurations of a damper pulley and an oil seal used in an engine of a vehicle.

Like the above-described sealing structure 201, the foreign matter discharge groove 235 is formed on the outer peripheral surface 231 in the accessory ring member 242. One foreign matter discharge groove 235 is formed on the outer peripheral surface 231 or plural foreign matter discharge grooves 235 are formed at equiangular intervals in the circumferential direction on the outer peripheral surface 231. FIG. 42 is a front view of the accessory ring member 242 when the accessory ring member 242 is seen from the inside (a side at which the hub pocket 230 is opened). As shown in FIG. 42, for example, four foreign matter discharge grooves 235 are formed at equiangular intervals in the circumferential direction on the outer peripheral surface 231 in the accessory ring member 242, and the outer peripheral portion 242c of the accessory ring member 242 protrudes to the outer peripheral side at portions where the foreign matter discharge grooves 235 are formed. How degree the outer peripheral portion 242c protrudes in the outer peripheral direction at the portions where the foreign matter discharge groove 235 of the accessory ring member 242 are formed is based on the shape of the foreign matter discharge grooves 235. The foreign matter discharge grooves 235 can be formed in the press-working of the accessory ring member 242. It is to be noted that FIG. 41 corresponds to the cross-section taken along the line A-A in FIG. 42.

The sealing structure 204 with a torsional damper and an oil seal according to the twenty-second embodiment of the present disclosure described above can exert the same action and effect as the sealing structure 201 with a torsional damper and an oil seal according to the nineteenth embodiment of the present disclosure, and can efficiently suppress the seal lip 224 of the oil seal 220 from being exposed to foreign matter intruding from the outside. Furthermore, in the sealing structure 204 with a torsional damper and an oil seal according to the twenty-second embodiment of the present disclosure, since the outer peripheral surface 231 and the bottom surface 232 of the hub pocket 230 are formed in the accessory ring member 242, the working on the hub pocket 230 can be facilitated.

In the sealing structure 204 with a torsional damper and an oil seal according to the twenty-second embodiment of the present disclosure, the side lip 229 of the oil seal 220 does not enter into the inside of the hub pocket 230, but a portion on the side of the outer end 229a side of the side lip 229 of the oil seal 220 may enter into the inside of the hub pocket 230, and the side lip 229 and the outer peripheral surface 231 of the hub pocket 230 may overlap each other over the axis x direction in the radial direction like the side lip 229 in the sealing structure 202 shown in FIG. 39. That is, the side lip 229 and the outer peripheral surface 231 of the hub pocket 230 face each other in the radial direction, and an annular gap (gap g14) may be formed between the side lip 229 and the outer peripheral surface 231 of the hub pocket 230. In this case, for example, as compared with the sealing structure 204 shown in FIG. 41, the outer peripheral surface 231 of the accessory ring member 242 extends to be long inward, or the attached position of the accessory ring member 242 is set inside.

Furthermore, as described above, in the accessory ring member 242, the tubular portion 242a does not extend to the lip tip end portion 224a of the oil seal 220 or inward beyond the lip tip end portion 224a, and the outer peripheral surface 214b of the boss portion 214 may form the lip sliding surface of the oil seal 220 like the sealing structure 201. In this case, like the above-described sealing structure 203, it is preferable the stepped surface 214c continuing to the outer peripheral surface 214b on the outside is formed in the boss portion 214 of the damper pulley 210, and that the tubular portion 242a is engaged with the stepped surface 214c of the boss portion 214, whereby the accessory ring member 242 is attached to the boss portion 214. It is possible to prevent damage to the outer peripheral surface 214b of the boss portion 214 serving as a sealing surface when the accessory ring member 242 is attached.

The embodiments of the present disclosure have been described above. However, the present disclosure is not limited to the embodiments of the present disclosure described above, and includes all aspects contained in the concept of the present disclosure and the claims. Furthermore, the respective components may be suitably and selectively combined so as to solve and attain at least some of the above-described problems and effects, respectively. For example, the form, material, arrangement, size, and the like of each component in the above embodiments can be appropriately changed according to a specific use mode of the present disclosure.

Specifically, the shapes of the slingers 30, 70, the hub 62, the flywheel 82, the plate member 90, the damper pulley 110, the oil seals 120, 160, and the ring member 161 may be other shapes insofar as they have the pockets 10, 13, 14, 15, 16 or the hub pocket 130, and the side lips 29, 129, the side lip 54 on the outer peripheral side, or the projecting portion 162 which form the gaps g1 to g12 as described above.

Furthermore, it is described that the sealing structures 1 to 5', 101 to 108 with an annular pocket and a sealing device according to the present embodiments are applicable to a differential device of a car or a general-purpose machine, a hub bearing, a flywheel, and an engine. However, targets to which the sealing structure with an annular pocket and a sealing device according to the present disclosure is applied are not limited to these components, and the present disclosure is applicable to all configurations which can use the effects of the present disclosure such as shaft members, functional members, etc. of other vehicles, general-purpose machines, industrial machines, etc. Furthermore, the window portion 116a which is a through-hole penetrating through the disc portion 116 between the inside and the outside is formed in the torsional damper (damper pulley 110) according to the present embodiments. However, a target to which the sealing structure with a torsional damper and an oil seal is applied is not limited to this torsional damper, and the present disclosure is also applicable to a torsional damper in which the window portion 116a is not formed.

Furthermore, for example, the sealing structure with an annular pocket and a sealing device according to the present disclosure is not limited to the sealing structure with a torsional damper and an oil seal which is applied to the torsional damper and the oil seal described above, but may be applied to a shaft member or a rotating functional member and a sealing device used therefor. For example, the sealing structure with an annular pocket and a sealing device according to the present disclosure can be applied to the rear end of an engine, a hub bearing for holding a wheel, a differential device, and the like.

When the sealing structure with an annular pocket and a sealing device according to the present disclosure is applied to the rear end of an engine, an oil seal used for sealing the gap between a case and a crankshaft at the rear end of the crankshaft serves as the sealing device, and a flywheel serves as the functional member. The outer peripheral surface 231 is directly formed on the flywheel to form the hub pocket 230, or the hub pocket 230 having the outer peripheral surface 231 formed thereon is formed by an accessory ring member such as a slinger, and this accessory ring member is attached to the flywheel, whereby the hub pocket 230 is formed in the flywheel.

When the sealing structure with an annular pocket and a sealing device according to the present disclosure is applied to a hub bearing, a seal used for sealing the gap between an outer ring and an inner ring serves as the sealing device, and the inner ring serves as the shaft member. The outer peripheral surface 231 is directly formed on a hub ring to which a wheel is attached at the inner ring, thereby forming the hub pocket 230, or the hub pocket 230 having the outer peripheral surface 231 formed thereon is formed by an accessory ring member such as a slinger, and the accessory ring member is attached to the inner wheel, thereby forming the hub pocket 230 in the inner ring.

When the sealing structure with an annular pocket and a sealing device according to the present disclosure is applied to a differential device, a seal used for sealing the gap between a housing and an output shaft serves as the sealing device, and the output shaft serves as the shaft member. The outer peripheral surface 231 is directly formed on the output shaft, thereby forming the hub pocket 230, or the hub pocket 230 having the outer peripheral surface 231 formed thereon is formed by an accessory ring member such as a slinger, and this accessory ring member is attached to the output shaft, whereby the hub pocket 230 is formed on the output shaft.

It has been described that the sealing structure with an annular pocket and a sealing device according to the present embodiment is applied to an automobile engine. However, a target to which the sealing structure with an annular pocket and a sealing device according to the present disclosure is applied is not limited to the automobile engine, and the present disclosure can be applied to all configurations that can utilize the effect of the present disclosure, such as rotating shafts of other vehicles, general-purpose machines, industrial machines, etc.

Furthermore, the shapes of the accessory ring members 240, 242 are not limited to the above-described specific shapes. For example, the accessory ring member 242 may be fitted into the ridge portion 233 of the damper pulley 210 of the sealing structure 201 so that the hub pocket 230 is provided to the damper pulley 210. In this case, the tubular portion 242a may be shortened or omitted in the accessory ring member 242.

Furthermore, it has been described that the window portion 216a which is a through-hole penetrating through the disc portion 216 between the inside and the outside is formed in the torsional damper (damper pulley 210) according to the present embodiments. However, targets to which the sealing structure with a torsional damper and an oil seal according to the present disclosure is applied are not limited to this torsional damper, but the present disclosure is also applicable to a torsional damper in which the window portion 216a is not formed.

The invention claimed is:

1. A sealing structure with an annular pocket and a sealing device,
wherein the annular pocket has an outer peripheral surface having an annular shape around an axis and extending along the axis, forms a recessed part which has an annular shape around the axis and is recessed to one side in a direction of the axis, and is provided to a shaft member that penetrates through a through-hole of an attachment target portion to which the sealing device is attached, and is rotatable around the axis, or a functional member attached to the shaft member;

the sealing device includes a seal lip having an annular shape around the axis, and a side lip which has an annular shape around the axis and extends to the one side in the direction of the axis, and is attached to the through-hole of the attachment target portion to perform sealing between the shaft member or the functional member and the through-hole;

the outer peripheral surface of the annular pocket increases in diameter toward the one side in the direction of the axis; and in the sealing device attached to the attachment target portion, the seal lip is slidably in contact with the shaft member or the functional member directly or indirectly, and the side lip extends to the annular pocket to form an annular gap between the side lip and the outer peripheral surface of the annular pocket.

2. The sealing structure with an annular pocket and a sealing device according to claim 1, further comprising a slinger having an annular shape around the axis as the functional member, wherein the annular pocket is provided to the slinger, and the slinger is a member having an annular shape around the axis, and is fitted and attached to the shaft member.

3. The sealing structure with an annular pocket and a sealing device according to claim 2, wherein the slinger includes an inner peripheral tubular portion which is a cylindrical portion having an annular shape around the axis and extending along the axis, an outer peripheral tubular portion which is a cylindrical portion facing the inner peripheral tubular portion on an outer peripheral side, having an annular shape around the axis and extending along the axis, and a bottom portion which is a portion expanding between an end portion on the one side in the direction of the axis of the outer peripheral tubular portion and an end portion of the one side in the direction of the axis of the inner peripheral tubular portion, the recessed part is defined by the inner peripheral tubular portion, the outer peripheral tubular portion and the bottom portion, and the outer peripheral tubular portion has the outer peripheral surface.

4. The sealing structure with an annular pocket and a sealing device according to claim 2, wherein the attachment target portion is a housing of a differential device, and the shaft member is an output shaft of the differential device.

5. The sealing structure with an annular pocket and a sealing device according to claim 1, wherein the annular pocket is provided to a hub of a hub bearing as the shaft member, and the attachment target portion is an outer ring of the hub bearing.

6. The sealing structure with an annular pocket and a sealing device according to claim 1, further comprising a slinger having an annular shape around the axis as the functional member, wherein the annular pocket is provided to the slinger, the shaft member is a hub of a hub bearing, the attachment target portion is an outer ring of the hub bearing, and the slinger is fitted to the hub.

7. The sealing structure with an annular pocket and a sealing device according to claim 6, wherein the recessed part is formed in the slinger.

8. The sealing structure with an annular pocket and a sealing device according to claim 1, wherein the annular pocket is provided to a flywheel as the functional member, and the shaft member is a crankshaft.

9. The sealing structure with an annular pocket and a sealing device according to claim 1, further comprising a disc-shaped plate member as the functional member, wherein the annular pocket is provided to the plate member, and the plate member is interposed between a crankshaft as the shaft member and a flywheel as the functional member to cover an end portion on one side in the direction of the axis of the crankshaft from an outer periphery side at the outer peripheral surface of the annular pocket, thereby forming the recessed part.

10. The sealing structure with an annular pocket and a sealing device according to claim 9, wherein the plate member has a disc portion which is a disc-shaped portion, an outer peripheral tubular portion which is a cylindrical portion extends from an end portion on the outer periphery side of the disc portion along the axis, and the outer peripheral surface is formed in the outer peripheral tubular portion.

11. The sealing structure with an annular pocket and a sealing device according to claim 1, wherein the side lip forms the annular gap between the side lip and an end portion on another side in the direction of the axis of the outer peripheral surface of the annular pocket.

12. The sealing structure with an annular pocket and a sealing device according to claim 1, wherein the side lip faces the outer peripheral surface of the annular pocket to form the annular gap between the side lip and the outer peripheral surface of the annular pocket.

13. The sealing structure with an annular pocket and a sealing device according to claim 1, wherein a diameter-increasing angle which is an angle of the diameter-increasing outer peripheral surface of the annular pocket with respect to the axis ranges from not less than 4° to not more than 18°.

14. The sealing structure with an annular pocket and a sealing device according to claim 1, wherein a gap angle difference which is a difference between a diameter-increasing angle which is an angle of the diameter-increasing outer peripheral surface of the annular pocket with respect to the axis and an inclination angle which is an angle of the side lip with respect to the axis ranges from not less than 1.0° to not more than 11.0°.

15. A sealing structure with an annular pocket and a sealing device, wherein the annular pocket has an outer peripheral surface having an annular shape around an axis and extending along the axis, forms a recessed part which has an annular shape around the axis and is recessed to one side in a direction of the axis, and is provided to a shaft member that penetrates through a through-hole of an attachment target portion to which the sealing device is attached, and is rotatable around the axis, or a functional member attached to the shaft member;

the sealing device includes a seal lip having an annular shape around the axis, and a side lip which is has an annular shape around the axis and extends to the one side in the direction of the axis, and is attached to the through-hole of the attachment target portion to perform sealing between the shaft member or the functional member and the through-hole;

in the sealing device attached to the attachment target portion, the seal lip is slidably in contact with the shaft member or the functional member directly or indirectly, and the side lip extends to the annular pocket to form an annular gap between the side lip and the outer peripheral surface of the annular pocket; and the outer peripheral surface of the annular pocket increases in diameter toward the one side in the direction of the axis, and includes at least one foreign matter discharge groove as a groove which extends from the one side to another side in the direction of the axis and is recessed in an outer peripheral direction.

16. The sealing structure with an annular pocket and a sealing device according to claim 15, wherein a bottom portion which is a portion on an outer peripheral side of the foreign matter discharge groove extends along the axis in a radial direction.

17. The sealing structure with an annular pocket and a sealing device according to claim 16, wherein the foreign matter discharge groove extends so that the bottom portion departs from the axis in the radial direction from the one side toward the other side in the direction of the axis.

18. The sealing structure with an annular pocket and a sealing device according to claim 15, wherein the outer peripheral surface of the annular pocket has a plurality of foreign matter discharge grooves at equiangular intervals in a circumferential direction.

19. The sealing structure with an annular pocket and a sealing device according to claim 15, wherein the side lip forms the annular gap between the side lip and an end portion on the other side of the outer peripheral surface of the annular pocket.

20. The sealing structure with an annular pocket and a sealing device according to claim 15, wherein the side lip faces the outer peripheral surface of the annular pocket to form the annular gap between the side lip and the outer peripheral surface of the annular pocket.

21. The sealing structure with an annular pocket and a sealing device according to claim 15, further comprising a torsional damper as the functional member to which the annular pocket is provided, wherein the torsional damper includes a hub, a mass body that has an annular shape around an axis and covers the hub on an outer periphery, and a damper elastic body that is arranged between the hub and the mass body to elastically connect the hub and the mass body, the hub is inserted into the through-hole of the attachment target portion, whereby the torsional damper is attached to one end of a shaft member, the hub includes a boss portion having an annular shape around the axis, a rim portion having an annular shape around the axis and positioned on an outer periphery of the boss portion, and a disc-shaped disc portion for connecting the boss portion and the rim portion, and the annular pocket is provided on an outer periphery side of the boss portion in the hub.

22. The sealing structure with an annular pocket and a sealing device according to claim 21, wherein the hub has an accessory ring member which is an annular member detachably attached to the boss portion of the hub, and the outer peripheral surface of the annular pocket is formed in the accessory ring member.

* * * * *

UNITED STATES PATENT AND TRADEMARK OFFICE
CERTIFICATE OF CORRECTION

PATENT NO. : 10,865,834 B2  
APPLICATION NO. : 16/194716  
DATED : December 15, 2020  
INVENTOR(S) : Yusuke Kamiya et al.

Page 1 of 1

It is certified that error appears in the above-identified patent and that said Letters Patent is hereby corrected as shown below:

In the Specification

Column 42, Line 63, "angle ca of the hub" should read -- angle $\alpha$ of the hub --

Column 44, Line 21, "8=7.2°. In the test" should read -- $\delta$=7.2°. In the test --

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*